United States Patent [19]

Gieffers

[11] Patent Number: 5,557,257
[45] Date of Patent: Sep. 17, 1996

[54] PROGRAMMABLE EMERGENCY SIGNALLING SYSTEM FOR A VEHICLE

[75] Inventor: Ward J. Gieffers, Oak Lawn, Ill.

[73] Assignee: Federal Signal Corporation, Oak Brook, Ill.

[21] Appl. No.: 169,427

[22] Filed: Dec. 17, 1993

Related U.S. Application Data

[63] Continuation of Ser. No. 529,207, May 25, 1990, Pat. No. 5,296,840.

[51] Int. Cl.$^6$ .................................. B60Q 1/26; G08B 3/00
[52] U.S. Cl. .................... 340/474; 340/384.3; 340/384.4; 340/384.5
[58] Field of Search ............................ 340/384.1, 384.3, 340/384.4, 384.5, 384.7, 474

[56] References Cited

U.S. PATENT DOCUMENTS

| | | | |
|---|---|---|---|
| 3,125,742 | 3/1964 | Plowick | 340/472 |
| 3,868,684 | 2/1975 | Nunn, Jr. | 340/384 E |
| 4,040,050 | 8/1977 | Nunn, Jr. | 340/384 E |
| 4,054,869 | 10/1977 | Smith et al. | 340/384 E |
| 4,065,767 | 12/1977 | Neuhof et al. | 340/384 E |
| 4,075,624 | 2/1978 | Sheff | 340/384 E |
| 4,189,718 | 2/1980 | Carson et al. | 340/384 E |
| 4,280,123 | 7/1981 | Right et al. | 340/384 E |
| 4,326,276 | 4/1982 | Scott, Jr. | 340/384.5 |
| 4,375,061 | 2/1983 | Shoff | 340/384.5 |
| 4,472,069 | 9/1984 | Yamamoto | 340/384.5 |
| 4,646,063 | 2/1987 | Carson | 340/384 |
| 4,759,069 | 7/1988 | Bernstein | 340/902 |
| 4,831,357 | 5/1989 | Miller | 340/472 |
| 4,898,059 | 2/1990 | Iizuka | 340/384.5 |
| 4,958,154 | 9/1990 | Luber et al. | 340/384.5 |
| 4,980,837 | 12/1990 | Nunn et al. | 340/384.5 |
| 5,012,221 | 4/1991 | Neuhaus et al. | 340/384.5 |

FOREIGN PATENT DOCUMENTS

| | | |
|---|---|---|
| 510393 | 12/1977 | Australia . |
| 35316/78 | 10/1979 | Australia . |
| 2222919 | 3/1990 | United Kingdom . |

OTHER PUBLICATIONS van Veldhuizen, E. D., "In-Vehicle Communications-Standardization and Realization", *Multiplexing in Automobiles*, International Congress And Exposition, Society of Automotive Engineers, Inc., ISBN 0-89883-430-9, Feb., 1989 (pp. 89-94).

Federal Signal Corporation catalog for Model PA300*012MSB Electronic Siren (Installation and Service Instructions (1989)).

Federal Signal Corporation Catalog for Models PA2050 and PA2100 Jan. 1988.

Federal Signal Corporation Catalog for Model SS2000-SS—Preliminary Operation and Configuration Instructions Apr. 1994.

Federal Signal Corporation Catalog for Model SS2000-SM, Apr. 1994.

Federal Signal Corporation Catalog for Model PA500L, Jan. 1989.

General Electric Brochure S-825, pp. 2-1, 2-2; Series Control Unit Programming Guide, Apr. 1989.

"Unitrol Instalation Manual, Series L, Siren/P.A. Systems," Dunbar-Nunn Corp. Jan. 1988.

Whelen Engineering Company Catalog for Model WS-295MP.

*Primary Examiner*—Donnie L. Crosland
*Attorney, Agent, or Firm*—Leydig, Voit & Mayer, Ltd.

[57] ABSTRACT

A signalling system is provided that is alternatively operable in programming and operating modes. The signalling system includes a keypad, control head, control unit and a plurality of signalling features selectively activated by the control unit in the operating mode. The system provides for keystrokes to the keypad placing the system in the programming mode and selecting the signalling features to be activated by the control unit in the operating mode.

14 Claims, 13 Drawing Sheets

PROGRAMMABLE EMERGENCY SIGNALLING SYSTEM FOR A VEHICLE

This application is a continuation of U.S. application Ser. No. 07/529,207, filed May 25, 1990, now U.S. Pat. No. 5,296,840.

TECHNICAL FIELD OF THE INVENTION

The invention relates to emergency signalling systems of the type used in conjunction with emergency vehicles such as police cars, fire engines, ambulances and the like to alert others to the approach of such vehicles.

BACKGROUND

Typically, emergency signalling systems include a plurality of signalling devices. For example, a system may include a siren/speaker and primary and secondary visual indicators such as rotating and flashing lights and auxiliary lights such as take-down lights, alley lights and headlight flashers. Different combinations of these devices are simultaneously operated in order to create signalling schemes of different types. Each type is usually designed for use in a particular category of emergency situations. For example, when a vehicle incorporating the system is stopped on the side of a road in order to help a disabled vehicle, operation of only the flashing lights may be appropriate. When pursuing a vehicle, maximum signalling is required and the primary visual indicators (rotators) and a siren may be added to the flashing lights. A non-pursuit-type emergency may call for the primary visual indicators and the flashing lights, but no siren.

So the operator of the emergency vehicle does not have to configure his/her own emergency signalling each time the system is used, each system is typically designed to operate in one of a plurality of selectable "operating modes." Using the example of the previous paragraph, a first operating mode may operate the system with flashing lights only. A second operating mode may operate the flashing lights and the rotating lights. A third run mode may operate all of the flashing lights, rotating lights and the siren/speaker.

Designating the functions of each operating mode, however, restricts the versatility of the system and prevents an operator from tailoring the various operating modes to the needs of his/her particular application and environment. In order to provide some versatility to the system, it is known to provide dip switches on the circuit boards of the system that allow selected signalling features to be enabled for each operating mode. Unfortunately, the dip switches are not easily accessible and require a service technician to partially disassemble an installed system if the operating modes are to be changed. Moreover, they are expensive and require considerable space. In order to provide any significant amount of system versatility, a large number of the switches would be required, thereby making such a system bulky and expensive.

SUMMARY OF THE INVENTION

It is a primary object of the invention to provide an emergency signalling system whose different operating modes can be tailored to the needs of a user without requiring disassembly of the system.

It is another object of the invention to provide an emergency signalling system installed in a vehicle and having an operating mode whose features can be changed quickly and easily and without disassembly.

It is another particular object of the invention to provide an emergency signalling system in a vehicle that can be changed from one mode to another by the operator of the vehicle without requiring him/her to remove a hand from the steering wheel or to change eye focus from the traffic conditions to the interior of the vehicle.

To achieve the foregoing objects, there is provided an emergency signalling system whose various operating modes can be configured or modified after the system has been installed in a vehicle by way of keystrokes to a keypad. The system includes a microprocessor that is alternatively operable in a program mode, an idle mode (power applied, but not operating) or one of several programmable operating modes. An algorithm is provided for generating a plurality of alternative tones by a speaker of the system. Preferably, the keypad is mounted to the dashboard of the vehicle and incorporated as part of a control head for the system. Programming of the system is accomplished by way of keystrokes to the keypad. In the preferred embodiments illustrated herein, the keypad provides operator input signals for both the program mode and the operating modes. In an alternative embodiment, the keypad for programming the signalling system may be separate from the keypad for controlling the system in its operating modes. Such a separate programming keyboard may be detachable from the system after programming is completed. For example, a laptop personal computer (PC) may be connected to a serial port provided on the control head of the system in order for authorized personnel to program the system by way of keystrokes to the keypad of the PC.

In the preferred embodiment of the invention, the program mode provides for the selection of a desired one of the alternative tones to be automatically selected for use in one of the operating modes when the system is turned on. After the system is turned on and in the operating mode with the preselected tone, a different tone can be generated by way of a keystroke to the appropriate key. In the program mode, a simple sequence of keystrokes to the keypad selects the desired tone. During power up of the system, a first keystroke or set of keystrokes places the microprocessor in the program mode. A second keystroke or set of keystrokes selects the desired one of the alternative tones to be included in one of the operating modes upon power up of the system. Moreover, the program mode also provides for selectively enabling/disabling the alternative tones in order to control their availability in the operating modes.

For at least one of the operating modes, the system in accordance with the invention also preferably provides for programming the particular emergency lights activated in the mode. In this regard, the emergency lights may be divided into different groups—e.g., rotators, flashing lights and other lights such as take-down and alley lights. Selected ones or combinations of these groups may be programmed to be activated in at least one of the operating modes by way of keystrokes to the keypad when the microprocessor of the system is in its program mode.

Auxiliary functions incorporated into the system may also be programmed by the microprocessor in its program mode by way of keystrokes to the keypad. In the preferred embodiment, these keystrokes selectively enable each function to alternatively operate as an on/off function, a momentary-on function (on only while a key is pressed) or a timeout function when the microprocessor is in one of its operating modes. The system architecture provides for the auxiliary functions to be available in each of the operating modes. Depending upon the type of light bar used in the system, the take-down alley and other similar lights are usually part of the auxiliary functions rather than part of the primary/ secondary lights that are freely programmable to be enabled or disabled in each of the operating modes.

It will be appreciated from the following detailed description that the precise programming restrictions for each operating mode with respect to the emergency lights, siren and auxiliary functions is a matter of overall system design preferences rather than a necessity of the invention. For example, instead of the auxiliary functions being enabled in each of the three possible operating modes, the programming mode may provide for full flexibility of the auxiliary functions so that in addition to programming whether each operates as an on/off function, a momentary-on or timeout function, it can also be programmed to be totally disabled in any particular operating mode. In this regard, the programming of the power-up tone for the speaker is limited to a third operating mode in the preferred embodiment. In the first two operating modes, no siren tone can be programmed. Other system designs in keeping with the invention, however, may allow for the programming of a siren tone in more than just the third operating mode.

The system of the invention also provides a switch mounted to the floorboard area of the vehicle for transferring the system from one operating mode to another. Specifically, in the preferred embodiment, activation of the floor switch transfers the system from its present operating mode to the third operating mode, which is the "pursuit" mode for the system. In the pursuit mode, the system provides maximum visual and audible signalling. In an emergency situation, the foot switch allows the operator of the vehicle to activate the pursuit mode without taking a hand away from the steering wheel and without changing the focus of his attention. These characteristics are important advantages in a situation that typically is dangerous and requires total concentration by the vehicle operator to the events creating the emergency condition.

In order to further aid the vehicle operator in maintaining his/her attention to the emergency conditions, the preferred embodiment provides for the programming of a feature allowing activation of a siren tone by way of the standard horn ring of the vehicle. Specifically, conventional emergency signalling systems are known which include a feature wherein the standard horn ring may momentarily provide a siren tone or change of tone to the speaker of the signalling system. In conventional systems, however, the feature cannot be selectively enabled. In keeping with the system of the invention, the horn ring feature is programmable when the microprocessor of the system is in its program mode. Like the other programming features, programming of the horn ring feature is accomplished by way of keystrokes to the keypad.

Other objects and advantages will become apparent upon reference to the following detailed description when taken in conjunction with the drawings.

While the invention will be described in connection with a preferred embodiment and one alternative embodiment, there is no intent to limit it to those embodiments. On the contrary, the intent is to cover all alternatives, modifications, and equivalents falling within the spirit and scope of the invention as defined by the appended claims.

DETAILED DESCRIPTION OF THE PREFERRED EMBODIMENT

Figure 1:
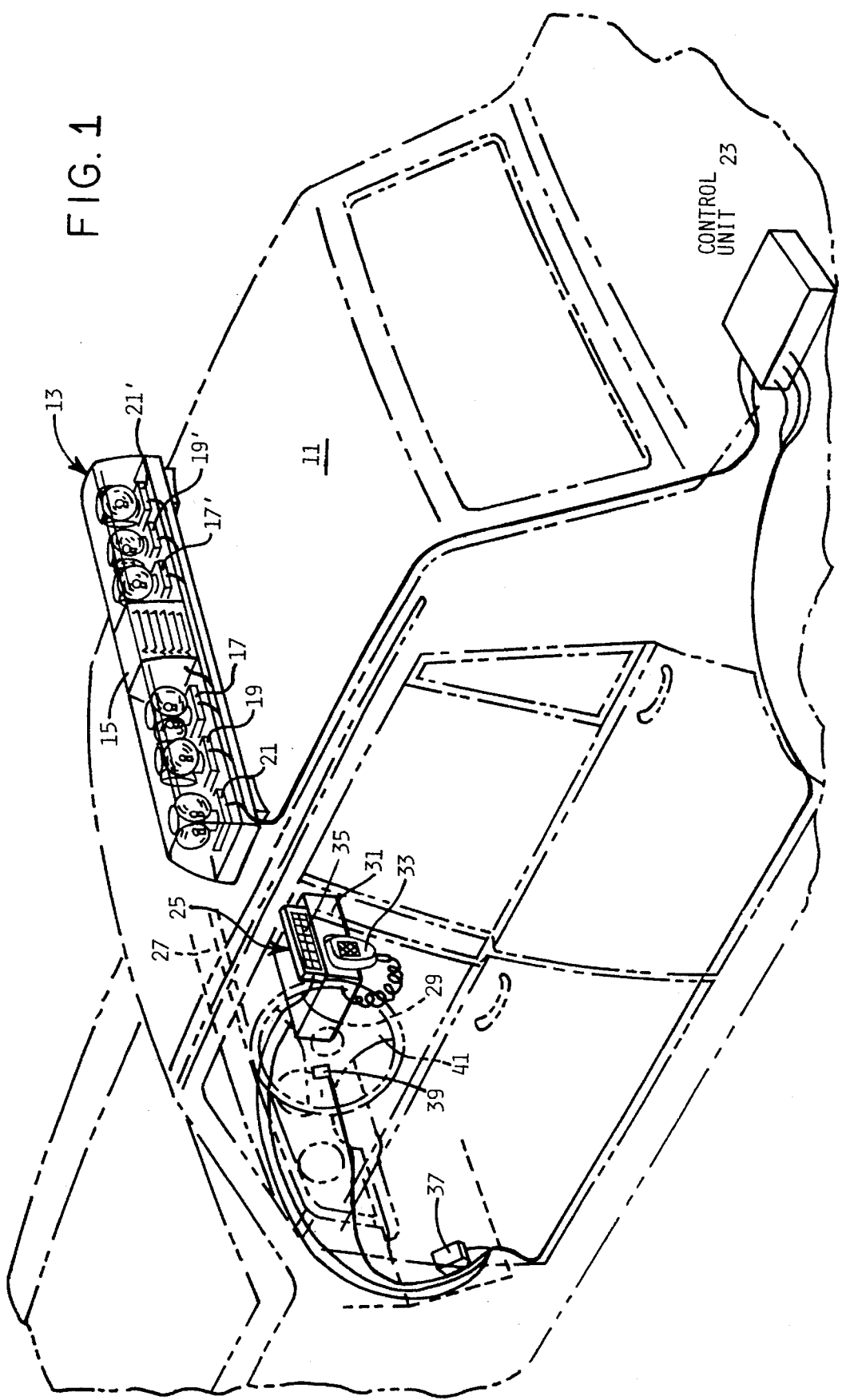
FIG. 1 is an elevated perspective view of an emergency vehicle incorporating a signalling system according to a first embodiment of the invention, where the standard vehicle construction is shown in broken lines in order to highlight the system.

Turning to the drawings and referring first to FIG. 1, a signalling system according to a preferred embodiment of the invention is installed in an exemplary emergency vehicle 11 shown in broken lines. The system includes a conventional light bar 13 that incorporates a speaker 15 and a plurality of lights. An example of a light bar that may be used in the system is a STREETHAWK® light bar manufactured by Federal Signal Corporation of University Park, Ill. In such a light bar, the lights are typically arranged in three groups—i.e., flashing lights, rotator lights and other lights such as take-down and alley lights. In the illustrated light bar, two pairs of three (3) lights are arranged on both sides of the centrally located speaker 15. Although actual light bar configurations of the system including flashing lights, rotators and beacons may be different than that illustrated, for convenience of reference and illustration, the inner light 17 or 17' of each pair is considered herein to be a rotator, the central light 19 or 19' is considered to be a flasher and the outer light 21 or 21' is considered to be a beacon.

It will be appreciated by those familiar with signalling systems and light bars in particular that there exists many different types of lights for light bars and many different configurations. As will become apparent hereinafter, the identification of particular types of lights (i.e., flashing lights, rotators and beacons) for the light bar 13 of FIG. 1 is illustrative only and intended merely to aid in explaining how a light bar comprising groups of lights of different types can be used in the system of the invention. The identification of particular lighting functions in different modes of system operation is not intended to limit the scope of the invention to systems incorporating particular types of lights or particular arrangements of them.

Control of the groups of lights 17–21, 17'–21' and the speaker 15 comprising the light bar 13 is provided by a control unit 23 and control head 25. The control head 25 is mounted on the interior area of the vehicle 11 and preferable on the dashboard/instrument panel area 27 just to the right of the steering wheel 29 for easy access by the operator of the vehicle. Typically associated with the control head 25 is a two-way radio 31. As is well known in these types of signalling systems, the control unit 23 may provide for rebroadcasting of the radio signal over the speaker 15 and for a microphone 33 of the two-way radio to function as a microphone for a public address (PA) function implemented by way of the speaker. Activation of either of these features is accomplished by way of keystrokes to a keypad 35 incorporated in the control head 25.

Although the control unit 23 is shown as being mounted in the trunk area of the vehicle 11, it may be mounted elsewhere, depending upon the precise design of the vehicle and the number of other accessories included in the vehicle. For example, the control unit 23 may be mounted under the dashboard area 27. As will be discussed more fully hereinafter, the system of the invention includes a floor switch 37 that is activated by the left foot of an operator and a switch 39 activated by a horn ring 41 of the steering wheel 29. Signals from these switches are received by the control unit, and it responds by controlling the operation of the light bar 13 and siren/speaker 15 in a predetermined manner.

In an alternative version of the signalling system, a control head for the two-way radio 31 also serves as the control head for the signalling system. This alternative embodiment of the invention will be discussed in greater detail in connection with FIG. 5.

Figure 2:
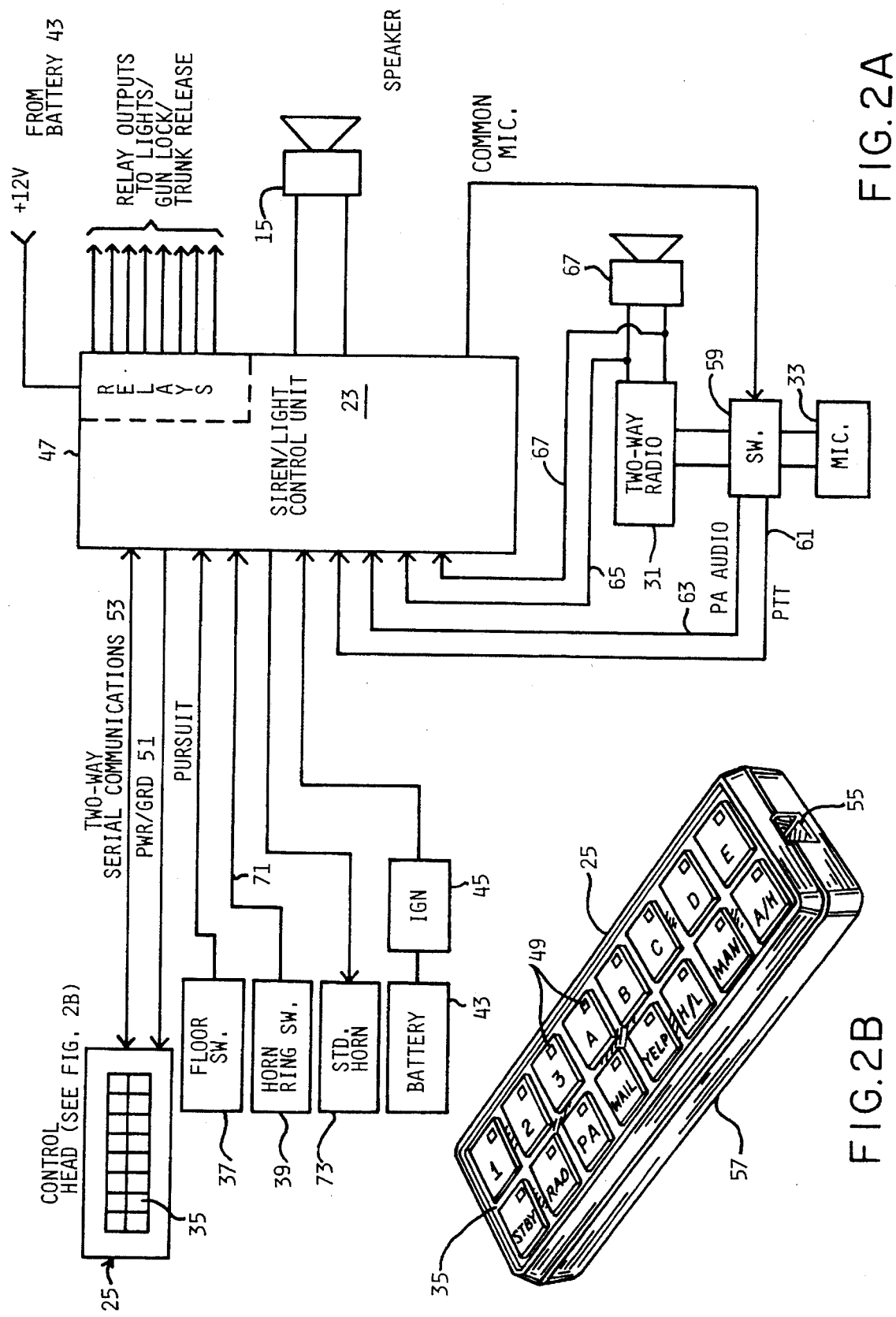
FIG. 2A is a schematic diagram of the signalling system of FIG. 1, including a speaker and emergency lights that are programmable by way of a control head preferably mounted at a location which is convenient to the driver of the vehicle as shown in FIG. 1.
FIG. 2B is a perspective view of the control head of the signalling system including a keypad for programming and operating the signalling system in accordance with the invention.

Referring to FIGS. 2A and 2B, the electronics of the control unit 23 of FIG. 1 receives power from a battery 43 of the vehicle by way of an ignition circuit 45 in a conventional manner. Because of the power requirements of the lights 17–21, 17'–21' of the light bar 13 of FIG. 1, they receive power from the battery 43 by way of a separate circuit that includes relays 47, which form part of the control unit 23.

In accordance with the invention, the control unit 23 is programmable by way of the keypad 35 of the control head 25 to provide a mechanism for modifying operation of the system. In the illustrated embodiment, the control unit 23 operates the light bar in three alternative operating modes and a standby mode (i.e., system power applied, but not operating). By way of keystrokes to the keypad 35, the control unit 23 may be placed into a program mode wherein the signalling characteristics of each operating mode can be modified and tailored as desired without necessitating direct access to the circuitry of the control unit. In an installed system, each of the operating modes can be modified simply by first entering the control unit 23 into its program mode by way of keystrokes to the keypad 35 and then entering the appropriate programming command again by way of keystrokes to the keypad. Auxiliary features are also programmable by way of the keypad 35 as will be explained hereinafter.

Before describing the programming operation of the system, it is necessary to understand the operation of the system in its operating modes, assuming a particular configuration for each of the operating modes and other programmable features. For ease of understanding, the following description of the operation of the various operating modes and auxiliary functions is undertaken using the frame of reference of an operator. In other words, the operation will be described with respect to system responses to keystrokes to the keypad 35.

SYSTEM OPERATION

A. Start Up

Upon application of power by way of the battery 43 and ignition 45, the control unit 23 assumes a idle mode condition, meaning the system is not operating the lights and speaker.

A keystroke to one of the keys "1", "2" or "3" of the keypad 35 transfers the system from its idle mode to one of the operating modes. In an operating mode, the system may activate either the lights or the speaker or both. Also, a keystroke to the "RAD" key will transfer the system to a radio rebroadcast mode, and a keystroke to the "PA" key will transfer the system to a public address mode. A second keystroke to any of these keys will return the system to its idle mode. Alternatively, a keystroke to the "STBY" key will return the siren/speaker to a standby mode, meaning no tone will be generated in mode 3.

So that the operator is able to determine the present mode of the system, each of the keys of the keypad 35 is associated with an LED 49. As will become apparent hereinafter, the activation of each function in response to a keystroke is indicated by a flashing condition of the associated LED 49. For example, when system power is applied, the system initializes itself in the idle mode condition and all of the LEDs for operating modes 1, 2 and 3 are off. Either the LED 49 of the "STBY" key will be flashing or one of the LEDs of the "WAIL", "YELP" and "H/L" keys will flash. If the LED 49 of the "WAIL", "YELP" or "H/L" key is flashing, the siren tone generated in operating mode 3 of system operation will be a wail, yelp or high/low sound, respectively.

Power to the control head 25 is provided by way of a power and ground connection (PWR/GRD) 51 derived from the control unit 23. Communications between the control head 25 and the control unit 23 is by way of hardwired serial communications lines 53, one for transmitting and a second for receiving. The serial communications lines 53 and the power lines 51 can be implemented by way of a conventional line for a telephone handset. As suggested by the recessed area 55 on the housing 57 of the control unit 25, the connector for the serial communications lines 53 may be a conventional telephone snap-fit connector (not shown).

B. Operating Modes 1, 2 and 3

A keystroke to any one of the keys "1", "2" and "3" will place the system in one of its signalling operating modes. Each of the operating modes is intended for particular types of emergency situations. Typically, the operating modes are configured to provide a range of signalling intensity. For example, operating mode 1 is activated by a keystroke to key "1" and may provide low intensity signalling such as flashes only and no siren. Operating mode 2 is activated by a keystroke to key "2" and may activate a more intense signalling configuration such as the simultaneous operation of the flashing lights and rotators. Operating mode 3 is activated by a keystroke to key "3" and may activate the most intense signalling configuration, one that is usually used for pursuing a vehicle and similar extreme emergency situations. In operating mode 3, the system may be configured to simultaneously operate the flashing lights 17, 17', the rotators 19, 19', the beacons 21, 21' and the speaker 15. As indicated in connection with the explanation of the start up of the system, the siren tone generated in operating mode 3 may be either a wail, yelp or high/low sound. As an additional alternative, no siren tone may be generated in operating mode 3. In such a case, the LED 49 of the "STBY" key will flash.

In keeping with the invention, the siren tone selected for generation in operating mode 3 when system power is first applied is selected in a programming mode as explained hereinafter. If one of the wail, yelp or high/low tones is selected, the operator will be prompted upon power up that one of these tones has been selected when the system was programmed by way of the flashing LED 49 associated with the appropriate one of the keys "WAIL", "YELP" or "H/L". If none of the LEDs of these keys is flashing upon power up of the system, no tone has been preselected for generation in operating mode 3. In such a case, the LED 49 of the "STBY" key will flash. Assuming at least of one of the tones was enabled in the program mode (as explained hereinafter), the operator of the vehicle can add a tone to operating mode 3 by simply pressing the appropriate one of the keys "WAIL", "YELP" or "H/L."

C. Auxiliary Functions

Keys "A", "B", "C", "D" and "E" of the keypad 35 control auxiliary functions that preferably may be activated in mode 0 or any of the operating modes and also in the idle mode. Examples of auxiliary functions for these keys are as follows: "A"—gun lock release (not shown); "B"—trunk release (not shown); "C"—left alley light 21; "D"—right alley light 21'; and "E"—take-down light (part of 21 and 21'). A keystroke to any of the keys "A"–"E" will activate the associated auxiliary function either in a timeout mode (e.g., eight seconds), an on/off mode or a momentary-on mode (on only while key is pressed), depending on the programming for each function. In order for a keystroke to the "A" key to release the gun lock, the system provides a safety feature by requiring a keystroke to the "STBY" key after a keystroke to the "A" key within a predetermined time period (eight seconds) before enabling the function.

In the illustrated embodiment, a single microphone 33 is used by both the two-way radio 31 and the signalling system. In order to provide for the public address function of the signalling system, a switch 59 alternatively interfaces the microphone 33 to either the two-way radio 31 or the signalling system. The switch 59 is controlled by a control line "COMMON MIC" from the control unit 23. Specifically, a keystroke to the key "PA" enables push-to-talk ("PTT") line 61 and the "PA AUDIO" line 63 so as to direct signals from the microphone 33 to the control unit 23 and causes the LED 49 of the "PA" key to flash. In turn, the control unit 23 directs the audio signal to the speaker 15. The public address function can be disabled by either a second keystroke to the "PA" key.

For the radio rebroadcast feature of the signalling system, the two signal wires 65 and 67 to the radio speaker 69 are tapped and directed to the control unit 23. The control unit 23 enables/disables the speaker 15 for rebroadcasting the audio signal of the two-way radio 31. The control unit 23 enables the rebroadcast function in response to a keystroke to the "RAD" key. The operator of the vehicle 11 is aware that the function is enabled by way of the flashing LED associated with the "RAD" key. A second keystroke to the "RAD" key or a keystroke to the "STBY" key disables the rebroadcast function.

In the signalling system, pressing the horn ring 41 may function to enable a siren tone for either momentarily, a predetermined time period (e.g., eight (8) seconds) or until the horn ring is pressed again. When the horn ring 41 is pressed, the associated switch 39 is closed, and a signal is passed to line 71 and the control unit 23. If the horn ring/siren function is enabled during programming of the system, the signal from the switch 39 is not passed on to the standard horn 73 of the vehicle. Instead, the control unit 23 delivers a predetermined tone (peak-and-hold, wail, yelp, high/low or air horn) to the speaker/siren. In the preferred embodiment, each of the operating modes can be programmed to include the horn ring/siren function.

In an example of a possible system configuration, the horn ring/siren function may be enabled in each of the operating modes configured as previously described (i.e., siren only in mode 3). Pressing the horn ring 41 when the system is in operating modes 1 or 2 results in a peak-and-hold tone generated by the speaker 15 for as long as the horn ring is pressed. In mode 3, the siren may be activated to generate a wail, yelp or high/low tone. Activation of the horn ring/siren function in mode 3 will change the tone generated by the speaker 15 from the tone normally generated to another tone. For example, if no tone is programmed for mode 3 (the LED of the "STBY" key is flashing), pressing the horn ring 41 will generate the peak-and-hold tone for as long as the horn ring is pressed. If the wail tone is programmed for mode 3 (the LED 49 of the "WAIL" key is flashing), pressing the horn ring 41 will change the tone to a yelp tone. In the programming mode, the yelp tone can be selected to be timed out after the horn ring 41 is pressed or to be maintained until the horn ring is pressed again. If the yelp tone is programmed for operating mode 3 (the LED 49 of the "YELP" key is flashing), pressing the horn ring 41 will change the tone to a wail tone until the horn ring is pressed again. Finally, if the high/low tone is programmed for mode 3 (the LED 49 of the "H/L" key is flashing), pressing the horn ring 41 will momentarily change the tone to an air horn tone.

A keystroke to the "MAN" key will cause the speaker 15 to generate a peak-and-hold tone for as long as the key is pressed. The tone will end as soon as the key is released. In mode 3, a keystroke to the "MAN" key will transfer the speaker 15 from one tone to another in the same pattern as does the horn ring/siren function. The "A/H" key causes the system to momentarily generate an air horn tone. As with the other keys, when either the "MAN" or "A/H" key is pressed, the associated LED is flashing. Preferably, the "MAN" key and the "A/H" key are functional in all of the operating modes (1, 2, 3) and also in the idle mode.

In keeping with the invention, the floor switch 37 provides a signal to the control unit 23 for transferring the signalling system directly into operating mode 3, either from another operating mode or from the idle mode. By closing the floor switch 37a second time, operation of the signalling system changes from mode 3 to the idle mode. The floor switch 37 is preferably mounted to the floor board area of the vehicle 11 as illustrated in FIG. 1 so the operator of the vehicle can quickly transfer the signalling system into operating mode 3 by a simple tap of his/her foot to the switch. By allowing the system to enter operating mode 3 directly by merely pressing the foot switch 37, the operator can maintain his/her attention on the emergency situation and also keep both hands on the steering wheel 29.

Figure 3:
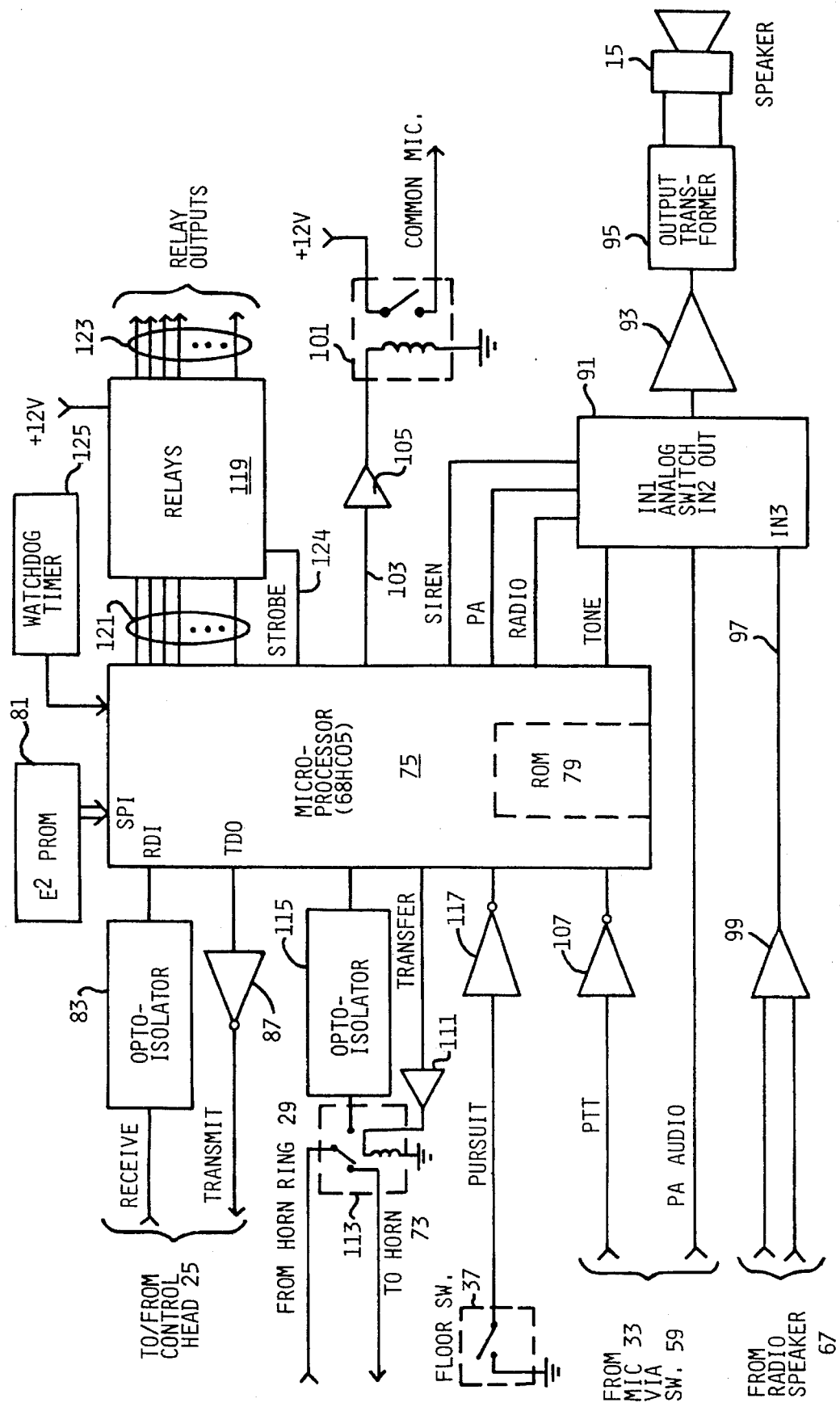
FIG. 3 is a schematic diagram of the control unit for the signalling system of the invention.

Each of the control circuit 23 and control head 25 of the signalling system includes a microprocessor, preferably the MC68HC05C4, manufactured by Motorola, Inc. of Austin, Tex. The microprocessor 75 of the control unit 23 is illustrated in FIG. 3. It and the microprocessor 77 of the control head 25 (FIG. 4) are in a conventional master/slave configuration, where the microprocessor 75 of the control unit 23 is nominally the master. The program executed by the control unit's microprocessor 75 is stored in a ROM 79 internal to the microprocessor 75. The programming of the signalling system is stored in a E$^2$PROM 81 that is connected to the SPI input of the microprocessor in a well-known manner. A listing of the program stored in the ROM 79 according to the preferred embodiment of the invention appears at the end of this specification as Appendix A. On the receive input (RDI) of each microprocessor 75 and 77, an opto-isolator circuit 83 and 85, respectively, protects the receive inputs by isolating them from the noise of the power and ground of the system. The transmit output (TDO) of each microprocessor 75 and 77 is associated with a buffer/inverting amplifier 87 and 89, respectively.

One of three sources of audio signals may be provided to the speaker 15 via an analog switch 91 in response to control signals from the microprocessor 75. The first source is one of the tone signals (i.e., peak-and-hold, yelp, wail, high/low, air horn) generated in the preferred embodiment by the microprocessor 75 when the system is in operating mode 3 or when the appropriate one of the auxiliary functions is selected as previously explained. The signals for each of the tones are generated by a software subroutine stored with the main program in ROM 79 and executed by the microprocessor 75. The second source of audio signals for the speaker 15 is the microphone 33 for execution of the PA function. The third source is the output of the two-way radio 31 for execution of the radio rebroadcast function. The tone, PA and radio audio signals are received by the analog switch 91 at labeled inputs "IN1", "IN2" and "IN3" respectively. The analog switch 91 is a commercially available device such as MC14066B switch/multiplexer, manufactured by Motorola of Phoenix, Ariz.

Which one of the three sources of audio signals is presented to the speaker 15 is determined by which of the three control lines "SIREN", "PA" or "RADIO" is made active by the microprocessor 75. In response to an active control line, one of the audio signals is passed from the inputs of the analog switch 91 to its output labeled "OUT." For example, in response to a command from the foot switch 37 or the control head 25 to enter operating mode 3, the microprocessor 75 activates the "SIREN" control line in order to allow the analog switch 91 to pass the signal on the "TONE" line to the speaker 15 via a buffer amplifier 93 and an output transformer 95. For siren tones generated in auxiliary functions, the microprocessor 75 responds the same as in mode 3 and activates the "SIREN" control line, allowing the "TONE" signal to pass to the speaker 15.

A keystroke to the "RAD" key causes the microprocessor 75 to activate the "RADIO" control line, which causes the analog switch 91 to pass the radio signal 97 at the "IN3" input. A buffer amplifier 99 of conventional design is used to convert the audio signal from the two-way radio 31 to a one-wire signal referenced to a system ground for control by the analog switch 91.

For the public address function, the "PA" key is first pressed. The microprocessor 75 responds to the signal from the control head 25 on the receive side of the two-way communications path 53 by enabling the "COMMON MIC" line. The "COMMON MIC" line is enabled by energizing a relay 101 by way of an output signal 103 from the microprocessor 75. The low power output signal 103 is passed through a buffer/amplifier 105 to provide it with sufficient power to energize the relay 101.

With the "COMMON MIC" line enabled, the audio of the microphone 33 is directed to the "IN2" input of the analog switch 91. The push-to-talk signal is directed to an input to the microprocessor 75 via an inverting buffer/amplifier 107. In response to the keystroke to the "PA" key, enabling the public address functions, closure of the push-to-talk (PTT) switch of the microphone 33 will cause the microprocessor 75 to activate the "PA" control line, which in turn will allow any signal on the "AUDIO" line to pass through the analog switch 91 to the speaker 15.

To enable the horn ring/siren function in any of the operating modes, a "TRANSFER" line from the microprocessor 75 is activated. The signal on the "TRANSFER" line is boosted by way of a buffer/amplifier 111 so that it is capable of energizing relay 113. Energized relay 113 redirects the signal from the horn ring 41 to the microprocessor 75 via an opto-isolator 115. In its unenergized state, the signal from the horn ring 41 and horn ring switch 39 is directed to the standard horn 73 of the vehicle 11.

The signal from the floor switch 37 is delivered to an input of the microprocessor 75 via an inverting buffer/amplifier 117. In response to the signal, the system is placed in mode 3, the "SIREN" control line is activated and a tone generated on the "TONE" line by the microprocessor 75 is passed through the analog switch 91 to the speaker 15.

The bank of relays 47 of the control unit 23 is responsive to control signals generated on control lines 121 by the microprocessor 75 in response to keystrokes to the keypad 35 of the control head 25 and closure of the floor switch 37. Power to the relays 47 is provided directly from the battery 43 of the vehicle 11 in order to provide the needed power to the devices attached to the outputs 123 of the relays. The bank of relays 47 includes a latch and driver for each relay. The control signals are strobed into the latch by way of a "STROBE" signal 124 from the microprocessor 75.

In the preferred embodiment, the outputs 123 of the relays 47 provide selective power to the lights 17–21 and 17'–21' of the light bar 13. The outputs may also control conventional gun lock and/or trunk release mechanisms. The control lines 121 are under program control and each of the control lines can be programmable in the program mode. Each control line is associated with a power circuit controlled by one of the relays 47. One of the control lines 121 for example, may energize one of the relays 47 that completes the power circuit for the flashing lights 17 and 17'. Another one of the control lines 121 may energize one of the relays 47 that completes the power circuit for the rotators 19 and 19'. Another one of the control lines 121 may energize one of the relays 47 that completes the power circuit for the lights 21 and 21'. In the programming mode, the flashing lights 17 and 17' and rotators 19 and 19' can be disabled or enabled for each one of the operating modes. The lights 21 and 21' are considered auxiliary lights. They are enabled for all modes of operation and are energized by keystrokes to one of the auxiliary keys as discussed earlier.

In a well-known manner, a watchdog timer 125 is connected to the microprocessor 75 for detecting malfunctions in the system program.

Figure 4:
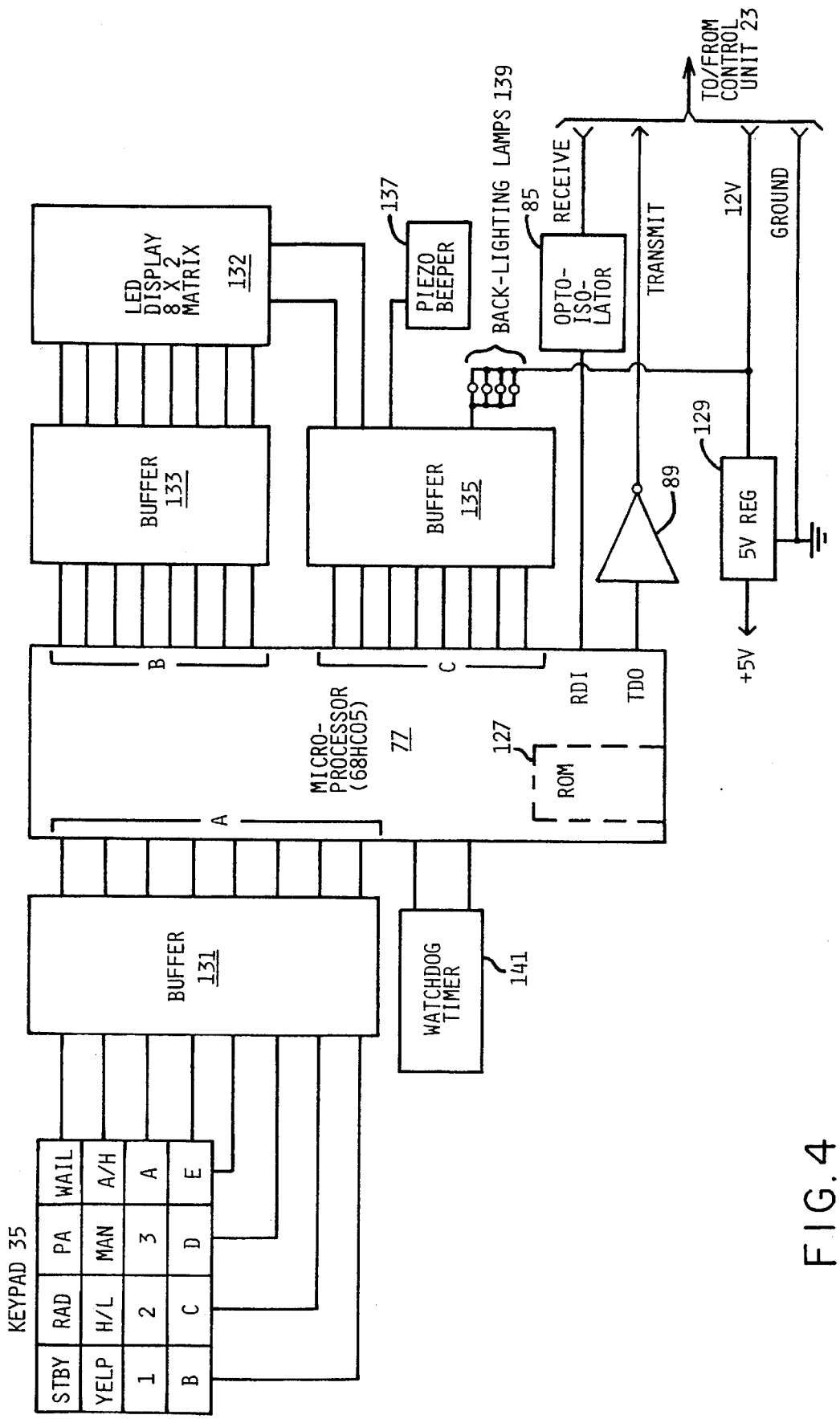
FIG. 4 is a schematic diagram of the circuitry comprising the control head of the signalling system.

The slave microprocessor 77 of the control head 25 executes a program stored in a ROM 127 internal to the microprocessor as shown in FIG. 4. A listing of the source code for the program according to a preferred embodiment appears at the end of this specification as Appendix B. A regulator circuit 129 receives power from the control unit 23 and converts it to a regulated five (5) volts to power the microprocessor 77 and associated circuitry in the control head 25. Input ports "A" to the microprocessor 77 receive keystroke signals from the keypad 35. The keypad 35 is laid out as a four-by-four matrix that is buffered by a conventional buffer 131 such as a 74LS240 manufactured by Texas Instruments, Dallas, Tex.

The microprocessor 77 identifies keystrokes to the keypad 35 and transmits the information to the microprocessor 75 from its TDO output. Also, the LEDs 49 of the keypad 35 are controlled by the microprocessors 75 and 77 in response to keystrokes as described earlier. The LEDs are configured in an eight-by-two matrix 132 and connected to output ports "B" of the microprocessor 77 by way of a conventional buffer 133. A third conventional buffer 135 receives outputs from output ports "C" of the microprocessor 77. This buffer provides the two control lines for the columns of the LED matrix 132. A piezoelectric beeper 137 is selectively energized by the microprocessor 77 by way of the buffer 135 in response to a keystroke to a key of the keypad. Finally, in order for the keypad and keys to be visible at night, a gang of back-lighting lamps 139 are powered by the microprocessor 77 by way of the buffer 135. Like the microprocessor 75 of the control unit 23, the microprocessor 77 includes a watchdog timer 141.

Figure 5:
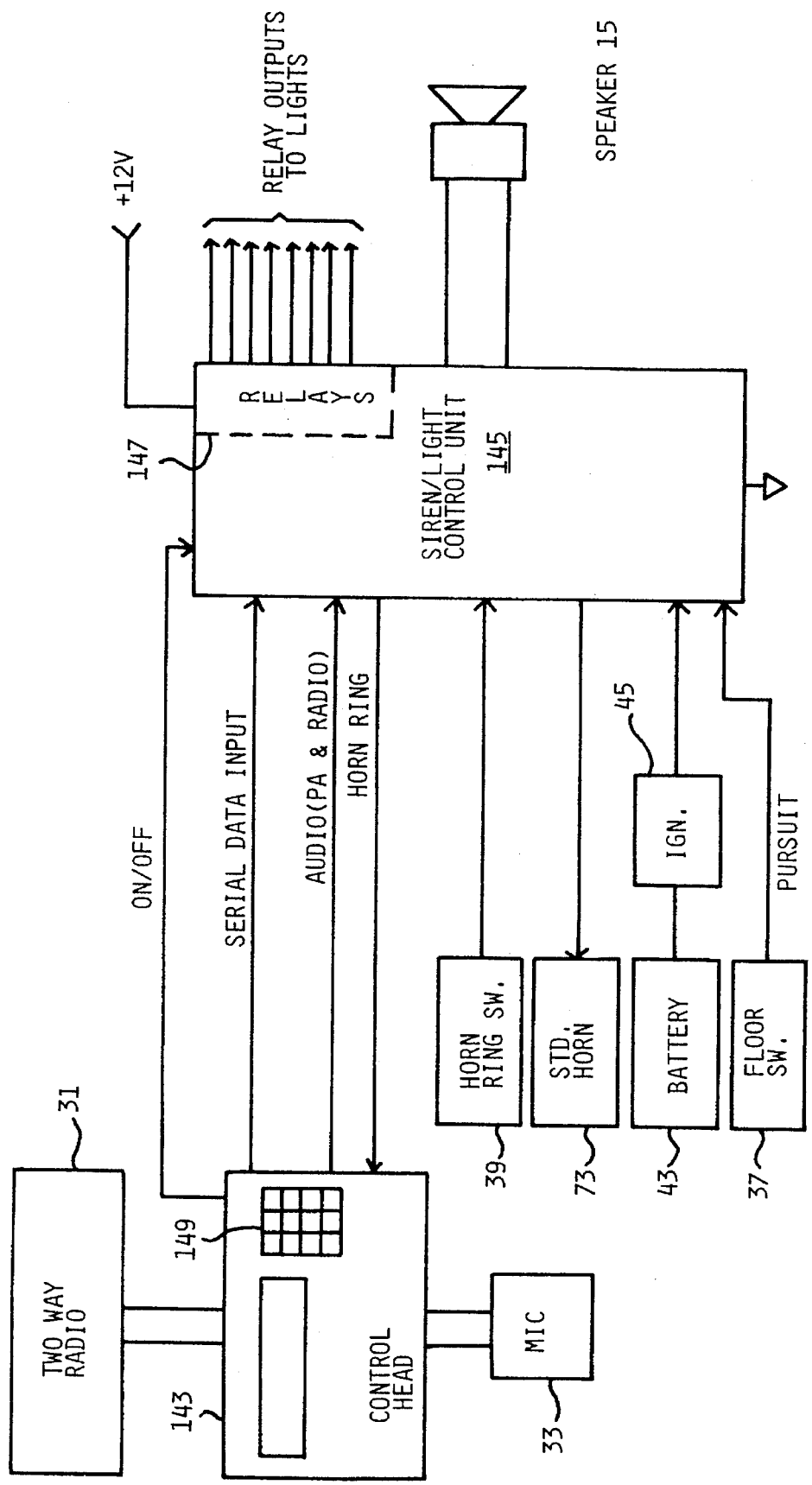
FIG. 5 is a schematic diagram of an alternative embodiment of the signalling system in accordance with the invention wherein the programming of the system is accomplished in a control head for a two-way radio mounted in the passenger compartment of the vehicle.

In an alternative embodiment of the invention, the control head of the signalling system is incorporated in the control head 143 of the two-way radio 31 as illustrated in FIG. 5. As this embodiment illustrates, the invention can be implemented in multi-purpose system that integrates the signalling system for the vehicle 11. In systems such as these, keystrokes to a single keypad may provide operator commands for both the signalling system and other vehicle systems such as the two-way radio 31. In the illustrated embodiment of FIG. 5, keystrokes to a keypad 149 provides operator control for both the two-way radio 31 and the signalling system. In order to program the signalling system, the keypad 149 functions essentially the same as the keypad 35 of the embodiment illustrated in FIGS. 1–4. Alternatively, programming of the signalling system may be accomplished by a detachable keyboard that communicates with the system by way of a serial port. The detachable keyboard may be a laptop personal computer (PC) capable of placing the signalling system into its programming mode and providing signals at the serial port generated by keystrokes to the keypad of the PC for programming the system.

Although the architecture of the system of FIG. 5 may take various specific forms, depending on system design requirements, the illustrated architecture shows the microprocessor of the control unit 145 configured in a master/slave relationship with the microprocessor of the control head 143. Unlike the embodiment of FIGS. 1–4, the microprocessor of the control unit 145 in FIG. 5 is the slave microprocessor in that the software for the program and operating modes is executed by the microprocessor of the control head 143. Commands generated during the execution of this software are communicated to the slave microprocessor of the control unit 145 by way of a "SERIAL DATA INPUT" line from the control head 143 of the two-way radio 31 to the control unit 145. The control unit 145 and its microprocessor respond to the commands from the control head by activating one or more of the relays 147 and/or the speaker 15 in the same manner as previously described in connection with the embodiment of FIGS. 1–4. In a manner similar to the embodiment of FIGS. 1–4, keystrokes to a keypad 149 set the signalling system in either its program mode or one of its operating modes. The keypad 149 also controls the operation of the two-way radio 31 and the microphone 33. An example of a radio control head 149 suitable for implementing the system of FIG. 5 is a model no. S825 radio control head, manufactured by General Electric Co. of Lynchburg, Va.

Audio signals from the microphone 33 (PA function) or the radio 31 (rebroadcast function) are provided to the control unit 145 by way of the "AUDIO" line. In response to data from the control head 143, audio signals are selectively passed to the speaker 15 to provide the same type of functioning for the signalling system as described in connection with the embodiment of FIGS. 1–4.

If the horn ring/siren function has been enabled, closure of the horn ring switch 39 is indicated to the control head 143 on the line "HORN RING." In response to a "HORN RING" signal, command signals are provided to the slave microprocessor of the control unit 145 by way of the SERIAL DATA INPUT line in order to momentarily activate the siren/speaker 15. As in the embodiment of FIGS. 1–4, the standard horn 73 is activated when the horn ring/siren function is disabled. The function is enabled or disabled by the microprocessor of the control unit 145 in response to commands from the control head 143.

Power is applied to the electronics of the control unit 23 by way of the battery 43 and ignition 45. Battery voltage is applied to the lights and auxiliary functions by way of separate circuit as in the embodiment of FIGS. 1–4. Finally, a power "ON/OFF" signal is derived from the control head 143 for turning the control unit 145 on and off with the control head.

Before turning to a discussion of the flow diagrams of FIGS. 6A–6D, 7A–7C and 8, it should be noted that these diagrams are in reference to the embodiment of FIGS. 1–4. These flow diagrams are also illustrative of the software required for the embodiment of FIG. 5. The specific programming of each of the two microprocessors in a system such as that of FIG. 5 may be different from that of Appendixes A and B, as will be appreciated by those familiar with programming microprocessor-based systems. Also, if the keyboard of a PC is used to program the system, a three microprocessor configuration is created, thereby necessitating distribution of the programming function among these three microprocessors, instead of the two in the embodiments of FIGS. 1–4 and 5.

PROGRAMMING

Referring to the flow diagram of FIGS. 6A–6D, the signalling system enters a programming mode when the "STBY" key is pressed as power is applied to the system as indicated by steps 151, 153 and 155. The system indicates to the operator that it is in the programming mode by flashing the LEDs 49 of the keypad 35 at a flashing rate much greater than that used in the operating modes. In step 157, the system initiates a timer within the microprocessor 75 in order to provide a timeout period for the programming mode after the programming has been completed. In step 159, the system exits the programming mode if the timer has expired and enters a idle mode (i.e., power on but not functioning). Otherwise, the system proceeds to step 161. In this step, if a keystroke has not been detected, the system returns to step 159 and again checks the timer and continues in this loop until the timer has expired or until a keystroke is detected.

If a keystroke is detected before the timer has expired, the system moves to step 163 in order to determine if one of the siren keys has been pressed. If there has been a keystroke to one of the siren keys, the system moves to the steps of FIG. 6D. If the keystroke is not identified with a siren key, then the system next determines if the keystroke is associated with one of the auxiliary functions at step 165. If the keystroke is to one of the auxiliary keys, the system moves to the steps of FIG. 6C. Finally, if the keystroke was to neither the siren nor the auxiliary function, the system determines if the keystroke was to one of the operating mode keys "1", "2" or "3" in step 167. If the keystroke was to a key that is not programmable (e.g., the "PA" or "RAD" key), the system returns to step 159 and determines whether the timer has expired.

Figure 6A:
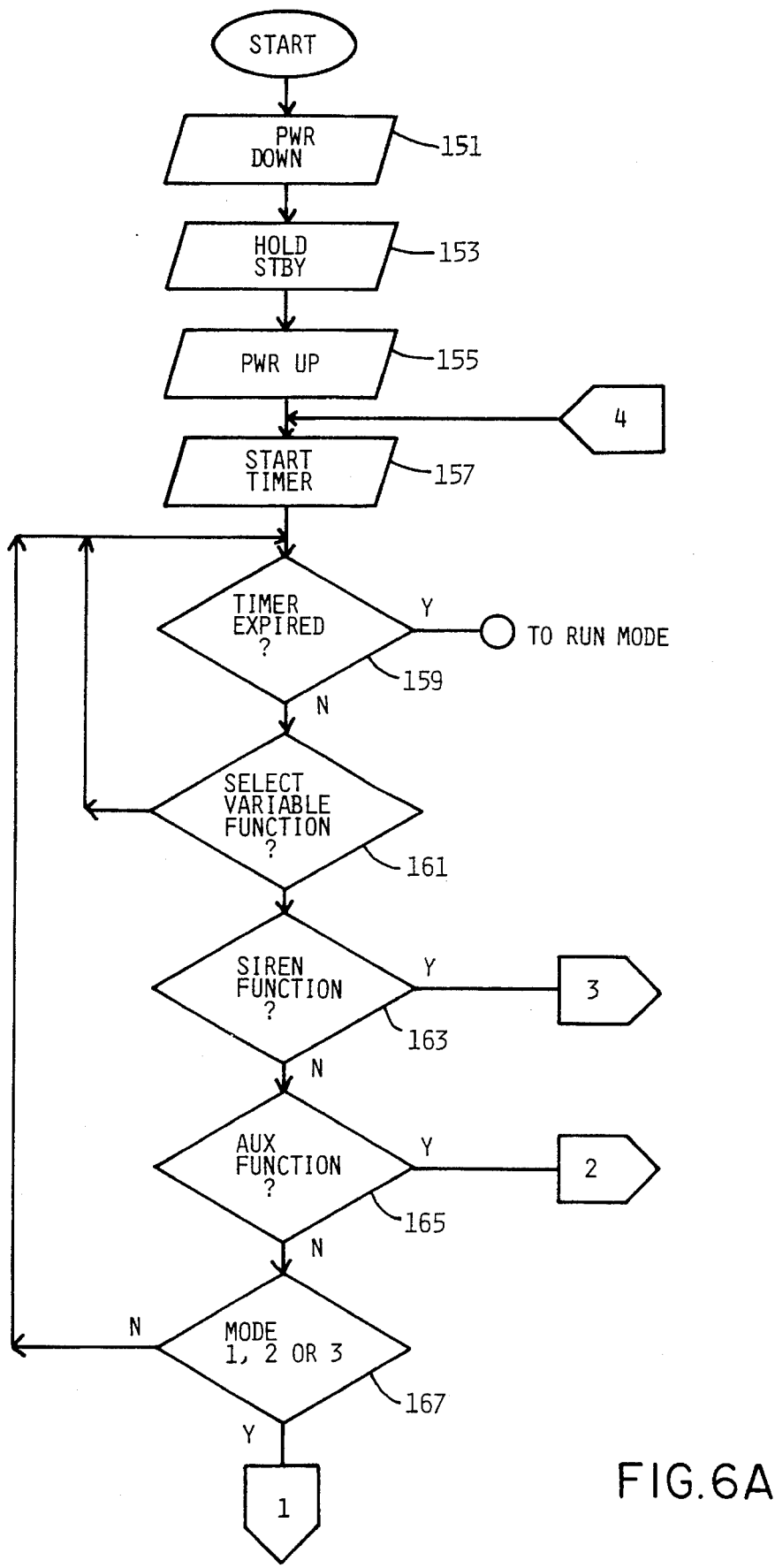
FIGS. 6A–6D are a flow diagram of a program executed by the signalling system in order to implement a program mode of operation for selecting the signalling features to be operated by the system in each of its operating modes.
Figure 6B:
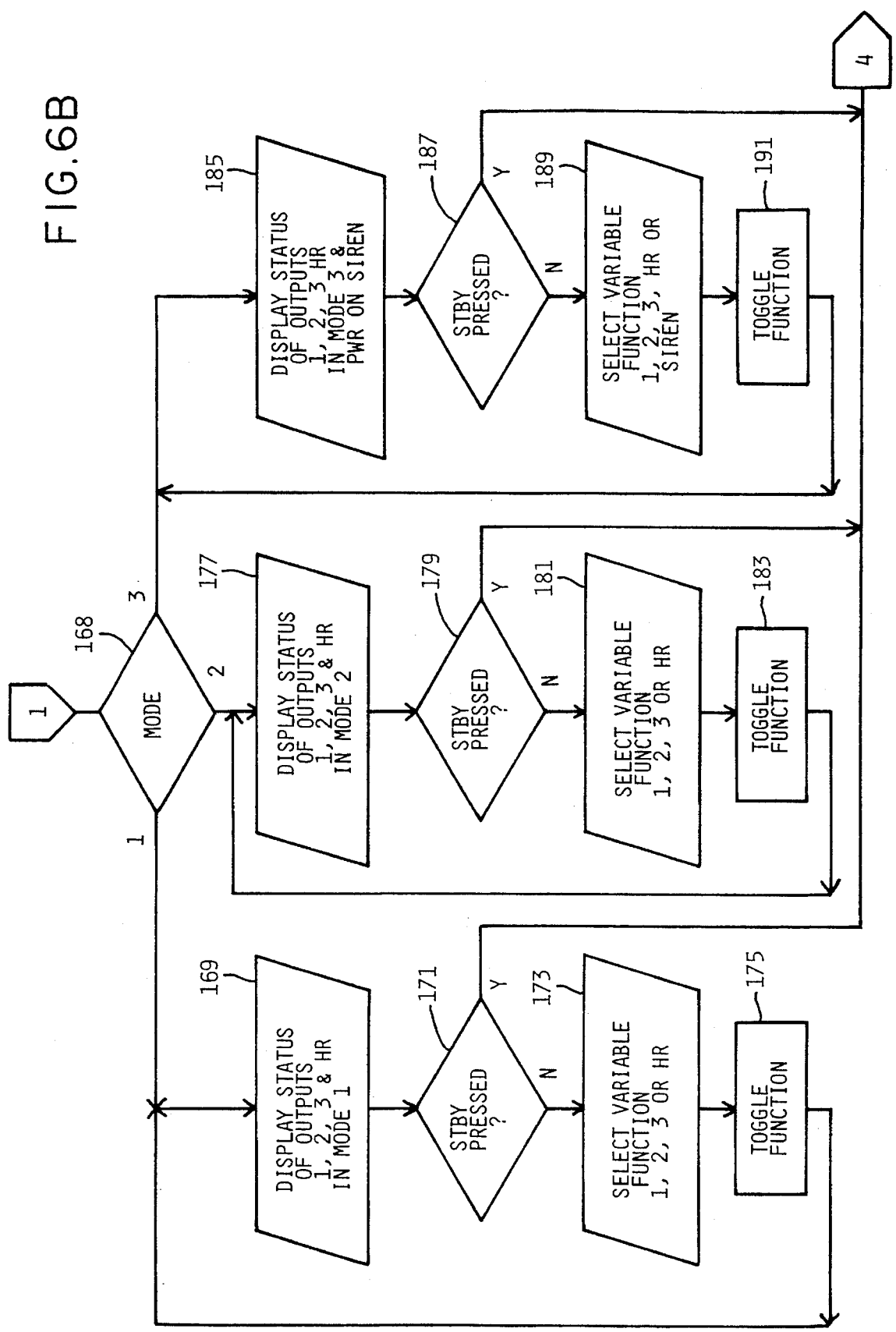

If one of the mode keys "1", "2" or "3" has been pressed, the system branches in step 168 to one of three loops each comprising a series of steps in FIG. 6B for programming the selected operating mode 1, 2 or 3, respectively. For purposes of illustration, assume that the operator has pressed mode key "1" in the embodiment of the invention illustrated in FIGS. 2A and 3. In response to the keystroke to the mode "1" key, the microprocessor 77 of the control head 25 generates a data character and transmits it to the control unit 23 by way of the two-way communications line 53. In response to receiving the data character, the microprocessor 75 of the control unit 23 instructs the microprocessor 77 of the control head 35 to display the present programming condition of the mode. In the preferred embodiment, three relay circuits control the lights of the light bar 13 (e.g., one for flashing lights, one for rotators and one for beacons). If all of the relays are to be activated in mode 1, the microprocessor 75 will instruct the microprocessor 77 to flash all three of the LEDs 49 of the keys "1", "2" and "3".

Also in accordance with the preferred embodiment, the horn ring/siren feature can be enabled or disabled by the operator in the programming mode. If the horn ring/siren feature is selected for operating mode 1, the microprocessor 75 will indicate this to the operator by instructing the microprocessor 77 of the control head 35 to flash the LED 49 of the "MAN" key.

If the present programming of mode 1 is satisfactory, the operator simply presses the "STBY" key in step 171 and the system returns to step 157 and the timer will timeout and the system will transfer to the idle mode if no other programmable key is pressed.

After the initial keystroke to the "1" key, the program moves to step 169 where the status of each of the relays 47 for operating mode 1 is indicated by the LEDs 49 for each of the keys "1", "2" and "3". If the operator wishes to change the features of operating mode 1, a keystroke to one of the keys "1", "2", "3" or "MAN" will toggle the associated function from on to off or from off to on in steps 173 and 175. Using the previous example, if each of the keys "1", "2", "3" and "MAN" are flashing their respective LEDs 49, all three of the relay circuits for the lights of the light bar 13 are enabled for operating in mode 1 and the horn ring/siren feature is also enabled. Keystrokes to keys "2" and "3" will toggle the status of the associated relays of the relay bank 47 (i.e., from enabled to disabled) so that only the one of the three relays represented by key "1" will be enabled in operating mode 1. A second keystroke to one of the keys "2" or "3" will again toggle the status of the associated relay of the relay bank 47, returning it to its original status. Once the operator is satisfied with the programmed status of operating mode 1, a keystroke to the "STBY" key as detected in step 171 will exit the programming loop for mode 1 and return the system to step 157 in FIG. 6A as previously explained.

In the preferred embodiment, the programming of operating mode 2 is identical to the programming of operating mode 1 since the same optional features are available for each of these operating modes. However, operating mode 3 includes the option of selecting a siren tone to be initialized by the system upon system power up. In this regard, after the system has been powered up, it sets to a predetermined siren tone for generation in operating mode 3 as determined in the programming mode, the operator can override this initial selection by a simple keystroke to any of the available siren tones of yelp, high/low or wail.

Referring to the steps 177–183 for the programming of mode 2, in the preferred embodiment, each of the three relays of the relay bank 119 can be enabled for activation in operating mode 2, just like mode 1. Also like operating mode 1, the horn ring/siren feature can be selectively enabled for operating mode 2. Because the steps of the programming for the operating mode 2 are the same as those for mode 1 that have previously been explained in detail, the steps of 177, 179, 181 and 183 for programming operating mode 2 will not be repeated herein.

The programming of operating mode 3 in steps 185–191 is similar to the programming of modes 1 and 2. In step 185, the system responds to a keystroke to the "3" key by indicating which relays are presently programmed for mode 3, which tone if any is programmed to be initialized upon power up and whether the horn ring/siren function is enabled. The programmed status of operating mode 3 is indicated by the LEDs 49 of the associated keys "1", "2", "3" and "MAN" and one of the keys "WAIL", "YELP", "H/L" or "STBY". The first group of keys "1", "2" and "3" indicates which ones of the relays of the relay bank 47 will be activated by the system in operating mode 3. For the programming of the lights of the light bar 13 in mode 3, the steps are identical to those for programming modes 1 and 2. Also, programming the horn ring/siren function is the same in mode 3 as it is for programming in modes 1 and 2. A keystroke to the "MAN" key will toggle the horn ring/siren function from on to off or from off to on, depending on its initial state before the keystroke to the "MAN" key. Unlike the programming of modes 1 and 2, however, the programming of mode 3 provides for an initial siren tone to be set for generation in mode 3. This programmed siren tone is used by the system to initialize the status of operating mode 3 upon power up. After power up, a different siren tone or no tone at all can be selected by the operator for operation in mode 3 by a simple keystroke to the appropriate key, thereby overriding the tone selected in the programming mode.

Figure 6C:
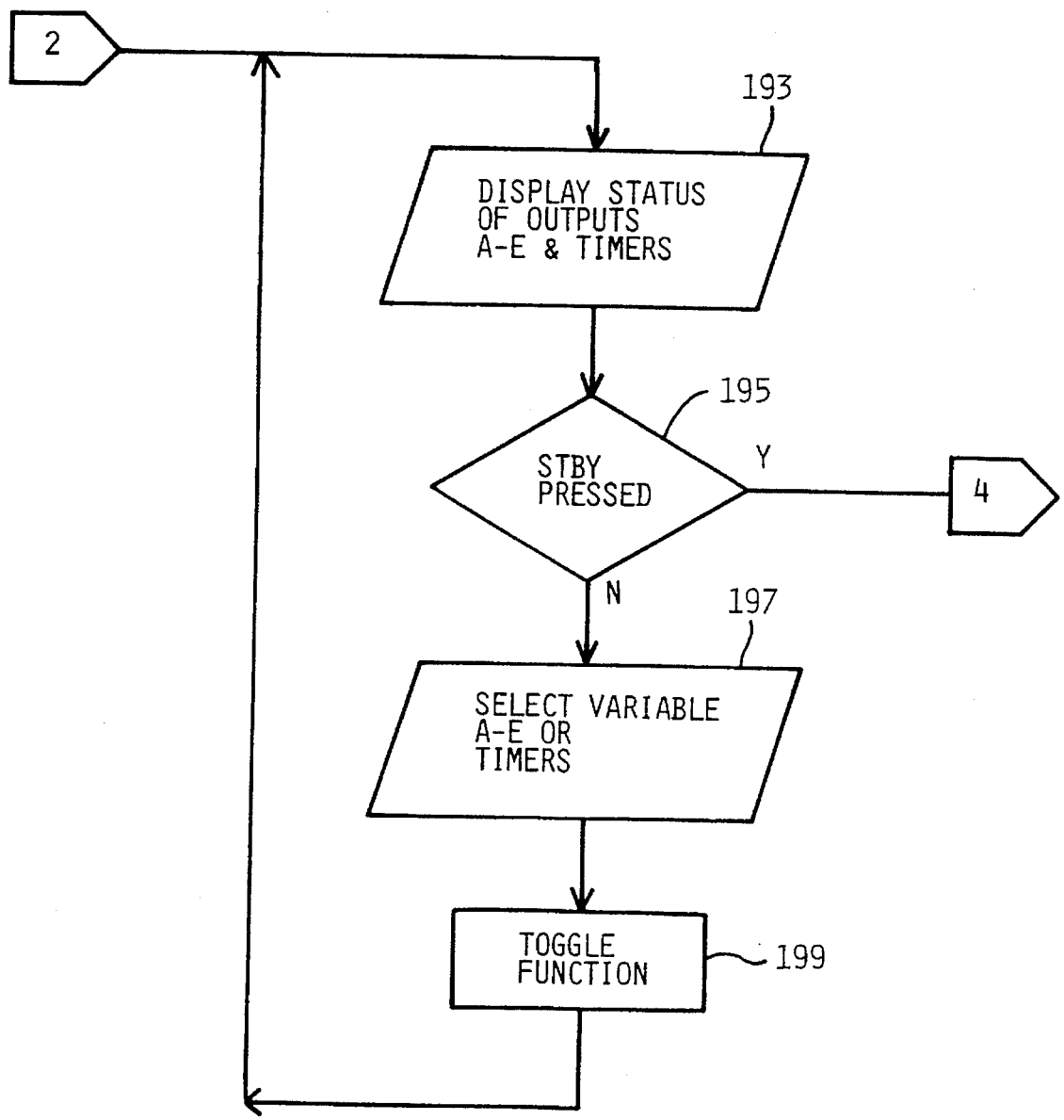

If a keystroke to one of the auxiliary keys "A"–"E" is detected in step 165 while in the programming mode, the system program executes the steps of FIG. 6C. In response to a keystroke to one of the auxiliary keys, the microprocessor 75 communicates the present status of all the auxiliary features to the microprocessor 77 of the keypad 35 in step 193. The microprocessor 77 displays the status by activating the appropriate ones of the LEDs 49 of the group of keys "A"–"E". If the operator is satisfied with the present programming of the auxiliary features, a keystroke to the "STBY" key in step 195 will exit the system from programming of the auxiliary functions back to the main programming loop of steps 157–167 of FIG. 6A. If the operator wishes to modify the operation of the auxiliary features, a keystroke to any one of the keys "A"–"E" will toggle the function as indicated by steps 197 and 199.

In accordance with the preferred embodiment, each of the auxiliary functions is controlled by one of the auxiliary keys "A"–"E" and the key immediately below that auxiliary key on the keypad 35—i.e., "WAIL", "YELP", "H/L", "MAN" or "A/H". In the preferred embodiment, each of the auxiliary keys toggles the associated LED 49 between an off condition and a flashing on condition. In an off condition, the auxiliary function is programmed as a momentary on activation, meaning that the function is activated only as long as the key is pressed. If the auxiliary key is toggled so that the associated LED 49 is in a flashing on condition, the auxiliary feature is programmed to provide an on/off activation, meaning that each keystroke toggles the feature either from on to off or from off to on when the system is in one of its operating modes or in its idle mode.

A third alternative response for a keystroke to one of the auxiliary keys can be programmed by first toggling the auxiliary key in the programming mode to a state in which the associated LED 49 is flashing. With the LED 49 of the auxiliary key flashing, a keystroke to the siren tone key directly below the auxiliary key will result in programming the auxiliary function as a timeout feature, meaning that a keystroke to the auxiliary key in one of the operating modes or idle mode will activate the function for a predetermined time period. For example, in the programming mode, a keystroke to the auxiliary key "B", toggles the function into an on/off condition, indicated by the flashing LED 49. In order to convert the feature to a timeout feature, a second keystroke to the "YELP" key causes the microprocessors 75 and 77 to activate the LED 49 of the "YELP" key. With the LEDs 49 of both the keys "B" and "YELP" flashing, the programmer knows that the timeout feature has been selected for the auxiliary function activated by a keystroke to the "B" key when the system is in one of its operating modes or its idle mode.

Each of the auxiliary keys "A"–"E" can be programmed in the same manner as the foregoing example given with respect to auxiliary key "B". In the preferred embodiment, however, the programming of the auxiliary key "A" as a timeout feature causes the system to implement a security lockout of the feature that can only be overcome by pressing the "STBY" key within a predetermined time period after the keystroke to the "A" key.

After the operator has selected the desired programming for each of the auxiliary keys, a keystroke to the "STBY" key in step 195 will return the system to the main programming loop of steps 157–167 in FIG. 6A. With the microprocessor 75 executing the main programming loop, if there is not a keystroke to one of the programmable functions within the period of the timer, the program mode is terminated and the system transfers to its idle mode.

Figure 6D:
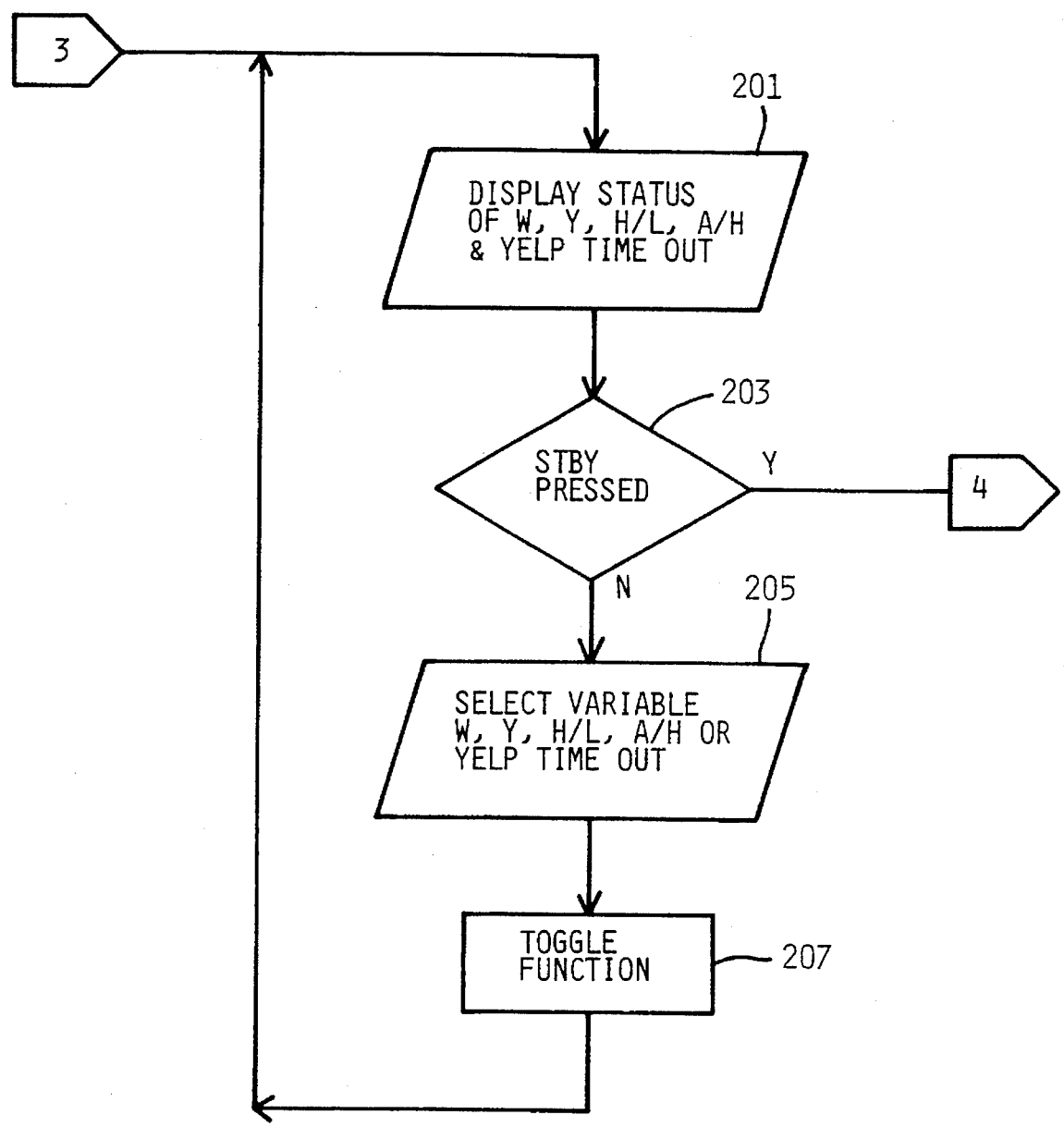

In order to program the siren tones available in the operating modes, a keystroke to one of the siren tone keys ("WAIL", "YELP", "H/L", "MAN" or "A/H") while the system is in the main programming loop will cause the programming mode to transfer from step 163 to the programming steps of FIG. 6D. After the initial keystroke to one of the tone keys, the microprocessors 75 and 77 display the present programmed status of the siren tones at step 201. Any of the tones, wail, yelp, high/low and air horn may be disabled by a simple keystroke to the associated siren tone key. For example, if the initial programming indicates that the high/low siren tone is available in the operating mode (i.e., a flashing LED 49 of the "H/L" key), a keystroke to the "H/L" key will toggle the function in accordance with steps 205 and 207 in FIG. 6D so that the high/low siren tone will be disabled and not available in any of the operating modes. Each of the other tones can be similarly disabled or enabled by a keystroke to the associated key, which toggles the tone between enabled and disabled conditions.

In accordance with the preferred embodiment, the yelp tone can be programmed as a timeout tone for the horn ring/siren function in addition to being programmed to be either enabled or disabled for the operating modes. Specifically, a keystroke to the "YELP" key causing the system to activate the associated LED 49 will enable the yelp tone for selection in one of the operating modes. By a second keystroke to the "B" key, the horn ring/siren function is provided with the feature of a timed-out yelp tone when the horn ring 41 is pressed while the system is generating a wail tone. In such a situation, pressing the horn ring 41 will cause the system to transfer to a yelp tone for a predetermined time period and then automatically return to the wail tone. If the "B" key is not pressed while programming the yelp tone, pressing the horn ring 41 in any of the operating modes will transfer the tone from wail to yelp (assuming the horn ring/siren function has been enabled in the programming mode), and the siren will continue to generate a yelp tone until the horn ring is again pressed to toggle the siren back to a wail tone. After the tones have been programmed, a keystroke to the "STBY" key returns the program to the main programming loop in step 203 where it may time out, exit the programming mode and enter the idle mode.

Figure 7A:
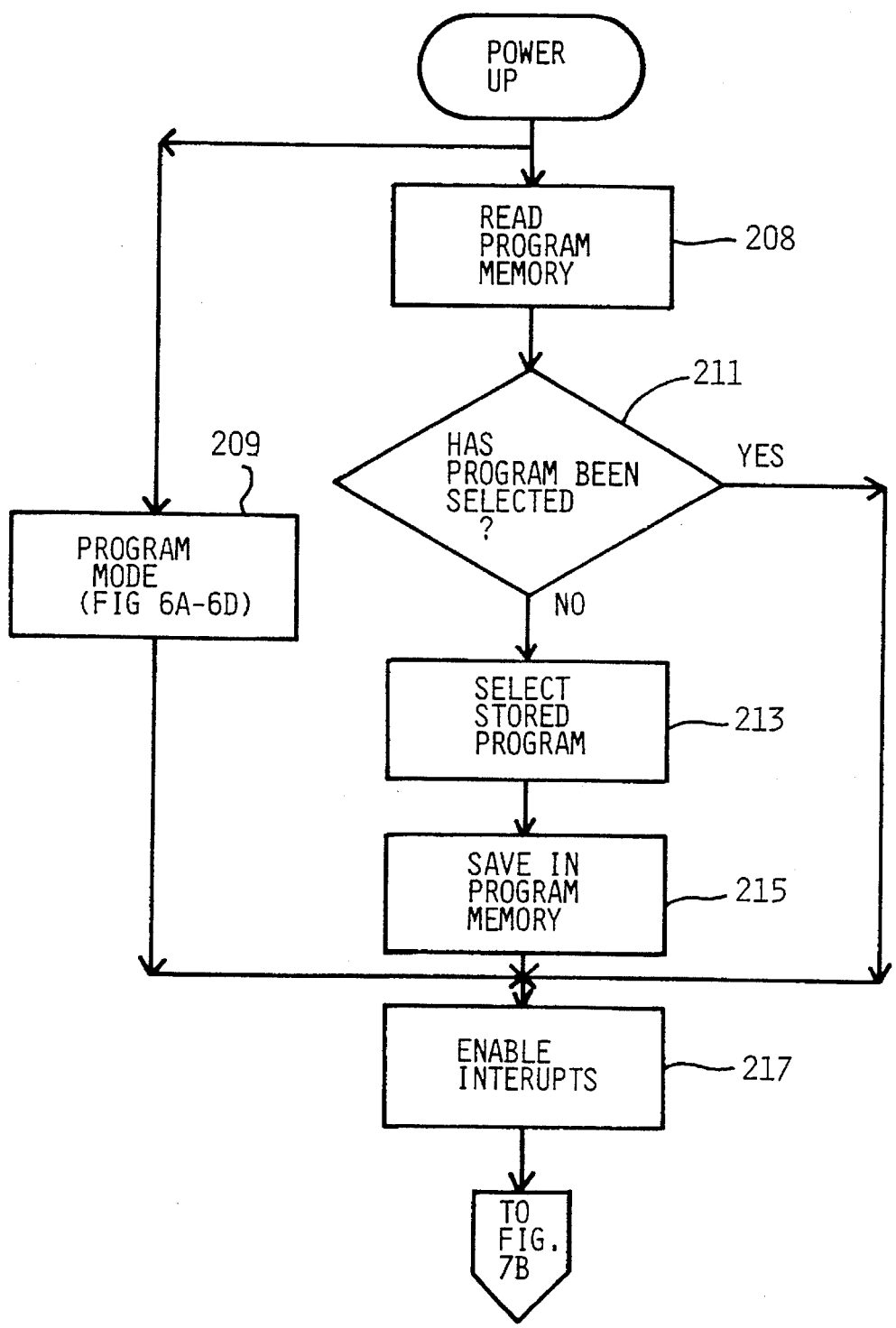
FIGS. 7A–7C are a flow diagram of a program executed by the signalling system in order to implement operation of the system after signalling features to be operated in the run mode have been selected in the program mode.

After the system has been programmed in accordance with the flow diagram of FIGS. 6A–6D, the system may be either turned off and the program will be stored in the E$^2$PROM or the system can transfer to step 209 in the operating mode as indicated in FIG. 7A. If the programming mode is not selected upon power up of the system in step 208, the system will enter into the operating mode by first reading the program from the E$^2$PROM in step 209. If the system has not been previously programmed, no information has been stored in the E$^2$PROM. If the system has not been previously programmed as determined in step 211, it branches from step 211 to steps 213 and 215, where a standardized program held in the ROM 79 is transferred to the E$^2$PROM. If the system has been previously programmed, it skips steps 213 and 215 and goes directly to step 217 where the system interrupts are enabled.

Figure 7B:
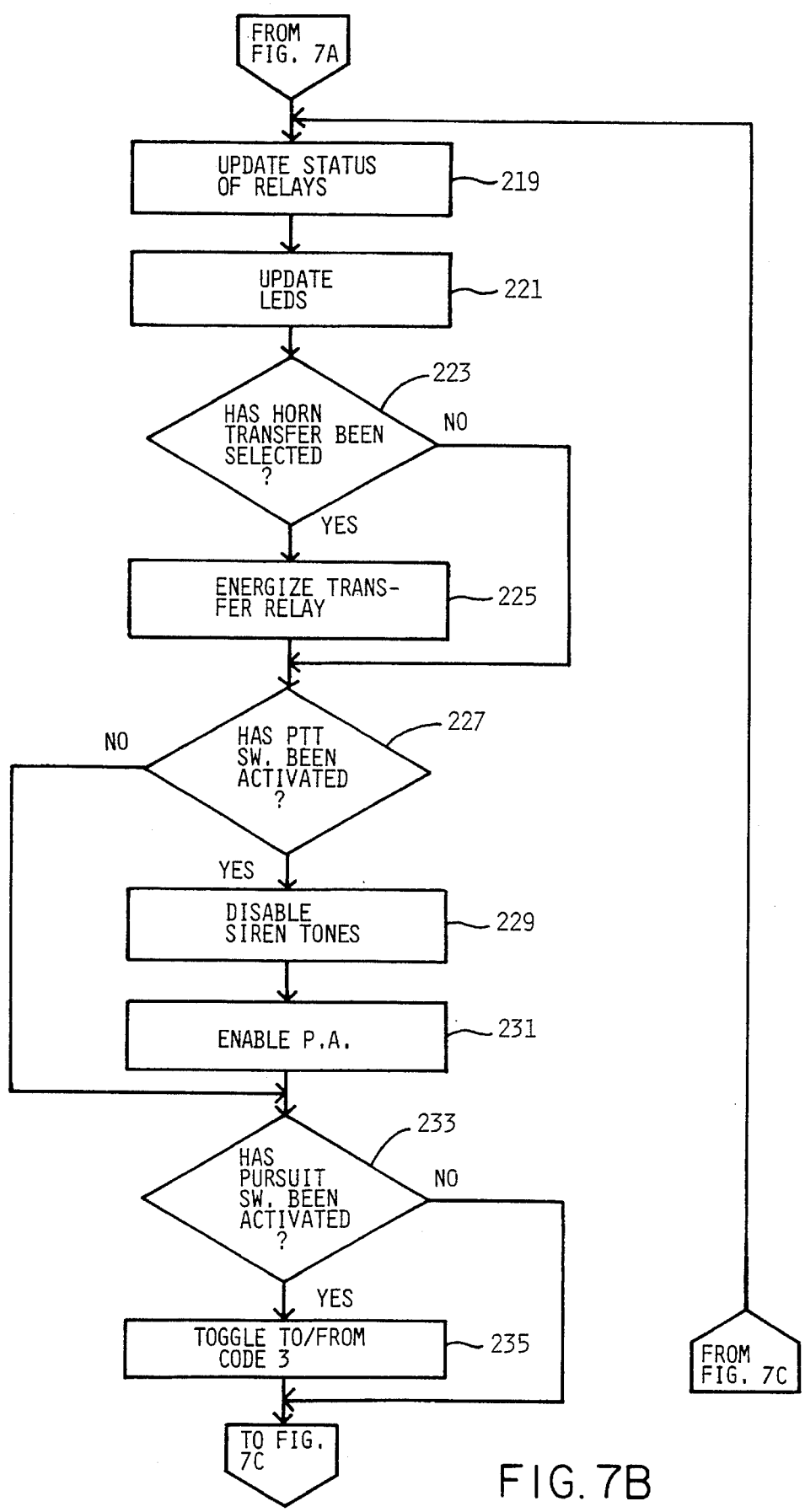
Figure 7C:
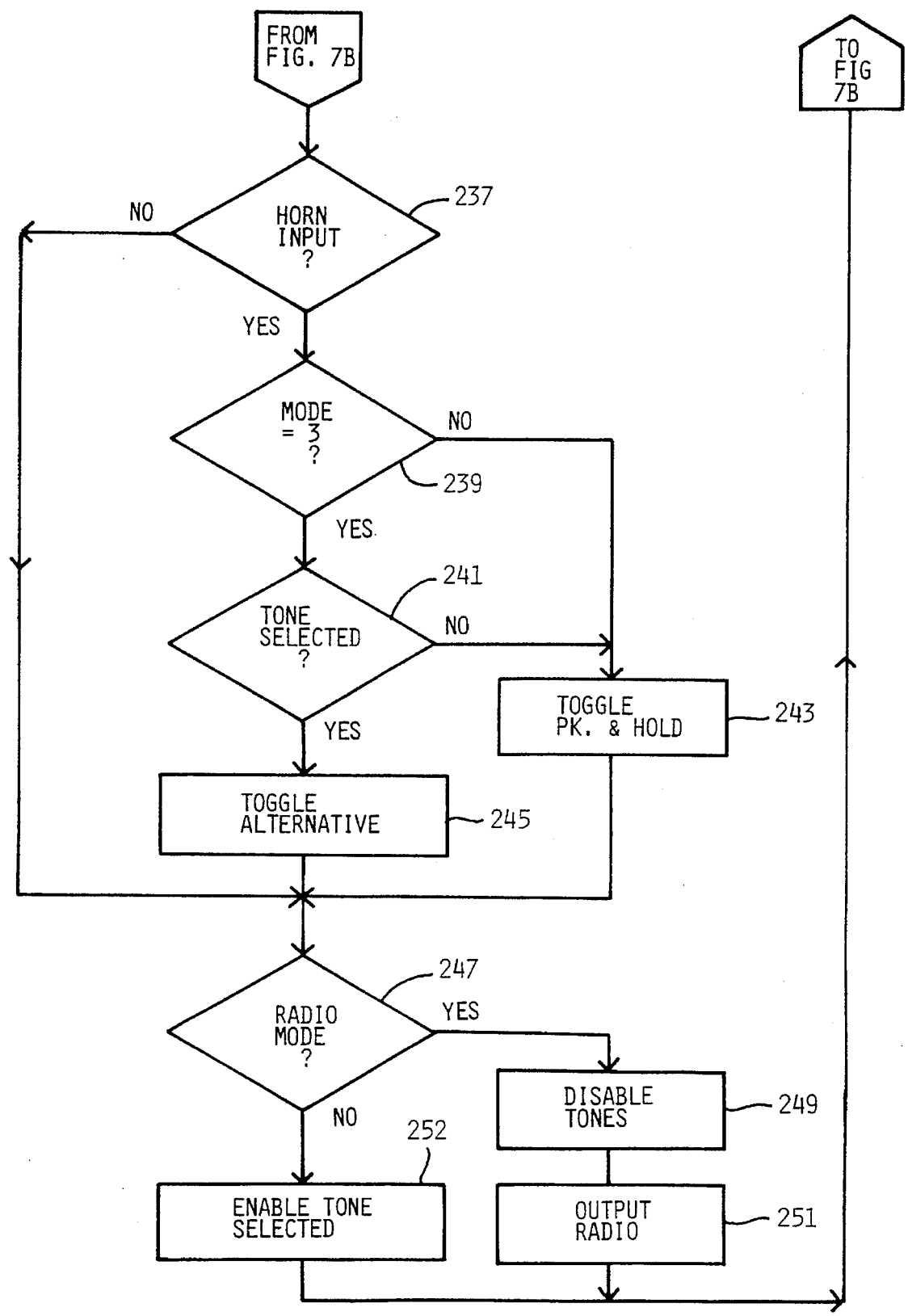

Referring to FIGS. 7B and 7C, the system executes the loop of FIGS. 7B–7C and maintains itself in a idle mode while in the loop until a keystroke is detected or the floor switch 37 is activated. If the system detects a keystroke or a signal from the floor switch 37, it updates the status of the relays 47 in accordance with the keystroke and the program in the E$^2$PROM and the microprocessor 75 tells the microprocessor 77 to update the status of the LEDs 49 of the keypad 35 so as to reflect the present status of the system operation. (See Interrupt Routine of FIG. 8). In step 223, the system determines if the horn ring/siren feature has been selected for the present mode. As indicated in connection with the description of the programming mode, the horn ring/siren feature can be selected for any of the operating modes 1, 2 and 3. If the system is in one of the modes that includes the horn ring/siren feature, the system branches to step 225 where it energizes the transfer relay 113. Otherwise, step 225 is skipped.

At step 227, the system determines whether the push-to-talk (PTT) switch of the microphone 33 has been activated. In the illustrated embodiment of the invention, a common MIC is utilized for the two-way radio 31 and for the public address (PA) function of the signalling system. When the two-way radio 31 and the signalling system utilize a common MIC, a PTT signal is only received by the signalling system if the "PA" key has been pressed on the control head 25. If the signalling system has its own microphone, however, the PTT signal will be sensed by the system regardless of the state of the "PA" key. In any event, if the PTT switch has been activated and it is sensed by the signalling system, the system responds by disabling any tones to the speaker 15 and enabling the speaker to receive audio signals from the microphone by way of the analog switch 91 in accordance with steps 229 and 231.

In keeping with the invention, if the pursuit or floor switch 37 has been activated in step 233, the microprocessor 75 responds by transferring the system into or out of mode 3 in step 235.

If the horn transfer feature has been selected for the present mode, the relay 113 has been energized in step 225. With the relay 113 energized, the microprocessor may receive a horn input signal at step 237 (FIG. 7C). If a horn input signal is received, the system branches to steps 239–245. In step 239, it first determines if the system is presently in operating mode 3. If the system is in mode 1 or 2, step 243 enables a peak-and-hold siren tone. Specifically, the peak-and-hold siren tone is only activated as long as the horn ring 41 is pressed. If the system is determined to be in mode 3 in step 239 and already generating a tone as determined in step 241, the system transfers the tone to an alternative tone in step 245, depending on the tone being generated for mode 3. For example, if the wail tone is provided to the speaker 15 in mode 3 and the horn ring 21 is pressed, the system will change the tone to a yelp tone. In accordance with the programming, the yelp tone will be maintained in step 245 until either a second horn input signal or until a timeout has occurred. If no tone is being provided to the speaker 15 in mode 3, the system branches from step 241 to step 243 where the peak-and-hold tone is activated as previously discussed.

In step 247, the system determines if the "RAD" key has been pressed, placing the system in a radio rebroadcast mode. If the radio rebroadcast mode has been selected, any tone signals being generated are disabled at step 249 by way of the analog switch 91 and the output from the two-way radio 31 is delivered to the speaker 15 in step 251.

If the radio rebroadcast mode has not been selected in step 247, the system branches to step 248 in order to determine its present operating mode. If the system is in mode 3, any tone selected for the siren/speaker in mode 3 (either by way of the programming mode or by keystrokes to the tone keys while in the idle or operating modes) is activated in step 252. From either steps 251 or 252, the system program returns to the beginning of the main program loop at step 219 in FIG. 7B.

Figure 8:
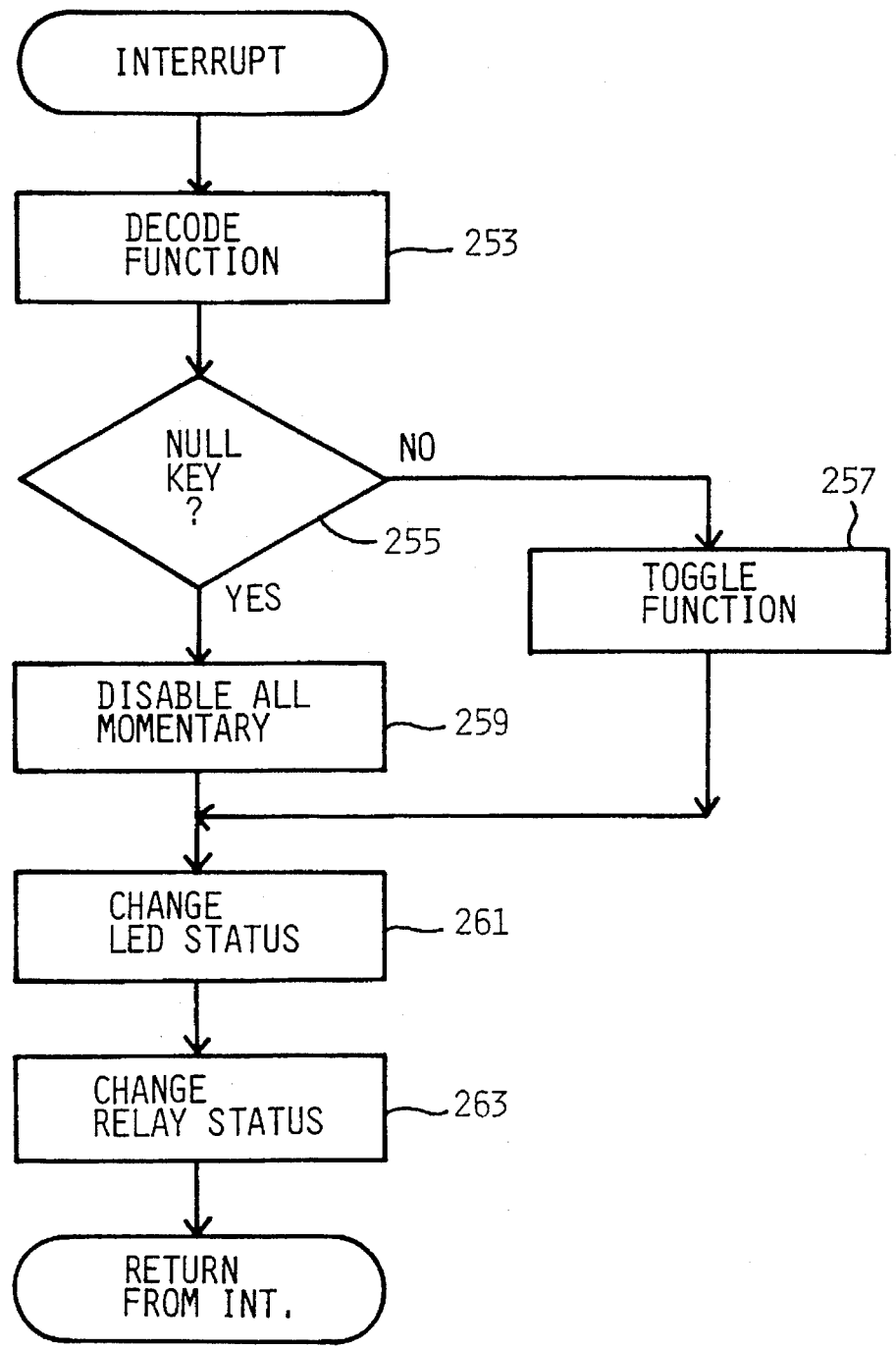
FIG. 8 is a flow diagram of an interrupt routine executed by the control unit in response to keystrokes to the keypad of the control head for changing the functioning of the signalling system during its normal operation.

In order to update system status in response to keystrokes to the keypad 35 when the system is in its operating modes, an interrupt routine is executed by the microprocessor 75 as indicated in FIG. 8. In response to a keystroke to the keypad 35, the microprocessor 77 generates a character that is transmitted to the control unit 23 and microprocessor 75 by way of the two-way serial communications lines 53 (FIG. 2a). The microprocessor 75 decodes the character at step 253 and determines if the character identifies a keystroke to one of the keys of the keypad 35 or a "NULL" key in step 255, meaning the release of a key. If the character is not a "NULL" key, the system branches to step 257 where it toggles the appropriate function identified by the keystroke (i.e., turns the associated LED 49 off or turns it on as a flasher) either immediately or after a timeout period as determined in the programming mode. If the character is a "NULL" key, the system disables the function in step 259 if it has been programmed as a momentary on function or, as in the case of the air horn and "MAN" horn in the preferred embodiment, is operable only as a momentary on function. In order to update the keypad 35, the microprocessor 75 commands the microprocessor 77 to update the status of the LEDs 49 in step 261 in accordance with any changes made in either steps 257 or 259. From step 261, the system updates the status of the relays in step 263 and then returns to the main loop of the operating program.

From the foregoing, it will be appreciated that a programmable emergency signalling system has been provided that utilizes a plurality of signalling features for activation in an operating mode such that the characteristics of each of the operating modes can be programmed by way of keystrokes to the keypad 35 when the system is in its programming mode. Programming of the signalling system can be done from the keypad 35 without necessitating any disassembly of the system. Also, the floor switch 37 allows the operator of the system to directly transfer it into a pursuit mode.

American Automation Cross-Assembler 6805 9.07.17
Assembly date: 17 Apr 1990
Assembly time: 12:59:59
Options in effect:expand format list macro errorfile uppercase

APPENDIX A

```
0001       ***********************************************************
0002     *  Program Name:       MAIN0100                             *
0003     *  Programmer:         WARD GIEFFERS / GEORGE BERANEK / KENT KEKEIS *
0004     *  Initial Start Date: 5/10/89                              *
0005     *  Most Recent Date:   3/29/90                              *
0006     *                                                           *
0007     *  System:             6805-C8                              *
0008     *  Assembler:          EZASM                                *
0009     *                                                           *
0010     *  PGM Description:    THIS PROGRAM CONTROLS THE OPERATION OF THE *
0011     *                      SMART SIREN MAIN UNIT. SEE MAIN.PSU FOR A  *
0012     *                      DESCRIPTION OF OPERATION.            *
0013     *                                                           *
0014     *  Version Information:                                     *
0015     *                                                           *
0016     *  Version  What Changed from Previous    Who Changed  Date *
0017     *  -------------------------------------------------------- *
0018     *  N/A      Initial Version                WJG               *
0019     *  N/A      ADAPTED FOR AS6805C4 AMERICAN  GB          5/10/90 *
0020     *           AUTOMATION ASSEMBLER                         *
0021     *  N/A      CHECKSUM ADDED FOR RAM AND EEPROM  GB      6/01/89 *
0022     *  N/A      NEW YELP & EXTENDED WAIL ADDED  WJG/GB     6/12/89 *
0023     *  N/A      NOP's & JMP INITM's ADDED      GB          6/13/89 *
0024     *  N/A      Siren Tones Modified to meet   GB          6/21/89 *
0025     *           anecholic chamber specs.                     *
0026     *  N/A      Shotgun Timer Interlock Sequence  GB       6/22/89 *
0027     *           Modified.                                    *
0028     *  N/A      Mode2 ==> Mode3 Man ==> Wail   GB          6/23/89 *
0029     *           Problem Sol.                                 *
0030     *  N/A      Pursuit Switch Debounce on     GB          6/30/89 *
0031     *           Open added.                                  *
0032     *  N/A      NOPs and Jumps to INITM added  GB          7/20/89 *
0033     *           to MAINLP.                                   *
0034     *  N/A      Siren Output Bit now Always    GB          7/26/89 *
0035     *           Stops on High.                               *
0036     *  48       Siren Output Bit is Input when GB          7/28/89 *
0037     *           not in use.                                  *
0038     *  0100     Name changed from MAIN48.S to  KENT        3/29/90 *
0039     *           MAIN0100.S to conform to new                *
0040     *           naming convention.                           *
0041       ***********************************************************
0044               RADIX   10
0046
0047       ***********************************************************
0048     *                    EQUATES                                *
0049       ***********************************************************
0050
0051  00001FF4     USRVEC  EQU   $1FF4      ;START USER VECTOR TABLE
0052  00001FDF     OPTION  EQU   $1FDF      ;MC68HC705C8 OPTION REGISTER
0053
0054  00000004     DDRA    EQU   04         ;DATA DIRECTION REGS
0055  00000005     DDRB    EQU   05
0056  00000006     DDRC    EQU   06
0057       *******************  TIMER VARIABLES  *******************
```

```
0058    00000012        TCR     EQU     $12             ;TIMER CONTROL REGISTER
0059    00000013        TSR     EQU     $13             ;TIMER STATUS REGISTER
0060    00000016        OCH     EQU     $16             ;OUTPUT COMPARE REG-HI
0061    00000017        OCL     EQU     $17             ;OUTPUT COMPARE REG-LOW
0062    00000018        TMRH    EQU     $18             ;TIMER COUNTER-HI BYTE
0063    00000019        TMRL    EQU     $19             ;TIMER COUNTER-LOW BYTE
0064    00000005        TOF     EQU     $05             ;TIMER OVERFLOW FLAG
0065    00000006        OCF     EQU     $06             ;TIMER OUTPUT COMPARE FLAG
0066    00000006        OCIE    EQU     $06             ;TIMER OUTPUT COMPARE INTERUPT ENABLE
0067    00000005        TOIE    EQU     $05             ;TIMER OVFL INTERRUPT ENABLE
0068                            *************** SERIAL PORT VARIABLES ********************
0069    0000000D        BAUDR   EQU     $0D             ;SCI BAUD RATE REG
0070    0000000E        SCCR1   EQU     $0E             ;SCI CONTROL REG #1
0071    0000000F        SCCR2   EQU     $0F             ;SCI CONTROL REG #2
0072    00000001        RWU     EQU     $01             ;SCI RCV WAKE UP BIT
0073    00000010        SCSR    EQU     $10             ;SCI STATUS REG
0074    00000005        RIE     EQU     $05             ;SCI RCV INTERRUPT ENABLE
0075    00000002        RE      EQU     $02             ;SCI RCV ENABLE
0076    00000003        TE      EQU     $03             ;SCI XMIT ENABLE
0077    00000007        TDRE    EQU     $07             ;SCI XMIT DATA REG EMPTY
0078    00000003        WAKE    EQU     $03             ;SCI ADDR BIT WAKE MODE
0079    00000005        RDRF    EQU     05              ;SCI RCV DATA REG FULL FLAG
0080    00000011        SCDAT   EQU     $11             ;SCI SEND/RCV DATA REG
0081                            *************** EEPROM PORT VARIABLES ********************
0082    0000000A        SPCR    EQU     $0A             ;SPI CONTROL REGISTER
0083    0000000B        SPSR    EQU     $0B             ;SPI STATUS REG
0084    0000000C        SPDR    EQU     $0C             ;SPI DATA REG
0085    00000007        SPIF    EQU     $07             ;SPI DATA TRANSFER COMPLETE
0086
0087    00000000        AMP     EQU     $00             ;PORTA=AMPLIFIER INTERFACE PORT
0088
0089    00000007        RADSEL  EQU     7               ;RADIO SELECT BIT              (PORTA)
0090    00000006        PAEN    EQU     6               ;PTT ENABLE FOR MUX                "
0091    00000005        CMRLY   EQU     5               ;COMMON MIC RELAY CONTROL BIT      "
0092    00000004        TONEN   EQU     4               ;SIREN TONE ENABLE                 "
0093    00000003        XFR     EQU     3               ;HORN RING XFR RELAY CONTROL BIT   "
0094    00000002        TAP     EQU     2               ;INPUT BIT FROM TAPII DETECTOR     "
0095    00000001        PTT     EQU     1               ;INPUT FROM PTT SW DETECTOR        "
0096    00000000        TONE    EQU     0               ;SIREN TONE TO PWR AMP             "
0097
0098    00000001        RELAY   EQU     $01             ;PORTB=RELAY CIRCUIT INTERFACE PORT
0099
0100    00000007        OUTETM  EQU     7               ;TIMER ENABLE BIT FOR CUTE
0101    00000006        OUTDTM  EQU     6               ;   "     "    "    OUTD
0102    00000005        OUTCTM  EQU     5               ;   "     "    "    OUTC
0103    00000004        OUTBTM  EQU     4               ;   "     "    "    OUTB
0104    00000003        OUTATM  EQU     3               ;   "     "    "    OUTA
0105    00000002        YELTM   EQU     2               ;   "     "    "   FOR YELP TIME OUT
0106    00000001        HLTM    EQU     1               ;   "     "    "    HI-LOW TONE
0107    00000000        STBTM   EQU     0               ;   "     "    "    STBY TIMER
0108
0109    00000007        OUTE    EQU     7               ;RELAY OUTPUT E               (PORT B)
0110    00000006        OUTD    EQU     6               ;RELAY OUTPUT D                    "
0111    00000005        OUTC    EQU     5               ;RELAY OUTPUT C                    "
0112    00000004        OUTB    EQU     4               ;RELAY OUTPUT B                    "
0113    00000003        OUTA    EQU     3               ;RELAY OUTPUT A                    "
0114    00000002        OUT3    EQU     2               ;RELAY OUTPUT #3                   "
0115    00000001        OUT2    EQU     1               ;RELAY OUTPUT #2                   "
```

```
0116        00000000        OUT1      EQU    0              ;RELAY OUTPUT #1
0117
0118        00000000        STBYUP    EQU    0              ;PWR UP BIT FOR STBY
0119        00000003        WAUP      EQU    3              ;PWR UP BIT FOR WAIL
0120        00000004        YELUP     EQU    4              ;PWR UP BIT FOR YELP
0121        00000005        HLUP      EQU    5              ;PWR UP BIT FOR HILO
0122
0123        00000000        STB       EQU    0              ;SIREN MODE=STANDBY
0124        00000001        RA        EQU    1              ;        =RADIO
0125        00000002        WA        EQU    2              ;        =WAIL
0126        00000003        YE        EQU    3              ;        =YELP
0127        00000004        HL        EQU    4              ;        =HI/LO
0128        00000005        AHORN     EQU    5              ;        =AIR HORN
0129        00000006        PEAK      EQU    6              ;        =PEAK&HOLD
0130        00000007        SP1       EQU    7              ;        =SPECIAL
0131
0132        00000002        AUXPORT   EQU    $02            ;PORTC=MISC CONTROL BITS OF PORTC
0133
0134        00000007        LATCHEN   EQU    7              ;LATCH ENABLE TO RELAY CKT BD  (PORT C)
0135        00000006        EECS      EQU    6              ;EEPROM CHIP SELECT              "
0136        00000005        AMPEN     EQU    5              ;AMPLIFIER ENABLE(RELAY K1)      "
0137        00000004        BIAS      EQU    4              ;BIAS AMPLIFIER FOR AUDIO        "
0138        00000000        PURS      EQU    0              ;PURSUIT SWITCH INPUT            "
0139
0140        00000003        PORTD     EQU    $03            ;PORTD, EXCEPT SCI etc
0141
0142        00000007        CHKBIT    EQU    $07            ;RELAY BOARD PRESENT SIGNAL    (PORT D)
0143
0144                                  ****** MISC BITS OF WORD "FLAG" FOR USE AS SOFTWARE FLAGS ******
0145
0146        00000000        SEGEND    EQU    0              ;END OF TONE SEGMENT FLAG
0147        00000001        TAPFLG    EQU    1              ;FLAG FOR 1ST PASS THRU TAPIN
0148        00000002        TONEFLG   EQU    2              ;FLAG FOR 1ST PASS THRU STONE&AHTONE
0149        00000003        PSTFLG    EQU    3              ;FLAG FOR 1ST PASS THRU PURSUE
0150        00000004        AHFLG     EQU    4              ;FLAG FOR EACH ALT PASSES THRU AHTONE
0151        00000005        PTTFLG    EQU    5              ;FLAG FOR 1st PASS THRU PTTCHK
0152        00000007        CKSFLG    EQU    7              ;FLAG FOR CHECKSUM ERROR
0153
0155                                  ***************************************************
0156                        *               DEFINE ROM CONSTANTS                        *
0157                                  ***************************************************
0158
0159 R 0020                 R         SECTION ROM_CONSTANTS,$0020
0160 R 0020                           ORG    $20
0161        00000030        VERSION   EQU    48             ;VERSION NUMBER
0162 R 0020 30                        BYTE   VERSION
0163
0164                                  ***************************************************
0165                        *               RAM MEMORY ALLOCATIONS                      *
0166                                  ***************************************************
0168 R 0050                 R         SECTION RAM_VARIABLES,$0050
0169 R 0050                           ORG    $0050
0170 R 0050 0020            RMCOPY    DS     32             ;32 BYTES FOR COPY OF EEPROM
0171        00000050        VERSN     EQU    RMCOPY         ;HOLDS VERSION # OF SOFTWARE
0172        00000051        ALTEN     EQU    RMCOPY+1       ;DEFINE ALTERNATE ACTION OUTPUTS
0173        00000052        OUTEN1    EQU    RMCOPY+2       ;DEFINE OUTPUTS ACTIVE IN MODE 1
0174        00000053        OUTEN2    EQU    RMCOPY+3       ;"    "       "       "      2
0175        00000054        OUTEN3    EQU    RMCOPY+4       ;"    "       "       "      3
```

```
0176      00000055        TAPEN    EQU   RMCOPY+5    ;ENABLE TAPII IN MODES 0,1,2,3
0177      00000056        PWRUP    EQU   RMCOPY+6    ;SIREN SELECTED ON POWER UP
0178      00000057        TMRSEL   EQU   RMCOPY+7    ;DEFINES TIMER OUTPUTS A THRU E
0179      00000058        SIRENS   EQU   RMCOPY+8    ;DEFINES WHAT TONES ARE ENABLED/DISABLED
0180      00000059        YELTHOUT EQU   RMCOPY+9    ;BIT 4 ENABLES YELP TIMEOUT AFTER TAPII
0181      0000006F        CHCKSUM  EQU   RMCOPY+31   ;STORAGE OF CHECKSUM
0182 R 007C 0001          PRMPTR   DS    1           ;POINTER INTO EEPROM(16 REGS OF 16 BITS)
0183 R 0071 0001          DCNTR    DS    1           ;COUNTER FOR EEPROM DELAY
0184
0185 R 0072 0001          FLAG     DS    1           ;MISC SOFTWARE FLAGS
0186 R 0073 0001          SIREN    DS    1           ;INDICATES MODE OF SIREN SYSTEM
0187 R 0074 0001          MODE     DS    1           ;INDICATES MODE OF LIGHT CONTROL
0188 R 0075 0001          RSTAT    DS    1           ;RELAY OUTPUT STATUS
0189 R 0076 0001          PMODE    DS    1           ;INDICATES MODE BEING PROGRAMMED
0190
0191 R 0077 0001          CNTEN    DS    1           ;ENABLE BITS FOR SOFTWARE CNTRS & TMRS
0192 R 0078 0001          CNTRC    DS    1
0193 R 0079 0001          LPCNT1   DS    1           ;LOOP CNTR #1 FOR TIMERS BASED ON LOOP CNT
0194 R 007A 0001          LPCNT2   DS    1           ;"    "    #2  "    "    "    "    "    "
0195 R 007B 0001          LPCNT3   DS    1           ;"    "    #3  "    "    "    "    "    "
0196 R 007C 0001          LPCNT4   DS    1           ;"    "    #4  "    "    "    "    "    "
0197 R 007D 0001          LPCNT5   DS    1           ;"    "    #5  "    "    "    "    "    "
0198 R 007E 0001          LPCNT6   DS    1           ;"    "    #6  "    "    "    "    "    "
0199
0200 R 007F 0001          TMREN    DS    1           ;ENABLE STBTMR,HLTMR,YELTMR & TIMER A-E
0201 R 0080 0001          STBTMR   DS    1           ;STARTS TIMING AFTER STBY PUSHBUTTON
0202 R 0081 0001          TMRA     DS    1           ;TIMER FOR OUTA
0203 R 0082 0001          TMRB     DS    1           ;    "    "   B
0204 R 0083 0001          TMRC     DS    1           ;    "    "   C
0205 R 0084 0001          TMRD     DS    1           ;    "    "   D
0206 R 0085 0001          TMRE     DS    1           ;    "    "   E
0207 R 0086 0001          YELTMR   DS    1           ;    "   YELP TIME OUT
0208 R 0087 0001          HLTMR    DS    1           ;    "   FOR HL TONE
0209 R 0088 0001          AUXSTAT  DS    1           ;AUXPORT STATUS
0210
0211 R 0089 0001          TEMPX    DS    1           ;TEMP STORAGE FOR X REG
0212 R 008A 0001          LEDX     DS    1           ;TEMP STORAGE FOR LED STATUS
0213 R 008B 0001          DISPLA   DS    1           ;STATUS OF FIRST 8 LEDs(SIREN)
0214 R 008C 0001          DISPLB   DS    1           ;      "  SECOND 8 LEDs(LIGHTS)
0215 R 008D 0001          SREGA    DS    1           ;SHIFT REGISTER A-GENERAL USE
0216 R 008E 0001          SREGB    DS    1           ;    "    "    B
0217 R 008F 0001          SREGC    DS    1           ;    "    "    C
0218
0219 R 0090 0001          OFFSETH  DS    1           ;OFFSET HIGH BYTE
0220 R 0091 0001          OFFSETL  DS    1           ;OFFSET LOW BYTE
0221 R 0092 0001          OCLTEMP  DS    1           ;TEMP STORAGE FOR OCL BYTE
0222 R 0093 0001          SEGPNTR  DS    1           ;POINTS TO LIST OF SEGMENT SIZES
0223 R 0094 0001          SEGCNT   DS    1           ;COUNTER FOR # OF SEGMENTS
0224 R 0095 0001          CYCLCNT  DS    1           ;COUNTER FOR #CYCLES PER SEGMENT
0225 R 0096 0001          INDEX    DS    1           ;TONE TABLE START ADDR FOR X REG
0226 R 0097 0001          SINDEX   DS    1           ;TEMPORARY INDEX STORAGE
0227
0228
0229                      *************************************************
0230                      *     INITH: SETS THE DDR FOR EACH PORT AND SETS INITIAL    *
0231                      *     VALUES IN EACH DATA REGISTER.                         *
0232                      *         PA0-7=AMP(AMPLIFIER INTERFACE)                    *
0233                      *         PB0-7=RELAY(RELAY CIRCUIT INTERFACE)              *
0234                      *         PC0-7=MISC BITS IN PORTC(EEPROM,RELAY CKT LE)     *
```

INITM

```
0235                         *          PD0-7=SCI, RELAY CKT SENSOR                    *
0236                         ********************************************************
0237
0238 I 0100            I           SECTION  INITM,$100
0239 I 0100                        ORG      $100
0240
0241 I 0100 A6F8       INITM:  LDA      #%11111000      ;was %11111001    (COLD START)
0242 I 0102 B704               STA      DDRA            ;SET PORTA DDR
0243 I 0104 A6FF               LDA      #%11111111
0244 I 0106 B705               STA      DDRB            ;SET PORTB DDR
0245 I 0108 A6F2               LDA      #%11110010      ;was %11111110
0246 I 010A B706               STA      DDRC            ;SET PORTC DDR
0247 I 010C A653               LDA      #%01010011
0248 I 010E B70A               STA      SPCR            ;ENABLE SPI AS MASTER, CLK/32 etc
0249 I 0110 3F02               CLR      AUXPORT
0250 I 0112 A633               LDA      #$33            ;SET BAUD RATE=1200 BPS
0251 I 0114 870D               STA      BAUDR
0252 I 0116 3F0E               CLR      SCCR1
0253 I 0118 3F0F               CLR      SCCR2
0254 I 011A 160E               BSET     WAKE,SCCR1      ;SET SCI ADDR WAKE UP MODE
0255 I 011C 160F               BSET     TE,SCCR2        ;ENABLE SCI XMIT
0256 I 011E 1A0F               BSET     RIE,SCCR2       ;ENABLE RECEIVE INTERRUPTS
0257 I 0120 140F               BSET     RE,SCCR2        ;ENABLE SCI RECEIVER(FROM HEAD)
0258 I 0122 1A12               BSET     TOIE,TCR        ;ENABLE TIMER OVERFLOW INTERRUPTS
0260 I 0124 B650       RAMCHK: LDA      VERSN
0261 I 0126 A130               CMP      #VERSION
0262 I 0128 2609               BNE      RESTART
0263 I 012A CDC4E7             JSR      CSUM            ;CHECK FOR RAM CHECKSUM ERROR
0264 I 012D 0E7203             BRSET    CKSFLG,FLAG,RESTART ;IF BAD BRANCH TO RESTART
0265 I 0130 CCC250             JMP      BDCHKX          ;ELSE ENABLE INTERRUPTS AND BRANCH TO MAIN
0267 I 0133 A6F8       RESTART: LDA     #$F8            ;SET PORTA DDR  (WARM START) (STARTS MAIN)
0268 I 0135 B704               STA      DDRA
0269 I 0137 A6FF               LDA      #$FF            ;SET PORTB DDR
0270 I 0139 B705               STA      DDRB
0271 I 013B A6F2               LDA      #$F2            ;SET PORTC DDR
0272 I 013D B706               STA      DDRC
0273 I 013F 3F02               CLR      AUXPORT
0274 I 0141 A633               LDA      #$33            ;SET BAUD RATE=1200 BPS
0275 I 0143 870D               STA      BAUDR
0276 I 0145 3F0E               CLR      SCCR1
0277 I 0147 3F0F               CLR      SCCR2
0278 I 0149 160E               BSET     WAKE,SCCR1      ;SET SCI ADDR WAKE UP MODE
0279 I 014B 160F               BSET     TE,SCCR2        ;ENABLE SCI XMIT
0280 I 014D 1A0F               BSET     RIE,SCCR2       ;ENABLE RECEIVE INTERRUPTS
0281 I 014F 140F               BSET     RE,SCCR2        ;ENABLE SCI RECEIVER(FROM HEAD)
0282 I 0151 A653               LDA      #$53
0283 I 0153 870A               STA      SPCR            ;ENABLE SPI AS MASTER, CLK/32 etc
0284 I 0155 1A12               BSET     TOIE,TCR        ;ENABLE TIMER OVERFLOW INTERRUPTS
0285 I 0157 3F00               CLR      AMP             ;SET AMP INTERFACE TO STBY MODE (Old Restart Point)
0286 I 0159 3F01               CLR      RELAY           ;SET RELAY INTERFACE TO MOD0
0287 I 015B 1E02               BSET     LATCHEN,AUXPORT ;LATCH DATA TO RELAY INTERFACE
0288 I 015D 1F02               BCLR     LATCHEN,AUXPORT
0289 I 015F 4F                 CLRA
0290 I 0160 B774               STA      MODE            ;CLEAR MODE
0291 I 0162 B776               STA      PMODE           ;CLEAR PROGRAM MODE
0292 I 0164 B773               STA      SIREN           ;CLEAR SIREN
0293 I 0166 B751               STA      ALTEN           ;SET ALL OUTPUTS=MOM
0294 I 0168 B788               STA      DISPLA          ;CLR LED DISPLAY
```

RESTART

```
0295 I 016A B78C            STA    DISPLB          ;"   "   "
0296 I 016C B78D            STA    SREGA           ;CLR SHIFT REGISTER A
0297 I 016E B78E            STA    SREGB           ;"   "   "           B
0298 I 0170 B78F            STA    SREGC           ;"   "   "           C
0299 I 0172 B772            STA    FLAG            ;CLEAR ALL FLAGS
0300 I 0174 B775            STA    RSTAT           ;CLEAR RELAY STATUS
0301 I 0176 B777            STA    CNTEN           ;DISABLE ALL SOFTWARE COUNTERS
0302 I 0178 B77F            STA    THREN           ;DISABLE ALL TIMERS
0303 I 017A B780            STA    STBTMR          ;CLEAR ALL TIMERS
0304 I 017C B781            STA    THRA
0305 I 017E B782            STA    TMRB
0306 I 0180 B783            STA    THRC
0307 I 0182 B784            STA    TMRD
0308 I 0184 B785            STA    THRE
0309 I 0186 B786            STA    YELTMR
0310 I 0188 B787            STA    HLTMR           ;CLEAR HI/LO TIMER
0311 I 018A B702            STA    AUXPORT         ;CLEAR AUXPORT(C)
0312 I 018C B788            STA    AUXSTAT         ;CLEAR STATUS OF AUXPORT
0313 I 018E B757            STA    TMRSEL
0314 I 0190 B758            STA    SIRENS
0315 I 0192 B756            STA    PWRUP
0316 I 0194 B759            STA    YELTMOUT
0317 I 0196 B779            STA    LPCNT1
0318 I 0198 B77A            STA    LPCNT2
0319 I 019A B77B            STA    LPCNT3
0320 I 019C B77C            STA    LPCNT4
0321 I 019E A601            LDA    #$C1
0322 I 01A0 B790            STA    OFFSETH         ;INIT TIMER OFFSETH TO 700 HZ
0323 I 01A2 A666            LDA    #$66
0324 I 01A4 B791            STA    OFFSETL         ;INIT TIMER OFFSETL TO 700 HZ
0326
0327                ****************************************************
0328                *                              RDPROM6.SRC WJG 11-9-88 *
0329                *  RDPROM READS 16, 16 BIT WORDS FROM THE EEPROM AND SAVES *
0330                *  THEM IN RAM STARTING @ RMCOPY. USES SPI, XREG, PRMPTR AS *
0331                *  POINTER INTO EEPROM. PORT C, BIT 6 AS EEPROM CS.     *
0332                *  ACC & X REG ARE LOST.                                *
0333                ****************************************************
0334
0335 I 01A6 5F      RDPROM:  CLRX                   ;INIT RDPROM
0336 I 01A7 3F70            CLR    PRMPTR
0337 I 01A9 B60B            LDA    SPSR
0338 I 01AB B60C            LDA    SPDR            ;CLEAR SPIF
0339 I 01AD A601   RDPROM1: LDA    #$01
0340 I 01AF CD0627           JSR    PRMSND          ;SEND START BIT
0341 I 01B2 B670            LDA    PRMPTR          ;GET PROM REG#
0342 I 01B4 AA80            ORA    #$80            ;ORA W/READ INSTR
0343 I 01B6 CD0627           JSR    PRMSND          ;SEND READ INSTRUCTION
0344 I 01B9 CD0627           JSR    PRMSND          ;DUMMY WRITE TO START CLOCK
0345 I 01BC B60C            LDA    SPDR            ;READ INPUT DATA
0346 I 01BE B78D            STA    SREGA           ;SAVE IN SREG A
0347 I 01C0 CD0627           JSR    PRMSND          ;START CLK AGAIN
0348 I 01C3 B60C            LDA    SPDR            ;READ SECOND BYTE
0349 I 01C5 B78E            STA    SREGB           ;SAVE IN SREG B
0350 I 01C7 CD0627           JSR    PRMSND          ;START CLK AGAIN
0351 I 01CA B60C            LDA    SPDR            ;READ 3RD BYTE
0352 I 01CC B78F            STA    SREGC           ;SAVE IN SREG C
0353 I 01CE 1D02            BCLR   EECS,AUXPORT    ;TURN OFF CS FOR >1US
```

READ EE PROM

```
0354 I 0100 1C02                  BSET    EECS,AUXPORT
0355 I 0102 388F                  LSL     SREGC
0356 I 0104 398E                  ROL     SREGB
0357 I 0106 398D                  ROL     SREGA
0358 I 0108 868D                  LDA     SREGA
0359 I 010A E750                  STA     RMCOPY,X
0360 I 010C 5C                    INCX
0361 I 010D 868E                  LDA     SREGB
0362 I 010F E750                  STA     RMCOPY,X
0363 I 0111 5C                    INCX
0364 I 0112 3C7C                  INC     PRMPTR
0365 I 0114 A320                  CPX     #$20
0366 I 0116 25C5                  BLO     RDPROM1
0367 I 0118 1002    RDPROMX: BCLR EECS,AUXPORT
0368
0370 I 011A 8650    VERCHK:  LDA  VERSN         ;COMPARE CONTENTS OF VERSN W/VERSION #
0371 I 011C A13C             CMP  #VERSION      ;IF NOT SAME,THEN LOAD STANDARD PROGRAM
0372 I 011E 2606             BNE  DEFAULT
0373 I 01F0 CD04E7            JSR  CSUM          ;CHECK FOR EEPROM CHECKSUM ERROR
0374 I 01F3 0F7231           BRCLR CKSFLG,FLAG,STBYCHK ;IF GOOD BRANCH TO STBYCHK
0375 I 01F6 A63C    DEFAULT: LDA  #VERSION      ;   STORE CURRENT VERSION #
0376 I 01F8 B750             STA  VERSN
0377 I 01FA A601             LDA  #$01          ;   SET OUT1 ON IN MODE 1
0378 I 01FC B752             STA  OUTEN1
0379 I 01FE A603             LDA  #$03          ;   SET OUT 1&2 ON IN MODE 2
0380 I 0200 B753             STA  OUTEN2
0381 I 0202 A607             LDA  #$07          ;   SET OUT 1,2 & 3 ON IN MODE 3
0382 I 0204 B754             STA  OUTEN3
0383 I 0206 A608             LDA  #$08          ;   SET PWR UP=WAIL
0384 I 0208 B756             STA  PWRUP
0385 I 020A A606             LDA  #$06          ;   SET HR XFR FOR MODES 2 & 3
0386 I 020C B755             STA  TAPEN
0387 I 020E A67F             LDA  #$7F          ;   SET OUTE=MOMENTARY
0388 I 0210 B751             STA  ALTEN
0389 I 0212 A608             LDA  #$08          ;   SET OUTA=TIMER
0390 I 0214 B757             STA  TMRSEL
0391 I 0216 A6B8             LDA  #$B8          ;   ALL TONES ENABLED
0392 I 0218 B758             STA  SIRENS
0393 I 021A A610             LDA  #$10          ;   YELP TIME ENABLED
0394 I 021C B759             STA  YELTMOUT      ;   CORRECT CHECKSUM HERE WOULD BE $#90
0395 I 021E CD04E7           JSR  CSUM          ;   GET VALID CHECKSUM
0396 I 0221 CD05DB           JSR  WRPROM        ;   SAVE STD PROGRAM
0397 I 0224 CC01A6           JMP  RDPROM        ;   CHECK IT
0398
0399 I 0227 1F72    STBYCHK: BCLR CKSFLG,FLAG   ;   CLEAR CHECKSUM ERROR FLAG
0400 I 0229 015603           BRCLR STBYUP,PWRUP,WACHK
0401 I 022C CD064C           JSR  STBY
0402 I 022F 075603  WACHK:   BRCLR WAUP,PWRUP,YECHK
0403 I 0232 CD068C           JSR  WAIL
0404 I 0235 095603  YECHK:   BRCLR YELUP,PWRUP,HLCHK
0405 I 0238 CD06A7           JSR  YELP
0406 I 023B 0B5603  HLCHK:   BRCLR HLUP,PWRUP,PWRCHKX
0407 I 023E CD06C8           JSR  HILO
0408 I 0241 9D      PWRCHKX: NOP                ;   END PWRCHK
0409 I 0242 0E0305  BDCHK:   BRSET CHKBIT,PORTD,BDCHK1 ; SET FOR NORMAL POLARITY, CLR FOR REV
0410 I 0245 CD0737           JSR  MOD0          ;IF RELAY BD PRESENT, THEN SET MODE=0
0411 I 0248 2005             BRA  BDCHKX
0412 I 024A CD0760  BDCHK1:  JSR  MOD3          ;ELSE,SET MODE=3
```

VERSION CHECK

```
0413 I 024D CD064C              JSR     STBY            ; SET SIREN=STBY
0414 I 0250 9A          BCHKX:  CLI                     ;ENABLE INTERRUPTS
0415
0417                    ****************************************************
0418                    *   MAIN.LP:UPDATES RELAY STATUS,AMPLIFIER STATUS,  2-27-89 *
0419                    *   CHECKS FOR TAPII,PTT AND HORN RING INPUTS & TURNS       *
0420                    *   OFF ALL OUTPUTS PROGRAMMED FOR MOMENTARY IF NO KEY      *
0421                    *   IS DEPRESSED.                                           *
0422                    *   ALL OTHER FUNCTIONS ARE INTERRUPTS OR SUBROUTINES       *
0423                    ****************************************************
0424
0425 I 0251 0E7622      MAINLP: BRSET   7,PMODE,CONTINUE
0426 I 0254 A6F9                LDA     #$F9
0427 I 0256 B704                STA     DDRA            ;SET PORTA DDR
0428 I 0258 A6FF                LDA     #$FF
0429 I 025A B705                STA     DDRB            ;SET PORTB DDR
0430 I 025C A6F2                LDA     #$F2
0431 I 025E B706                STA     DDRC            ;SET PORTC DDR
0432 I 0260 A633                LDA     #$33
0433 I 0262 B70D                STA     BAUDR           ;SET BAUD RATE=1200 BPS
0434 I 0264 B650                LDA     VERSN           ; IF RAM IS VALID, THEN
0435 I 0266 A130                CMP     #VERSION        ;   BRANCH TO CONTINUE
0436 I 0268 2703                BEQ     CONTCSUM        ; ELSE,RESTART
0437 I 026A CC0133              JMP     RESTART
0438 I 026D CD04E7      CONTCSUM:JSR    CSUM            ;CHECK FOR RAM CHECKSUM ERROR
0439 I 0270 0F7203              BRCLR   CKSFLG,FLAG,CONTINUE ;IF BAD BRANCH TO RESTART
0440 I 0273 CC0133              JMP     RESTART
0441 I 0276 B675        CONTINUE:LDA    RSTAT           ;DO UNTIL INTERRUPTED
0442 I 0278 B701                STA     RELAY           ;    UPDATE RELAY CIRCUITS
0443 I 027A 1E02                BSET    LATCHEN,AUXPORT
0444 I 027C 1F02                BCLR    LATCHEN,AUXPORT
0445 I 027E B602        WATCHDG: LDA    AUXPORT         ;TOGGLE OUTPUT TO RESET WATCHDOG
0446 I 0280 A802                EOR     #$02
0447 I 0282 B702                STA     AUXPORT
0448 I 0284 2006                BRA     UPDATE
0449 I 0286 9D9D9D              DB      3 DUP ($9D)
0450 I 0289 CC0100              JMP     INITM
0451
0452                    ****************************************************
0453                    *                                       UPDATE:7-20-88      *
0454                    *   UPDATE STATUS OF ALL 16 LEDs IN HEAD, 1 LED PER PASS    *
0455                    *   GET STATUS FROM LED0: THRU LEDF:                        *
0456                    *   SEND BYTE OUT SCI RS-232 SERIAL PORT                    *
0457                    *   BYTE INDICATES ON/OFF STATUS OF LED, SLO OR FAST FLASH  *
0458                    ****************************************************
0459
0460 I 028C BE8A        UPDATE: LDX     LEDX            ;GET PRESENT VALUE OF X
0461 I 028E A310                CPX     #$10            ;IF X>15, THEN
0462 I 0290 250E                BLO     UPDAT1          ;   CLEAR PRESENT VALUE OF X
0463 I 0292 170F                BCLR    TE,SCCR2        ;   DISABLE TRANSMITTER
0464 I 0294 3F8A                CLR     LEDX            ;   ENABLE TRANSMITTER
0465 I 0296 B688                LDA     DISPLA          ;   GET PRESENT LED STATUS BYTES
0466 I 0298 B78D                STA     SREGA           ;ROTATE RIGHT TO CARRY BIT
0467 I 029A B68C                LDA     DISPLB          ;IF CARRY SET, THEN
0468 I 029C B78E                STA     SREGB           ;   SET BIT4 OF LEDX
0469 I 029E 160F                BSET    TE,SCCR2
0470 I 02A0 0F1015      UPDAT1: BRCLR   TDRE,SCSR,UPDATX
0471 I 02A3 98                  CLC
```

MAINLP

```
0472 I 02A4 368E                ROR    SREGB         ;ELSE, CLEAR BIT 4 OF LEDX
0473 I 02A6 368D                ROR    SREGA
0474 I 02A8 2404                BCC    UPDAT2
0475 I 02AA 188A                BSET   4,LEDX
0476 I 02AC 2002                BRA    UPDAT3
0477 I 02AE 198A    UPDAT2:     BCLR   4,LEDX
0478 I 02B0 B68A    UPDAT3:     LDA    LEDX
0479 I 02B2 B711                STA    SCDAT
0480 I 02B4 198A                BCLR   4,LEDX
0481 I 02B6 3C8A                INC    LEDX
0482 I 02B8 9D      UPDATX:     NOP                  ;END UPDATE
0483 I 02B9 0E7695              BRSET  7,PMODE,MAINLP
0484 I 02BC 2006                BRA    PURSUE
0485 I 02BE 9D9D9D              DB     3 DUP ($9D)
0486 I 02C1 CC0100              JMP    INITM
0487
0488                *******************************************************
0489                *                                         30-Jun-89 WJG  G6  *
0490                *                                                                                      *
0491                *   PURSUE:TOGGLE IN/OUT OF MODE 3 IF INPUT FROM PURS SWITCH *
0492                *                                                                                      *
0493                *******************************************************
0494
0495 I 02C4 010216  PURSUE: BRCLR  PURS,AUXPORT,PURSU1  ;IF INPUT FROM PURS,THEN
0496 I 02C7 06722B          BRSET  PSTFLG,FLAG,PURSUX   ;  IF PSTFLG CLEAR,THEN
0497 I 02CA 3C79            INC    LPCNT1               ;DEBOUNCE CLOSURE BY NOT COUNTING
0498 I 02CC 2627            BNE    PURSUX               ;PURSUIT SWITCH AS VALID CLOSURE
0499 I 02CE 3C7A            INC    LPCNT2               ;UNTIL IT HAS BEEN HELD
0500 I 02D0 A602            LDA    #$02                 ;THROUGH $200 MAINLP CYCLES
0501 I 02D2 B17A            CMP    LPCNT2               ;WITHOUT ANY RELEASES.
0502 I 02D4 261F            BNE    PURSUX
0503 I 02D6 CD0760          JSR    MOD3
0504 I 02D9 1672            BSET   PSTFLG,FLAG
0505 I 02DB 2018            BRA    PURSUX
0506 I 02DD B679   PURSU1:  LDA    LPCNT1               ;DEBOUNCE RELEASE BY NOT COUNTING
0507 I 02DF 2704            BEQ    PURSU2               ;PURSUE SWITCH AS VALID RELEASE
0508 I 02E1 3A79            DEC    LPCNT1               ;UNTIL IT HAS BEEN HELD THROUGH
0509 I 02E3 2010            BRA    PURSUX               ;AS MANY MAINLP CYCLES AS IT WAS
0510 I 02E5 B67A   PURSU2:  LDA    LPCNT2               ;CLOASED PRIOR TO ACKNOWLEDGEMENT
0511 I 02E7 2706            BEQ    PURSU3               ;OF VALID CLOSURE.
0512 I 02E9 3A79            DEC    LPCNT1
0513 I 02EB 3A7A            DEC    LPCNT2
0514 I 02ED 2006            BRA    PURSUX
0515 I 02EF 1772   PURSU3:  BCLR   PSTFLG,FLAG          ;ELSE, CLEAR FLAG
0516 I 02F1 3F79            CLR    LPCNT1
0517 I 02F3 3F7A            CLR    LPCNT2
0518 I 02F5 2006   PURSUX:  BRA    HRING                ;END PURSUE
0519 I 02F7 9D9D9D          DB     3 DUP ($9D)
0520 I 02FA CC0100          JMP    INITM
0521
0522                *******************************************************
0523                *                                                      5-25-88 *
0524                *   ENERGIZE HORN RING XFR RELAY IF MODE SG PROGRAMMED          *
0525                *                                                                                      *
0526                *******************************************************
0527
0528 I 02FD B674   HRING:  LDA    MODE                 ;IF MODE PRGRMD FOR TAPII, THEN
0529 I 02FF B455           AND    TAPEN                ;  ENERGIZE HORN XFR RELAY
```

```
                                                    MAINLP
0530 I 0301 2704                BEQ     HRING1          ; ELSE, DE-ENERGIZE XFR RELAY
0531 I 0303 1600                BSET    XFR,AMP
0532 I 0305 2002                BRA     HRING2
0533 I 0307 1700        HRING1: BCLR    XFR,AMP
0534 I 0309 2006        HRING2: BRA     TAPIN           ;END HRING
0535 I 030B 909090              DB      3 DUP ($90)
0536 I 030E CC0100              JMP     INITM
0537
0538                    ************************************************
0539                    *                   TAPIN  3-27-89 WJG           *
0540                    *    TAPIN CHKS FOR INPUT FROM TAPII             *
0541                    ************************************************
0542
0543 I 0311 040016      TAPIN:  BRSET   TAP,AMP,TAPIN1  ;IF INPUT FROM TAP, THEN
0544 I 0314 027224              BRSET   TAPFLG,FLAG,TAPINX  ; IF TAPFLG CLEAR, THEN
0545 I 0317 3C7B                INC     LPCNT3
0546 I 0319 2620                BNE     TAPINX
0547 I 031B 3C7C                INC     LPCNT4
0548 I 031D A602                LDA     #$02
0549 I 031F B17C                CMP     LPCNT4
0550 I 0321 2618                BNE     TAPINX
0551 I 0323 CD06E0              JSR     TAPII
0552 I 0326 1272                BSET    TAPFLG,FLAG
0553 I 0328 2011                BRA     TAPINX
0554 I 032A 03720C      TAPIN1: BRCLR   TAPFLG,FLAG,TAPIN2  ;IF NO INPUT FROM TAP,THEN
0555 I 032D 1D73                BCLR    PEAK,SIREN          ;  IF TAPFLG SET, THEN
0556 I 032F 1B73                BCLR    AHORN,SIREN         ;    CLEAR AHORN&PEAK
0557 I 0331 1F8B                BCLR    7,DISPLA            ;    CLEAR DISPLAY
0558 I 0333 1D8B                BCLR    6,DISPLA
0559 I 0335 3F7B                CLR     LPCNT3
0560 I 0337 3F7C                CLR     LPCNT4
0561 I 0339 1372        TAPIN2: BCLR    TAPFLG,FLAG         ;ELSE, CLEAR TAPFLG
0562 I 033B 2006        TAPINX: BRA     RADCHK              ;END TAPIN
0563 I 033D 909090              DB      3 DUP ($90)
0564 I 0340 CC0100              JMP     INITM
0565
0566                    ************************************************
0567                    *     ENABLE AMP FOR RADIO MODE      1-6-89 WJG   *
0568                    ************************************************
0569
0570 I 0343 03730C      RADCHK: BRCLR   RA,SIREN,PTTCHK
0571 I 0346 1E00                BSET    RADSEL,AMP
0572 I 0348 1000                BCLR    PAEN,AMP
0573 I 034A 2030                BRA     VOICE
0574 I 034C 909090              DB      3 DUP ($90)
0575 I 034F CC0100              JMP     INITM
0576
0577                    ************************************************
0578                    *     CHECK FOR INPUT FROM PTT SW      1-4-89     *
0579                    ************************************************
0580
0581 I 0352 030017      PTTCHK: BRCLR   PTT,AMP,PTTCHK2   ;CHECK FOR PTT INPUT
0582 I 0355 0A7212              BRSET   PTTFLG,FLAG,PTTCHK1
0583 I 0358 3C7D                INC     LPCNT5
0584 I 035A 2618                BNE     PTTCHKX
0585 I 035C 3C7E                INC     LPCNT6
0586 I 035E A602                LDA     #$02
0587 I 0360 B17E                CMP     LPCNT6
```

MAINLP

```
0588 I 0362 2610                 BNE     PTTCHKX
0589 I 0364 1C00                 BSET    PAEN,AMP
0590 I 0366 1F00                 BCLR    RADSEL,AMP
0591 I 0368 1A72                 BSET    PTTFLG,FLAG
0592 I 036A 2010    PTTCHK1: BRA VOICE
0593 I 036C 1B72    PTTCHK2: BCLR PTTFLG,FLAG
0594 I 036E 1D00                 BCLR    PAEN,AMP
0595 I 0370 3F7D                 CLR     LPCNT5
0596 I 0372 3F7E                 CLR     LPCNT6
0597 I 0374 2013    PTTCHKX: BRA AHCHK
0598 I 0376 9D9D9D               DB      3 DUP ($9D)
0599 I 0379 CC0100               JMP     INITM
0600
0601                 ************************************************
0602                 *                                              *
0603                 *   VOICE:SETS MUX AND AMP FOR VOICE, ENABLES AMP   1-4-89  *
0604                 *                                              *
0605                 ************************************************
0606
0607 I 037C 1A02    VOICE:  BSET    AMPEN,AUXPORT
0608 I 037E 18C2            BSET    BIAS,AUXPORT
0609 I 0380 CC03E0           JMP     NOTONE
0610 I 0383 9D9D9D           DB      3 DUP ($9D)
0611 I 0386 CC0100           JMP     INITM
0612
0613                 ************************************************
0614                 *                                              *
0615                 *   AHCHK                   1-4-89            *
0616                 *                                              *
0617                 ************************************************
0618
0619 I 0389 0B730F   AHCHK:  BRCLR   AHORN,SIREN,PKCHK
0620 I 038C CD0506           JSR     DOTONE
0621 I 038F CD059F           JSR     AHTONE
0622 I 0392 CC03FA           JMP     BDISPLY
0623 I 0395 9D9D9D           DB      3 DUP ($9D)
0624 I 0398 CC0100           JMP     INITM
0625
0626                 ************************************************
0627                 *   PKCHK                   1-4-89            *
0628                 ************************************************
0629
0630 I 039B 0D730F   PKCHK:  BRCLR   PEAK,SIREN,TONCHK
0631 I 039E CD0506           JSR     DOTONE
0632 I 03A1 CD0515           JSR     STONE
0633 I 03A4 CC03FA           JMP     BDISPLY
0634 I 03A7 9D9D9D           DB      3 DUP ($9D)
0635 I 03AA CC0100           JMP     INITM
0636
0637                 ************************************************
0638                 *                                              *
0639                 *   TONCHK:                 1-4-89            *
0640                 *                                              *
0641                 ************************************************
0642
0643 I 03AD 05742E   TONCHK: BRCLR   2,MODE,NOAMP    ; IF WAIL THEN
0644 I 03B0 057308           BRCLR   WA,SIREN,TCHK1
0645 I 03B3 CD0506           JSR     DOTONE
```

MAINLP

```
0646 I 03B6 CD0515              JSR     STONE
0647 I 03B9 203F                BRA     BDISPLY
0648 I 03BB 077308      TCHK1:  BRCLR   YE,SIREN,TCHK2      ; IF YELP THEN
0649 I 03BE CD0506              JSR     DOTONE
0650 I 03C1 CD056A              JSR     YTONE
0651 I 03C4 2034                BRA     BDISPLY
0652 I 03C6 09730A      TCHK2:  BRCLR   HL,SIREN,TCHK3
0653 I 03C9 CD0506              JSR     DOTONE
0654 I 03CC 127F                BSET    HLTM,THREN
0655 I 03CE CD05C7              JSR     HLTONE
0656 I 03D1 2027                BRA     BDISPLY
0657 I 03D3 0F7308      TCHK3:  BRCLR   SP1,SIREN,NOAMP
0658 I 03D6 CD0506              JSR     DOTONE
0659 I 03D9 CD05C6              JSR     SP1TONE
0660 I 03DC 201C                BRA     BDISPLY
0661 I 03DE 1B02        NOAMP:  BCLR    AMPEN,AUXPORT
0662 I 03E0 1572        NOTONE: BCLR    TONEFLG,FLAG
0663 I 03E2 1100                BCLR    TONE,AMP            ; Added to zero Siren Output
0664 I 03E4 1000                BSET    TONE,AMP            ; Added to zero Siren Output
0665 I 03E6 1104                BCLR    0,DDRA
0666 I 03E8 1000                BSET    TONE,AMP            ; Added to zero Siren Output
0667 I 03EA 1900                BCLR    TONEN,AMP
0668 I 03EC 1D12                BCLR    OCIE,TCR
0669 I 03EE 137F                BCLR    HLTM,THREN
0670 I 03F0 3F87                CLR     HLTMR
0671 I 03F2 2006                BRA     BDISPLY
0672 I 03F4 9D9D9D              DB      3 DUP ($9D)
0673 I 03F7 CC0100              JMP     INITM
0674
0675                    *********************************************************
0676                    *                                   BDISPLY WJG 10-11-88 *
0677                    *   BDISPLY SETS DISPLB=RELAY STATUS(A-E), AND MODE      *
0678                    *********************************************************
0679
0680 I 03FA B675        BDISPLY: LDA    RSTAT               ;SET DISPLB=MODES 1-3, OUTA-E
0681 I 03FC A4F8                AND     #$F8
0682 I 03FE BA74                ORA     MODE
0683 I 0400 B78C                STA     DISPLB
0684 I 0402 2006                BRA     THRCHKS
0685 I 0404 9D9D9D              DB      3 DUP ($9D)
0686 I 0407 CC0100              JMP     INITM
0687
0688                    *********************************************************
0689                    *                                          1-25-89       *
0690                    *  THRCHK:CHECKS BIT 6 OF TIMERS A-E,CLEARS CORRESPONDING*
0691                    *  THREN BIT IF SET                                      *
0692                    *********************************************************
0693
0694 I 040A 0D8006      THRCHKS: BRCLR  6,STBTMR,THRCHKA    ; was 4 for STBTMR
0695 I 040D 1775                BCLR    OUTA,RSTAT
0696 I 040F 117F                BCLR    STB,THREN
0697 I 0411 3F80                CLR     STBTMR
0698 I 0413 0D8104      THRCHKA: BRCLR  6,TMRA,THRCHKB      ; was 6 for Shotgun Timer
0699 I 0416 177F                BCLR    OUTATM,THREN
0700 I 0418 3F81                CLR     TMRA
0701 I 041A 0D8206      THRCHKB: BRCLR  6,TMRB,THRCHKC
0702 I 041D 1975                BCLR    OUTB,RSTAT
0703 I 041F 197F                BCLR    OUTBTM,THREN
```

MAINLP

```
0704 I 0421 3F82              CLR    THRB
0705 I 0423 0D8306   THRCHKC: BRCLR  6,THRC,THRCHKD
0706 I 0426 1B75              BCLR   OUTC,RSTAT
0707 I 0428 187F              BCLR   OUTCTH,THREN
0708 I 042A 3F83              CLR    THRC
0709 I 042C 0D8406   THRCHKD: BRCLR  6,THRD,THRCHKE
0710 I 042F 1D75              BCLR   OUTD,RSTAT
0711 I 0431 1D7F              BCLR   OUTDTH,THREN
0712 I 0433 3F84              CLR    THRD
0713 I 0435 0D8506   THRCHKE: BRCLR  6,THRE,YELCHK
0714 I 0438 1F75              BCLR   OUTETH,RSTAT
0715 I 043A 1F7F              BCLR   OUTE,THREN
0716 I 043C 3F85              CLR    THRE
0717 I 043E 077309   YELCHK:  BRCLR  YE,SIREN,YELCHK1
0718 I 0441 057406            BRCLR  2,MODE,YELCHK1
0719 I 0444 0D8607            BRCLR  6,YELTMR,THRCHKX
0720 I 0447 CD06E0            JSR    TAPII
0721 I 044A 3F86     YELCHK1: CLR    YELTMR
0722 I 044C 157F              BCLR   YELTM,THREN
0723
0724 I 044E CC0251   THRCHKX: JMP   MAINLP            ;   END THRCHK  (END OF MAIN!)
0725 I 0451 9D9D9D            DB     3 DUP ($9D)
0726 I 0454 CC0100            JMP    INITM
0727
0729                 ************************************************************
0730                 *    JUMP TABLE FOR INPUT COMMAND INTERPRETATION           *
0731                 ************************************************************
0732
0733 I 0457 CC0649   JMPTAB:  JMP    STBY0             ; was STBY changed for Shotgun Interlock
0734 I 045A CC066E   JMP1:    JMP    RAD
0735 I 045D CC067E   JMP2:    JMP    PA
0736 I 0460 CC068C   JMP3:    JMP    WAIL
0737 I 0463 CC06A7   JMP4:    JMP    YELP
0738 I 0466 CC06C8   JMP5:    JMP    HILO
0739 I 0469 CC06E0   JMP6:    JMP    TAPII
0740 I 046C CC072D   JMP7:    JMP    AH
0741 I 046F CC0740   JMP8:    JMP    MOD1
0742 I 0472 CC0750   JMP9:    JMP    MOD2
0743 I 0475 CC0760   JMPA:    JMP    MOD3
0744 I 0478 CC0774   JMPB:    JMP    PBA
0745 I 047B CC0788   JMPC:    JMP    PBB
0746 I 047E CC079E   JMPD:    JMP    PBC
0747 I 0481 CC07B4   JMPE:    JMP    PBD
0748 I 0484 CC07CA   JMPF:    JMP    PBE
0749 I 0487 8181818181818181   DB    48 DUP ($81)
             8181818181818181
             8181818181818181
             8181818181818181
             8181818181818181
             8181818181818181
0750
0751                 ************************************************************
0752                 *    THESE JUMPS ARE TAKEN WHILE IN PRGRM MODE, ie.,       *
0753                 *    KEYCODE=LOWER CASE, BIT D5=1                          *
0754                 ************************************************************
0755
0756 I 0487 CC07E0   JMPP0:   JMP    PSTBY
0757 I 048A CC07EE   JMPP1:   JMP    PRAD
```

COMMAND INTERPRETATION JUMP TABLES

```
0758 I 04BD CC07F4           JMPP2:   JMP    PPA
0759 I 04C0 CC07FA           JMPP3:   JMP    PWAIL
0760 I 04C3 CC082A           JMPP4:   JMP    PYELP
0761 I 04C6 CC085A           JMPP5:   JMP    PHILO
0762 I 04C9 CC088A           JMPP6:   JMP    PHAN
0763 I 04CC CC088A           JMPP7:   JMP    PAH
0764 I 04CF CC08D0           JMPP8:   JMP    PMOD1
0765 I 04D2 CC0914           JMPP9:   JMP    PMOD2
0766 I 04D5 CC0948           JMPPA:   JMP    PMOD3
0767 I 04D8 CC0994           JMPPB:   JMP    PPBA
0768 I 04DB CC09BE           JMPPC:   JMP    PPBB
0769 I 04DE CC09FA           JMPPD:   JMP    PPBC
0770 I 04E1 CC0A24           JMPPE:   JMP    PPBD
0771 I 04E4 CC0A4E           JMPPF:   JMP    PPBE
0772
0774           ******************************************************
0775           *                                                    *
0776           *       THIS AREA FOR SUBROUTINES                    *
0777           *                                                    *
0778           ******************************************************
0779
0780           ******************************************************
0781           *                                      GB 31-MAY-1989 *
0782           * SUBROUTINE CSUM: TO CALCULATE AND VERIFY CORRECT CHECKSUM OF *
0783           *                     RAM AND EEPROM                  *
0784           ******************************************************
0785
0786       000004E7          CSUM:    EQU    *              ; Compute a Checksum On:
0787 I 04E7 1F72                      BCLR   CKSFLG,FLAG    ; {SEI}
0788 I 04E9 B650                      LDA    RMCOPY         ; VERSN
0789 I 04EB BB51                      ADD    RMCOPY+1       ; ALTEN
0790 I 04ED BB52                      ADD    RMCOPY+2       ; OUTEN1
0791 I 04EF BB53                      ADD    RMCOPY+3       ; OUTEN2
0792 I 04F1 BB54                      ADD    RMCOPY+4       ; OUTEN3
0793 I 04F3 BB55                      ADD    RMCOPY+5       ; TAPEN
0794 I 04F5 BB56                      ADD    RMCOPY+6       ; PWRUP
0795 I 04F7 BB57                      ADD    RMCOPY+7       ; THRSEL
0796 I 04F9 BB58                      ADD    RMCOPY+8       ; SIRENS &
0797 I 04FB BB59                      ADD    RMCOPY+9       ; YELTMOUT
0798 I 04FD B16F                      CMP    RMCOPY+31      ; and Compare with previous CHCKSUM
0799 I 04FF 2704                      BEQ    CSUMX          ; If Incorrect Then
0800 I 0501 B76F                      STA    CHCKSUM        ; Save Corrected CHCKSUM
0801 I 0503 1E72                      BSET   CKSFLG,FLAG    ; Set the Checksum Error Flag
0802 I 0505 81            CSUMX:      RTS                   ; {CLI}
0803
0805           ******************************************************
0806           *                                                    *
0807           *  DOTONE:SETS MUX AND AMP FOR TONES  1-6-89   WJG    *
0808           *                                                    *
0809           ******************************************************
0810
0811 I 0506 1800          DOTONE:     BSET   TONEN,AMP
0812 I 0508 1F00                      BCLR   RADSEL,AMP
0813 I 050A 1000                      BCLR   PAEN,AMP
0814 I 050C 1902                      BCLR   BIAS,AUXPORT
0815 I 050E 1A02                      BSET   AMPEN,AUXPORT
0816 I 0510 1C12                      BSET   OCIE,TCR
0817 I 0512 1004                      BSET   0,DDRA
```

```
0818 ] 0514 81                       RTS
0819
0820               **********************************************************
0821               *    STONE (SirenTONE)           1-20-89                 *
0822               **********************************************************
0823
0824 I 0515 047206        STONE:  BRSET   TONEFLG,FLAG,STON1  ;IF SEGEND FLAG SET, THEN
0825 I 0518 1172                  BCLR    SEGEND,FLAG
0826 I 051A 1472                  BSET    TONEFLG,FLAG
0827 I 051C 202F                  BRA     STON6
0828 I 051E 017248        STON1:  BRCLR   SEGEND,FLAG,STONX
0829 I 0521 BE93                  LDX     SEGPNTR
0830 I 0523 3A94                  DEC     SEGCNT              ;DEC SEGCNT
0831 I 0525 2607                  BNE     STON2               ;IF SEGCNT=0, THEN
0832 I 0527 5C                    INCX                        ;   INCX(TO NEW SEGCNT)
0833 I 0528 D60C00                LDA     TABLE,X
0834 I 052B B794                  STA     SEGCNT              ;   SET NEW SEGCNT       IF CYCLCNT=255, THEN
0835 I 052D 5C                    INCX                        ;   INCX(TO CYCLCNT)         BRANCH TO STON7
0836 I 052E D60C00        STON2:  LDA     TABLE,X             ;GET NEW CYCLCNT    IF SEGSIZE=-, THEN
0837 I 0531 271A                  BEQ     STON6               ;IF CYCLCNT=0, THEN              BRANCH TO STONE2
0838 I 0533 2A0E                  BPL     STON4               ;   BRANCH TO STON6  ELSE, BRANCH TO STON5
0839 I 0535 A1FF                  CMP     #255                ;   IF CYCLCNT=+, THEN
0840 I 0537 2602                  BNE     STON3               ;   BRANCH TO STON4
0841 I 0539 2023                  BRA     STON7
0842 I 053B 3C91        STON3:    INC     OFFSETL             ;DECREASE FREQ
0843 I 053D 261F                  BNE     STON7
0844 I 053F 3C90                  INC     OFFSETH
0845 I 0541 201B                  BRA     STON7               ;BRANCH TO STON5
0846 I 0543 B691        STON4:    LDA     OFFSETL             ;INCREASE FREQ
0847 I 0545 2602                  BNE     STON5
0848 I 0547 3A90                  DEC     OFFSETH
0849 I 0549 3A91        STON5:    DEC     OFFSETL
0850 I 054B 2011                  BRA     STON7               ;BRANCH TO STON5
0851 I 054D BE96        STON6:    LDX     INDEX               ;START OVER
0852 I 054F 5C                    INCX                        ;INCX(TO SEGCNT)
0853 I 0550 A601                  LDA     #$01                ;SET OFFSET=$166
0854 I 0552 B790                  STA     OFFSETH
0855 I 0554 A666                  LDA     #$66                ;WAS #$66
0856 I 0556 B791                  STA     OFFSETL
0857 I 0558 D60C00                LDA     TABLE,X             ;GET INIT SEGCNT
0858 I 055B B794                  STA     SEGCNT
0859 I 055D 5A                    DECX                        ;SET X TO CYCLCNT
0860 I 055E D60C00       STON7:   LDA     TABLE,X             ;SET CYCLCNT=SEGSIZE
0861 I 0561 A47F                  AND     #$7F                ;SET BIT 7=0
0862 I 0563 B795                  STA     CYCLCNT
0863 I 0565 BF93                  STX     SEGPNTR             ;INCREMENT SEGPNTR
0864 I 0567 1172                  BCLR    SEGEND,FLAG         ;CLEAR SEGEND FLAG
0865 I 0569 81          STONX:    RTS                         ;RETURN TO MAIN LOOP
0866
0867              **********************************************************
0868              *     YTONE:                       5-9-89                *
0869              **********************************************************
0870
0871 I 056A 017231       YTONE:   BRCLR   SEGEND,FLAG,YTONX
0872 I 056D 047202                BRSET   TONEFLG,FLAG,YTON1
0873 I 0570 201B                  BRA     YTON2
0874 I 0572 BE93        YTON1:    LDX     SEGPNTR
0875 I 0574 D60C00                LDA     TABLE,X             ; Fetch from YTABLE
```

```
0876 I 0577 2711              BEQ     YTON2           ; IF $00 do default 700Hz tone
0877 I 0579 B795              STA     CYCLCNT         ; Decremented by THRINT
0878 I 057B 5C                INCX
0879 I 057C D60C00            LDA     TABLE,X         ; Fetch next from YTABLE
0880 I 057F B790              STA     OFFSETH         ; High Byte of Tone's period = 1/f
0881 I 0581 5C                INCX
0882 I 0582 D60C00            LDA     TABLE,X         ; Fetch next from YTABLE
0883 I 0585 B791              STA     OFFSETL         ; Low Byte of Tone's period = 1/f
0884 I 0587 5C                INCX
0885 I 0588 2010              BRA     YTON3
0886 I 058A BE96      YTON2:  LDX     INDEX
0887 I 058C A602              LDA     #$02            ; Default Tone's duration ($FF)
0888 I 058E B795              STA     CYCLCNT
0889 I 0590 A601              LDA     #$01            ; OFFSET = $0166 = 700Hz
0890 I 0592 B790              STA     OFFSETH
0891 I 0594 A651              LDA     #$51            ; was #$79, was #$66
0892 I 0596 B791              STA     OFFSETL
0893 I 0598 1472              BSET    TONEFLG,FLAG    ; Set if Cyclecount .NE. 0
0894 I 059A BF93      YTON3:  STX     SEGPNTR
0895 I 059C 1172              BCLR    SEGEND,FLAG
0896 I 059E 81        YTONX:  RTS
0897
0898
0899                  *       AHTONE:               1-12-89                         *
0900
0901
0902 I 059F 017223    AHTONE: BRCLR   SEGEND,FLAG,AHTONX
0903 I 05A2 097210            BRCLR   AHFLG,FLAG,AHTON1
0904 I 05A5 A601              LDA     #$01
0905 I 05A7 B790              STA     OFFSETH
0906 I 05A9 A666              LDA     #$66
0907 I 05AB B791              STA     OFFSETL
0908 I 05AD A609              LDA     #$09
0909 I 05AF B795              STA     CYCLCNT
0910 I 05B1 1972              BCLR    AHFLG,FLAG
0911 I 05B3 200E              BRA     AHTON2
0912 I 05B5 A600     AHTON1:  LDA     #$00
0913 I 05B7 B790              STA     OFFSETH
0914 I 05B9 A6AF              LDA     #$AF
0915 I 05BB B791              STA     OFFSETL
0916 I 05BD A604              LDA     #$04
0917 I 05BF B795              STA     CYCLCNT
0918 I 05C1 1872              BSET    AHFLG,FLAG
0919 I 05C3 1172     AHTON2:  BCLR    SEGEND,FLAG
0920 I 05C5 81       AHTONX:  RTS                     ; {RTS}
0921
0922
0923                  *       SP1TONE:              1-5-89                          *
0924
0925
0926 I 05C6 81       SP1TONE: RTS
0927
0928
0929                  *       HLTONE:               1-12-89 WJG                     *
0930
0931
0932 I 05C7 05870A   HLTONE:  BRCLR   2,HLTMR,HL1
0933 I 05CA A601              LDA     #$01
```

```
0934 I 05CC B790              STA    OFFSETH
0935 I 05CE A639              LDA    #$39
0936 I 05D0 B791              STA    OFFSETL
0937 I 05D2 2006              BRA    HLX
0938 I 05D4 3F90    HL1:      CLR    OFFSETH
0939 I 05D6 A6FA              LDA    #$FA
0940 I 05D8 B791              STA    OFFSETL
0941 I 05DA 81      HLX:      RTS
0942
0944                          ;************************************************
0945                          ;                          WRPROM.SRC WJG 11-9-88 *
0946                          ;  WRPROM ERASES EEPROM & WRITES 16, 16 BIT WORDS INTO *
0947                          ;  EEPROM FROM RMCOPY.                              *
0948                          ;************************************************
0949
0950 I 05DB 5F      WRPROM:   CLRX
0951 I 05DC A601              LDA    #$01
0952 I 05DE CD0627             JSR    PRMSND          ;SEND START BIT
0953 I 05E1 A63F              LDA    #$3F
0954 I 05E3 CD0627             JSR    PRMSND          ;SEND EWEN
0955 I 05E6 1D02              BCLR   EECS,AUXPORT    ;TURN OFF CS FOR >1US
0956 I 05E8 A601              LDA    #$01            ;SEND START BIT
0957 I 05EA CD0627             JSR    PRMSND
0958 I 05ED A62F              LDA    #$2F
0959 I 05EF CD0627             JSR    PRMSND          ;SEND ERAL
0960 I 05F2 1D02              BCLR   EECS,AUXPORT    ;TURN OFF CS FOR>30MS
0961 I 05F4 CD0635             JSR    PRMDLY
0962 I 05F7 A601    WRPROM1:  LDA    #$01
0963 I 05F9 CD0627             JSR    PRMSND          ;SEND START BIT
0964 I 05FC B670              LDA    PRMPTR          ;GET REG #
0965 I 05FE AA40              ORA    #$40            ;OR W/REG WRITE INSTR
0966 I 0600 CD0627             JSR    PRMSND          ;SEND REG WRITE INSTR
0967 I 0603 E650              LDA    RMCOPY,X        ;GET 1ST WORD
0968 I 0605 CD0627             JSR    PRMSND          ;SEND 1ST WORD
0969 I 0608 5C                INCX
0970 I 0609 E650              LDA    RMCOPY,X        ;GET 2ND WORD
0971 I 060B CD0627             JSR    PRMSND          ;SEND 2ND WORD
0972 I 060E 1D02              BCLR   EECS,AUXPORT    ;TURN OFF CS FOR >30MS
0973 I 0610 5C                INCX
0974 I 0611 CD0635             JSR    PRMDLY
0975 I 0614 3C70              INC    PRMPTR
0976 I 0616 A320              CPX    #$20
0977 I 0618 25DD              BLO    WRPROM1
0978 I 061A A601              LDA    #$01
0979 I 061C CD0627             JSR    PRMSND          ;SEND START BIT
0980 I 061F A60F              LDA    #$0F
0981 I 0621 CD0627             JSR    PRMSND          ;SEND EWDS
0982 I 0624 1D02              BCLR   EECS,AUXPORT
0983 I 0626 81                RTS
0984 I 0627 1C02    PRMSND:   BSET   EECS,AUXPORT
0985 I 0629 B70C    PRMSND1:  STA    SPDR
0986 I 062B 0F0BFB             BRCLR  SPIF,SPSR,PRMSND1
0987 I 062E B602              LDA    AUXPORT         ;WAIT TILL DONE & TOGGLE WATCHDOG
0988 I 0630 A802              EOR    #$02
0989 I 0632 B702              STA    AUXPORT
0990 I 0634 81                RTS
0991 I 0635 A61F    PRMDLY:   LDA    #$1F            ;DELAY FOR EEPROM CS
0992 I 0637 B771              STA    DCNTR
```

```
0993 I 0639 4A           PRMDLY1: DECA
0994 I 063A 26FD                  BNE     PRMDLY1
0995 I 063C B602                  LDA     AUXPORT          ;TOGGLE WATCHDOG DURING DELAY
0996 I 063E A802                  EOR     #$02
0997 I 0640 B702                  STA     AUXPORT
0998 I 0642 A6FF                  LDA     #$FF
0999 I 0644 3A71                  DEC     DCNTR
1000 I 0646 26F1                  BNE     PRMDLY1
1001 I 0648 81                    RTS
1002
1004                     ************************************************
1005                     *   THE FOLLOWING SUBROUTINES ARE EXECUTED IN RESPONSE TO    *
1006                     *   COMMAND INPUTS FROM THE CONTROL HEAD KEYBOARD-SEE JMPTAB: *
1007                     *   STBY0 & SHOTGUN SECTIONS ADDED          68  32-Jun-89  *
1008                     ************************************************
1009
1010 I 0649 067F18       STBY0:   BRSET   OUTA,THREN,SHOTGUN
1011 I 064C 0F7608       STBY:    BRCLR   7,PMODE,STB1
1012 I 064F CD04E7                JSR     CSUM             ;CALCULATE NEW CHECKSUM
1013 I 0652 1F72                  BCLR    CKSFLG,FLAG      ;CLEAR CHECKSUM ERROR FLAG
1014 I 0654 CD05DB                JSR     WRPROM           ;STORE IT AND NEW PROG. INFO. IN EEPROM
1015 I 0657 3F73         STB1:    CLR     SIREN            ;CLR SIREN
1016 I 0659 3F76                  CLR     PMODE            ;CLR PROGRAM MODE(SET TO RUN MODE)
1017 I 065B 1073                  BSET    STB,SIREN        ;SET SIREN=STBY
1018                     *        BSET    STB,THREN
1019 I 065D B68B                  LDA     DISPLA
1020 I 065F A404                  AND     #$04
1021 I 0661 AA01                  ORA     #$01
1022 I 0663 B78B                  STA     DISPLA
1023 I 0665 2006                  BRA     STBYX
1024 I 0667 107F         SHOTGUN: BSET    STB,THREN        ;ACTIVATE SHOTGUN TIMER
1025 I 0669 1675                  BSET    OUTA,RSTAT       ;RELEASE SHOTGUN
1026 I 066B 177F                  BCLR    OUTA,THREN       ;DISARM SHOTGUN INTERLOCK
1027 I 066D 81           STBYX:   RTS
1028
1029      0000066E       RAD:     EQU     *                ;IF SIREN NOT=RADIO, THEN
1030 I 066E 0273DB                BRSET   RA,SIREN,STBY    ;   CLR SIREN
1031 I 0671 3F73                  CLR     SIREN            ;   SET SIREN=RADIO
1032 I 0673 1273                  BSET    RA,SIREN
1033 I 0675 B68B                  LDA     DISPLA
1034 I 0677 A404                  AND     #$04
1035 I 0679 AA02                  ORA     #$02
1036 I 067B B78B                  STA     DISPLA
1037 I 067D 81                    RTS                      ;ELSE, BRANCH TO STANDBY
1038
1039      0000067E       PA:      EQU     *                ;IF MIC RELAY NOT ENERGIZED, THEN
1040 I 067E 0A0006                BRSET   CMRLY,AMP,PA1    ;   ENERGIZE COMMON MIC RELAY
1041 I 0681 1A00                  BSET    CMRLY,AMP        ;ELSE, CLR MIC RELAY
1042 I 0683 1488                  BSET    2,DISPLA
1043 I 0685 2004                  BRA     PA2
1044 I 0687 1B00         PA1:     BCLR    CMRLY,AMP
1045 I 0689 158B                  BCLR    2,DISPLA
1046 I 068B 81           PA2:     RTS
1047
1048      0000068C       WAIL:    EQU     *
1049 I 068C 075B17                BRCLR   3,SIRENS,WAILX   ;IF SIREN NOT=WAIL, THEN
1050 I 068F 0473BA                BRSET   WA,SIREN,STBY    ;   CLR SIREN
1051 I 0692 3F73                  CLR     SIREN            ;   SET SIREN=WAIL
```

```
1052 I 0694 1473           BSET    WA,SIREN
1053 I 0696 3F96           CLR     INDEX
1054 I 0698 3F97           CLR     SINDEX
1055 I 069A 1572           BCLR    TONEFLG,FLAG
1056 I 069C 3F94           CLR     SEGCNT          ;   CLR ALL TONE CNTRS
1057 I 069E B68B           LDA     DISPLA          ;   SET DISPLA=WAIL
1058 I 06A0 A404           AND     #$04
1059 I 06A2 AA08           ORA     #$08
1060 I 06A4 B78B           STA     DISPLA
1061 I 06A6 81    WAILX:   RTS                     ;ELSE, BRANCH TO STANDBY
1062
1063
1064      000006A7 YELP:   EQU     *
1065 I 06A7 09581D         BRCLR   4,SIRENS,YELPX  ;IF SIREN NOT=YELP, THEN
1066 I 06AA 06739F         BRSET   YE,SIREN,STBY   ;   CLR SIREN
1067 I 06AD 3F73           CLR     SIREN           ;   SET SIREN=YELP
1068 I 06AF 1673           BSET    YE,SIREN
1069 I 06B1 A622           LDA     #34
1070 I 06B3 B796           STA     INDEX           ;   SET INDEX=YTABLE
1071 I 06B5 B797           STA     SINDEX
1072 I 06B7 3F94           CLR     SEGCNT          ;   CLR ALL TONE CNTRS
1073 I 06B9 1572           BCLR    TONEFLG,FLAG
1074 I 06BB 3F93           CLR     SEGPNTR
1075 I 06BD 3F95           CLR     CYCLCNT
1076 I 06BF B68B           LDA     DISPLA          ;   SET DISPLA=YELP
1077 I 06C1 A404           AND     #$04
1078 I 06C3 AA10           ORA     #$10
1079 I 06C5 B78B           STA     DISPLA
1080 I 06C7 81    YELPX:   RTS                     ;ELSE, BRANCH TO STANDBY
1081
1082      000006C8 HILO:   EQU     *
1083 I 06C8 0B5814         BRCLR   5,SIRENS,HILOX  ;  IF SIREN NOT=HI/LO, THEN
1084 I 06CB 097303         BRCLR   HL,SIREN,HILO2
1085 I 06CE CC064C         JMP     STBY
1086 I 06D1 3F73   HILO2:  CLR     SIREN           ;   CLR SIREN
1087 I 06D3 1572           BCLR    TONEFLG,FLAG
1088 I 06D5 1873           BSET    HL,SIREN        ;   SET SIREN=HI/LO
1089 I 06D7 B68B           LDA     DISPLA
1090 I 06D9 A404           AND     #$04
1091 I 06DB AA20           ORA     #$20
1092 I 06DD B78B           STA     DISPLA
1093 I 06DF 81    HILOX:   RTS                     ;ELSE,BRANCH TO STBY
1094
1095      000006E0 TAPII:  EQU     *
1096 I 06E0 027347         BRSET   RA,SIREN,TAPX   ;IF SIREN NOT=RADIO, THEN
1097 I 06E3 05743C         BRCLR   2,MODE,TAP3
1098 I 06E6 B68B           LDA     DISPLA
1099 I 06E8 A404           AND     #$04            ;   IF MODE=3, THEN
1100 I 06EA 057318         BRCLR   WA,SIREN,TAP1   ;      IF SIREN=WAIL, THEN
1101 I 06ED 09583A         BRCLR   4,SIRENS,TAPX
1102 I 06F0 1673           BSET    YE,SIREN                SET SIREN=YELP
1103 I 06F2 AA10           ORA     #$10
1104 I 06F4 B78B           STA     DISPLA
1105 I 06F6 1573           BCLR    WA,SIREN
1106 I 06F8 A622           LDA     #34
1107 I 06FA B796           STA     INDEX
1108 I 06FC B797           STA     SINDEX
1109 I 06FE C95929         BRCLR   04,YELTMOUT,TAPX
```

```
1110 I 0701 147F                 BSET    YELTM,THREN
1111 I 0703 2025                 BRA     TAPX
1112 I 0705 077311      TAP1:    BRCLR   YE,SIREN,TAP2       ;       IF SIREN=YELP, THEN
1113 I 0708 07581F               BRCLR   3,SIRENS,TAPX
1114 I 070B 1473                 BSET    WA,SIREN            ;           SET SIREN=WAIL
1115 I 070D AA08                 ORA     #$08
1116 I 070F B788                 STA     DISPLA
1117 I 0711 1773                 BCLR    YE,SIREN
1118 I 0713 3F96                 CLR     INDEX
1119 I 0715 3F97                 CLR     SINDEX
1120 I 0717 2011                 BRA     TAPX
1121 I 0719 097306      TAP2:    BRCLR   HL,SIREN,TAP3       ;       IF SIREN=HI/LO, THEN
1122 I 071C 1A73                 BSET    AHORN,SIREN         ;           SET SIREN=AIR HORN
1123 I 071E 1E88                 BSET    7,DISPLA
1124 I 0720 2008                 BRA     TAPX
1125 I 0722 1C73        TAP3:    BSET    PEAK,SIREN          ;       ELSE, SET SIREN=PEAK
1126 I 0724 1C8B                 BSET    6,DISPLA
1127 I 0726 A6A4                 LDA     #164
1128 I 0728 B796                 STA     INDEX
1129 I 072A 1572        TAPX:    BCLR    TONEFLG,FLAG
1130 I 072C 81                   RTS                         ;       ELSE, END TAP11
1131
1132      0000072D       AH:     EQU     *
1133 I 072D 0F5806               BRCLR   7,SIRENS,AHX
1134 I 0730 1A73                 BSET    AHORN,SIREN         ;SET SIREN AIR HORN BIT
1135 I 0732 1E88                 BSET    7,DISPLA            ;SETDISPLA=AIR HORN
1136 I 0734 1572                 BCLR    TONEFLG,FLAG
1137 I 0736 81          AHX:     RTS
1138
1139      00000737      MOD0:    EQU     *                   ;SET MODE=0
1140 I 0737 3F74                 CLR     MODE                ;MASK OUTPUTS A-E
1141 I 0739 B675                 LDA     RSTAT               ;TURN OFF OUTPUTS 1,2 & 3
1142 I 073B A4F8                 AND     #$F8
1143 I 073D B775                 STA     RSTAT
1144 I 073F 81                   RTS
1145
1146      00000740      MOD1:    EQU     *                   ;IF MODE NOT=1, THEN
1147 I 0740 0074F4               BRSET   0,MODE,MOD0         ;   CLEAR MODE
1148 I 0743 3F74                 CLR     MODE                ;   SET MODE=1
1149 I 0745 1074                 BSET    0,MODE              ;   IF OUTPUTS A-E ON, THEN
1150 I 0747 B675                 LDA     RSTAT               ;       LEAVE THEM ON
1151 I 0749 A4F8                 AND     #$F8                ;   IF PROGRAMMED, THEN
1152 I 074B BA52                 ORA     OUTEN1              ;       TURN ON OUTPUTS 1-E
1153 I 074D B775                 STA     RSTAT
1154 I 074F 81                   RTS                         ;   ELSE, BRANCH TO MOD0
1155
1156      00000750      MOD2:    EQU     *                   ;IF MODE NOT=2, THEN
1157 I 0750 0274E4               BRSET   1,MODE,MOD0         ;   CLEAR MODE
1158 I 0753 3F74                 CLR     MODE                ;   SET MODE=2
1159 I 0755 1274                 BSET    1,MODE              ;   IF OUTPUTS A-E ON, THEN
1160 I 0757 B675                 LDA     RSTAT               ;       LEAVE THEM ON
1161 I 0759 A4F8                 AND     #$F8                ;   IF PROGRAMMED, THEN
1162 I 075B BA53                 ORA     OUTEN2              ;       TURN ON OUTPUTS 1-E
1163 I 075D B775                 STA     RSTAT
1164 I 075F 81                   RTS                         ;   ELSE, BRANCH TO MOD0
1165
1166      00000760      MOD3:    EQU     *                   ;IF MODE NOT=3, THEN
1167 I 0760 0474D4               BRSET   2,MODE,MOD0         ;   CLEAR MODE
```

```
1168 I 0763 3F74            CLR     MODE            ;     SET MODE=3
1169 I 0765 1474            BSET    2,MODE          ;     IF OUTPUTS A-E ON, THEN
1170 I 0767 B675            LDA     RSTAT           ;         LEAVE THEM ON
1171 I 0769 A4F8            AND     #$F8            ;     IF PROGRAMMED, THEN
1172 I 076B BA54            ORA     OUTEN3          ;         TURN ON OUTPUTS 1-E
1173 I 076D B775            STA     RSTAT
1174 I 076F B697            LDA     SINDEX
1175 I 0771 B796            STA     INDEX
1176 I 0773 81              RTS
1177
1178      00000774  PBA:    EQU     *
1179 I 0774 07510E          BRCLR   OUTA,ALTEN,PBA2 ; IF MOMENTARY, TURN IT ON
1180 I 0777 0675C7          BRSET   OUTA,RSTAT,PBA1 ; IF ON TURN IT OFF
1181 I 077A 075708          BRCLR   OUTA,THRSEL,PBA2
1182 I 077D 167F            BSET    OUTA,THREN      ; ELSE ARM THE SHOTGUN INTERLOCK TIMER ONLY
1183 I 077F 2006            BRA     PBA3            ; AND EXIT
1184 I 0781 1775    PBA1:   BCLR    OUTA,RSTAT      ; OFF
1185 I 0783 2002            BRA     PBA3
1186 I 0785 1675    PBA2:   BSET    OUTA,RSTAT      ; ON
1187 I 0787 81      PBA3:   RTS
1188
1189      00000788  PBB:    EQU     *               ; IF PROGRAMMED ALTERNATE, THEN
1190 I 0788 095110          BRCLR   OUTB,ALTEN,PBB2 ;     IF OUTPUTB=ON, THEN
1191 I 078B 087509          BRSET   OUTB,RSTAT,PBB1 ;         TURN IT OFF
1192 I 078E 1875            BSET    OUTB,RSTAT      ;     IF OUTPUTB=OFF, THEN
1193 I 0790 09570A          BRCLR   OUTB,THRSEL,PBB3
1194 I 0793 187F            BSET    OUTB,THREN
1195 I 0795 2006            BRA     PBB3            ;         TURN IT ON
1196 I 0797 1975    PBB1:   BCLR    OUTB,RSTAT      ; IF PROGRAMMED MOMENTARY, THEN
1197 I 0799 2002            BRA     PBB3            ;     TURN ON OUTPUTB
1198 I 079B 1875    PBB2:   BSET    OUTB,RSTAT
1199 I 079D 81      PBB3:   RTS
1200
1201      0000079E  PBC:    EQU     *               ; IF PROGRAMMED ALTERNATE, THEN
1202 I 079E 0B5110          BRCLR   OUTC,ALTEN,PBC2 ;     IF OUTPUTC=ON, THEN
1203 I 07A1 0A7509          BRSET   OUTC,RSTAT,PBC1 ;         TURN IT OFF
1204 I 07A4 1A75            BSET    OUTC,RSTAT      ;     IF OUTPUTC=OFF, THEN
1205 I 07A6 0B570A          BRCLR   OUTC,THRSEL,PBC3
1206 I 07A9 1A7F            BSET    OUTC,THREN
1207 I 07AB 2006            BRA     PBC3            ;         TURN IT ON
1208 I 07AD 1B75    PBC1:   BCLR    OUTC,RSTAT      ; IF PROGRAMMED MOMENTARY, THEN
1209 I 07AF 2002            BRA     PBC3            ;     TURN ON OUTPUTC
1210 I 07B1 1A75    PBC2:   BSET    OUTC,RSTAT
1211 I 07B3 81      PBC3:   RTS
1212
1213      000007B4  PBD:    EQU     *               ; IF PROGRAMMED ALTERNATE, THEN
1214 I 07B4 0D5110          BRCLR   OUTD,ALTEN,PBD2 ;     IF OUTPUTD=ON, THEN
1215 I 07B7 0C7509          BRSET   OUTD,RSTAT,PBD1 ;         TURN IT OFF
1216 I 07BA 1C75            BSET    OUTD,RSTAT      ;     IF OUTPUTD=OFF, THEN
1217 I 07BC 0D570A          BRCLR   OUTD,THRSEL,PBD3
1218 I 07BF 1C7F            BSET    OUTD,THREN
1219 I 07C1 2006            BRA     PBD3            ;         TURN IT ON
1220 I 07C3 1D75    PBD1:   BCLR    OUTD,RSTAT      ; IF PROGRAMMED MOMENTARY, THEN
1221 I 07C5 2002            BRA     PBD3            ;     TURN ON OUTPUTD
1222 I 07C7 1C75    PBD2:   BSET    OUTD,RSTAT
1223 I 07C9 81      PBD3:   RTS
1224
1225      000007CA  PBE:    EQU     *               ; ID PROGRAMMED ALTERNATE, THEN
```

```
1226 I 07CA 0F5110              BRCLR   OUTE,ALTEN,PBE2    ;   IF OUTPUTE =ON, THEN
1227 I 07CD 0E7509              BRSET   OUTE,RSTAT,PBE1    ;       TURN IT OFF
1228 I 07D0 1E75                BSET    OUTE,RSTAT         ;   IF OUTPUTE=OFF, THEN
1229 I 07D2 0F570A              BRCLR   OUTE,THRSEL,PBE3
1230 I 07D5 1E7F                BSET    OUTE,THREN
1231 I 07D7 2006                BRA     PBE3               ;       TURN IT ON
1232 I 07D9 1F75        PBE1:   BCLR    OUTE,RSTAT         ;   IF PROGRAMMED MOMENTARY, THEN
1233 I 07DB 2002                BRA     PBE3               ;       TURN ON OUTPUTE
1234 I 07DD 1E75        PBE2:   BSET    OUTE,RSTAT
1235 I 07DF 81          PBE3:   RTS
1236
1238                    ******************************************************
1239                    *   THE FOLLOWING COMMANDS ARE ONLY EXECUTED IN PRGRM MODE   *
1240                    ******************************************************
1241
1242 I 07E0 3F76        PSTBY:  CLR     PMODE
1243 I 07E2 1E76                BSET    7,PMODE            ;SET PMODE=PROGRAM MODE
1244 I 07E4 3F8B                CLR     DISPLA
1245 I 07E6 3F8C                CLR     DISPLB             ;SET DISPLAY=STBY
1246 I 07E8 108B                BSET    STB,DISPLA
1247 I 07EA CD04E7              JSR     CSUM               ;UPDATE CHECKSUM
1248 I 07ED 81                  RTS
1249
1250 I 07EE CD04E7      PRAD:   JSR     CSUM               ;UPDATE CHECKSUM
1251 I 07F1 1F72                BCLR    CKSFLG,FLAG        ;CLEAR CHECKSUM ERROR FLAG
1252 I 07F3 81                  RTS
1253
1254 I 07F4 CD04E7      PPA:    JSR     CSUM               ;UPDATE CHECKSUM
1255 I 07F7 1F72                BCLR    CKSFLG,FLAG        ;CLEAR CHECKSUM ERROR FLAG
1256 I 07F9 81                  RTS
1257
1258 I 07FA B676        PWAIL:  LDA     PMODE
1259 I 07FC A180                CMP     #$80
1260 I 07FE 2603                BNE     PWAIL1
1261 I 0800 CC0A78              JMP     PTONEX
1262 I 0803 A184        PWAIL1: CMP     #$84
1263 I 0805 2609                BNE     PWAIL2
1264 I 0807 B656                LDA     PWRUP
1265 I 0809 A408                AND     #$08
1266 I 080B A808                EOR     #$08
1267 I 080D CC0A8E              JMP     PWRX
1268 I 0810 A188        PWAIL2: CMP     #$88
1269 I 0812 2607                BNE     PWAIL3
1270 I 0814 B657                LDA     THRSEL
1271 I 0816 A808                EOR     #$08
1272 I 0818 CC0A82              JMP     PTHRX
1273 I 081B A190        PWAIL3: CMP     #$90
1274 I 081D 2607                BNE     PWAILX
1275 I 081F B658                LDA     SIRENS
1276 I 0821 A808                EOR     #$08
1277 I 0823 CC0A86              JMP     PSIRX
1278 I 0826 CD04E7      PWAILX: JSR     CSUM               ;UPDATE CHECKSUM
1279 I 0829 81                  RTS
1280
1281 I 082A B676        PYELP:  LDA     PMODE
1282 I 082C A180                CMP     #$80
1283 I 082E 2603                BNE     PYELP1
1284 I 0830 CC0A78              JMP     PTONEX
```

```
1285 I 0833 A184       PYELP1:  CMP     #$84
1286 I 0835 2609                BNE     PYELP2
1287 I 0837 B656                LDA     PWRUP
1288 I 0839 A410                AND     #$10
1289 I 083B A810                EOR     #$10
1290 I 083D CC0A8E              JMP     PWRX
1291 I 0840 A188       PYELP2:  CMP     #$88
1292 I 0842 2607                BNE     PYELP3
1293 I 0844 B657                LDA     THRSEL
1294 I 0846 A810                EOR     #$10
1295 I 0848 CC0A82              JMP     PTHRX
1296 I 084B A190       PYELP3:  CMP     #$90
1297 I 084D 2607                BNE     PYELPX
1298 I 084F B658                LDA     SIRENS
1299 I 0851 A810                EOR     #$10
1300 I 0853 CC0A86              JMP     PSIRX
1301 I 0856 CD04E7     PYELPX:  JSR     CSUM            ;UPDATE CHECKSUM
1302 I 0859 81                  RTS
1303
1304 I 085A B676       PHIL0:   LDA     PMODE
1305 I 085C A180                CMP     #$80
1306 I 085E 2603                BNE     PHIL01
1307 I 0860 CC0A78              JMP     PTONEX
1308 I 0863 A184       PHIL01:  CMP     #$84
1309 I 0865 2609                BNE     PHIL02
1310 I 0867 B656                LDA     PWRUP
1311 I 0869 A420                AND     #$20
1312 I 086B A820                EOR     #$20
1313 I 086D CC0A8E              JMP     PWRX
1314 I 0870 A188       PHIL02:  CMP     #$88
1315 I 0872 2607                BNE     PHIL03
1316 I 0874 B657                LDA     THRSEL
1317 I 0876 A820                EOR     #$20
1318 I 0878 CC0A82              JMP     PTHRX
1319 I 087B A190       PHIL03:  CMP     #$90
1320 I 087D 2607                BNE     PHILOX
1321 I 087F B658                LDA     SIRENS
1322 I 0881 A820                EOR     #$20
1323 I 0883 CC0A86              JMP     PSIRX
1324 I 0886 CD04E7     PHILOX:  JSR     CSUM            ;UPDATE CHECKSUM
1325 I 0889 81                  RTS
1326
1327 I 088A B676       PHAN:    LDA     PMODE
1328 I 088C A180                CMP     #$80
1329 I 088E 2603                BNE     PHAN1
1330 I 0890 CC0A78              JMP     PTONEX
1331 I 0893 A184       PHAN1:   CMP     #$84
1332 I 0895 2209                BHI     PHAN2
1333 I 0897 A47F                AND     #$7F
1334 I 0899 B855                EOR     TAPEN
1335 I 089B B755                STA     TAPEN
1336 I 089D CC0964              JMP     PMODX1
1337 I 08A0 A188       PHAN2:   CMP     #$88
1338 I 08A2 2607                BNE     PHAN3
1339 I 08A4 6657                LDA     THRSEL
1340 I 08A6 A840                EOR     #$40
1341 I 08A8 CC0A82              JMP     PTHRX
1342 I 08AB A190       PHAN3:   CMP     #$90
```

```
1343 I 08AD 2607              BNE    PMANX
1344 I 08AF B658              LDA    SIRENS
1345 I 08B1 A840              EOR    #$40
1346 I 08B3 CC0A86            JMP    PSIRX
1347 I 08B6 CD04E7    PMANX:  JSR    CSUM        ;UPDATE CHECKSUM
1348 I 08B9 81                RTS
1349
1350 I 08BA B676    PAH:      LDA    PMODE
1351 I 08BC A180              CMP    #$80
1352 I 08BE 2603              BNE    PAH1
1353 I 08C0 CC0A78            JMP    PTONEX
1354 I 08C3 A188    PAH1:     CMP    #$88
1355 I 08C5 2607              BNE    PAH2
1356 I 08C7 B657              LDA    THRSEL
1357 I 08C9 A880              EOR    #$80
1358 I 08CB CC0A82            JMP    PTHRX
1359 I 08CE A190    PAH2:     CMP    #$90
1360 I 08D0 2607              BNE    PAHX
1361 I 08D2 B658              LDA    SIRENS
1362 I 08D4 A880              EOR    #$80
1363 I 08D6 CC0A86            JMP    PSIRX
1364 I 08D9 CD04E7   PAHX:    JSR    CSUM        ;UPDATE CHECKSUM
1365 I 08DC 81                RTS
1366
1367 I 08DD B676    PMOD1:    LDA    PMODE       ;IF PMODE=80, THEN
1368 I 08DF A180              CMP    #$80        ;   SET PMODE=OUTEN1
1369 I 08E1 2607              BNE    PMOD11      ;   SET DISPLB=OUTEN1
1370 I 08E3 1076              BSET   OUT1,PMODE  ;   BRANCH TO PMODX
1371 I 08E5 B652              LDA    OUTEN1      ;ELSE,BRANCH TO PMOD11
1372 I 08E7 CC0980            JMP    PMODX
1373 I 08EA A181    PMOD11:   CMP    #$81        ;IF PMODE=OUTEN1, THEN
1374 I 08EC 2609              BNE    PMOD12      ;   TOGGLE OUT1
1375 I 08EE B652              LDA    OUTEN1
1376 I 08F0 A801              EOR    #$01
1377 I 08F2 B752              STA    OUTEN1      ;   BRANCH TO PMODX
1378 I 08F4 CC0980            JMP    PMODX       ;ELSE, BRANCH TO PMOD12
1379 I 08F7 A182    PMOD12:   CMP    #$82        ;IF PMODE=OUTEN2, THEN
1380 I 08F9 2609              BNE    PMOD13      ;   TOGGLE OUT1
1381 I 08FB B653              LDA    OUTEN2
1382 I 08FD A801              EOR    #$01
1383 I 08FF B753              STA    OUTEN2      ;   BRANCH TO PMODX
1384 I 0901 CC0980            JMP    PMODX       ;ELSE, BRANCH TO PMOD13
1385 I 0904 A184    PMOD13:   CMP    #$84        ;IF PMODE=OUTEN3, THEN
1386 I 0906 2609              BNE    ENDPMOD1    ;   TOGGLE OUT1
1387 I 0908 B654              LDA    OUTEN3
1388 I 090A A801              EOR    #$01
1389 I 090C B754              STA    OUTEN3      ;   BRANCH TO PMODX
1390 I 090E CC0980            JMP    PMODX       ;ELSE, BRANCH TO PSTBY
1391 I 0911 CC0990  ENDPMOD1: JMP    PMODEND
1392
1393 I 0914 B676    PMOD2:    LDA    PMODE       ;IF PMODE=0, THEN
1394 I 0916 A180              CMP    #$80        ;   SET PMODE=OUTEN2
1395 I 0918 2607              BNE    PMOD21      ;   SET DISPLB=OUTEN2
1396 I 091A 1276              BSET   OUT2,PMODE  ;   BRANCH TO PMODX
1397 I 091C B653              LDA    OUTEN2      ;ELSE,BRANCH TO PMOD21
1398 I 091E CC0980            JMP    PMODX
1399 I 0921 A181    PMOD21:   CMP    #$81        ;IF PMODE=OUTEN1, THEN
1400 I 0923 2609              BNE    PMOD22      ;   TOGGLE OUT2
```

```
1401 I 0925 8652                    LDA     OUTEN1
1402 I 0927 A802                    EOR     #$02
1403 I 0929 B752                    STA     OUTEN1           ;   BRANCH TO PMODX
1404 I 092B CC0980                  JMP     PMODX            ;ELSE, BRANCH TO PMOD22
1405 I 092E A182     PMOD22:        CMP     #$82             ;IF PMODE=OUTEN2, THEN
1406 I 0930 2609                    BNE     PMOD23           ;   TOGGLE OUT2
1407 I 0932 B653                    LDA     OUTEN2
1408 I 0934 A802                    EOR     #$02
1409 I 0936 B753                    STA     OUTEN2           ;   BRANCH TO PMODX
1410 I 0938 CC0980                  JMP     PMODX            ;ELSE, BRANCH TO PMOD23
1411 I 093B A184     PMOD23:        CMP     #$84             ;IF PMODE=OUTEN3, THEN
1412 I 093D 2651                    BNE     PMODEND          ;   TOGGLE OUT3
1413 I 093F B654                    LDA     OUTEN3
1414 I 0941 A802                    EOR     #$02
1415 I 0943 B754                    STA     OUTEN3           ;   BRANCH TO PMODX
1416 I 0945 CC0980                  JMP     PMODX            ;ELSE, BRANCH TO PSTBY
1417
1418 I 0948 B676     PMOD3:         LDA     PMODE            ;IF PMODE=0, THEN
1419 I 094A A180                    CMP     #$80             ;   SET PMODE=OUTEN3
1420 I 094C 2608                    BNE     PMOD31           ;   SET DISPLB=OUTEN3
1421 I 094E 1476                    BSET    OUT3,PMODE       ;   BRANCH TO PMODX
1422 I 0950 B656                    LDA     PWRUP            ;   SET DISPLA=PWRUP
1423 I 0952 B78B                    STA     DISPLA
1424 I 0954 B654                    LDA     OUTEN3
1425 I 0956 CC0980                  JMP     PMODX            ;ELSE,BRANCH TO PMOD31
1426 I 0959 A181     PMOD31:        CMP     #$81             ;IF PMODE=OUTEN1, THEN
1427 I 095B 2609                    BNE     PMOD32           ;   TOGGLE OUT3
1428 I 095D B652                    LDA     OUTEN1           ;   SAVE @OUTEN1
1429 I 095F A804                    EOR     #$04
1430 I 0961 B752                    STA     OUTEN1           ;   BRANCH TO PMODX
1431 I 0963 CC0980                  JMP     PMODX            ;ELSE, BRANCH TO PMOD32
1432 I 0966 A182     PMOD32:        CMP     #$82             ;IF PMODE=OUTEN2, THEN
1433 I 0968 2609                    BNE     PMOD33           ;   TOGGLE OUT2
1434 I 096A B653                    LDA     OUTEN2           ;   SAVE @OUTEN2
1435 I 096C A804                    EOR     #$04
1436 I 096E B753                    STA     OUTEN2           ;   BRANCH TO PMODX
1437 I 0970 CC0980                  JMP     PMODX            ;ELSE, BRANCH TO PMOD33
1438 I 0973 A184     PMOD33:        CMP     #$84             ;IF PMODE=OUTEN3, THEN
1439 I 0975 2619                    BNE     PMODEND          ;   TOGGLE OUT3
1440 I 0977 B654                    LDA     OUTEN3           ;   SAVE @OUTEN3
1441 I 0979 A804                    EOR     #$04
1442 I 097B B754                    STA     OUTEN3
1443 I 097D 2001                    BRA     PMODX
1444 I 097F 4F       PMODCLR:       CLRA
1445 I 0980 3F8C     PMODX:         CLR     DISPLB
1446 I 0982 B78C                    STA     DISPLB           ;SET DISPLB=OUTEN?
1447 I 0984 B676     PMODX1:        LDA     PMODE
1448 I 0986 B455                    AND     TAPEN
1449 I 0988 2704                    BEQ     PMODX2
1450 I 098A 1C8B                    BSET    6,DISPLA
1451 I 098C 2002                    BRA     PMODEND
1452 I 098E 1D8B     PMODX2:        BCLR    6,DISPLA
1453 I 0990 CD04E7   PMODEND:       JSR     CSUM             ;UPDATE CHECKSUM
1454 I 0993 81                      RTS                      ;RETURN
1455
1456 I 0994 B676     PPBA:          LDA     PMODE
1457 I 0996 A180                    CMP     #$80
1458 I 0998 2610                    BNE     PPBA1
```

```
1459 I 099A B651              LDA    ALTEN
1460 I 099C A4F8              AND    #$F8
1461 I 099E B78C              STA    DISPLB
1462 I 09A0 B657              LDA    THRSEL
1463 I 09A2 B78B              STA    DISPLA
1464 I 09A4 1676              BSET   3,PMODE
1465 I 09A6 CD04E7             JSR    CSUM         ;UPDATE CHECKSUM
1466 I 09A9 81                RTS
1467 I 09AA B676      PP8A1:  LDA    PMODE
1468 I 09AC A188              CMP    #$88
1469 I 09AE 260A              BNE    PP8A2
1470 I 09B0 B651              LDA    ALTEN
1471 I 09B2 A808              EOR    #$08
1472 I 09B4 B751              STA    ALTEN
1473 I 09B6 A4F8              AND    #$F8
1474 I 09B8 B78C              STA    DISPLB
1475 I 09BA CD04E7    PP8A2:  JSR    CSUM         ;UPDATE CHECKSUM
1476 I 09BD 81                RTS
1477
1478 I 09BE B676      PP8B:   LDA    PMODE
1479 I 09C0 A180              CMP    #$80
1480 I 09C2 2610              BNE    PP8B1
1481 I 09C4 B651              LDA    ALTEN
1482 I 09C6 A4F8              AND    #$F8
1483 I 09C8 B78C              STA    DISPLB
1484 I 09CA B657              LDA    THRSEL
1485 I 09CC B78B              STA    DISPLA
1486 I 09CE 1676              BSET   3,PMODE
1487 I 09D0 CD04E7             JSR    CSUM         ;UPDATE CHECKSUM
1488 I 09D3 81                RTS
1489 I 09D4 B676      PP8B1:  LDA    PMODE
1490 I 09D6 A188              CMP    #$88
1491 I 09D8 260E              BNE    PP8B2
1492 I 09DA B651              LDA    ALTEN
1493 I 09DC A810              EOR    #$10
1494 I 09DE B751              STA    ALTEN
1495 I 09E0 A4F8              AND    #$F8
1496 I 09E2 B78C              STA    DISPLB
1497 I 09E4 CD04E7             JSR    CSUM         ;UPDATE CHECKSUM
1498 I 09E7 81                RTS
1499 I 09E8 B676      PP8B2:  LDA    PMODE
1500 I 09EA A190              CMP    #$90
1501 I 09EC 2608              BNE    PP8B3
1502 I 09EE B659              LDA    YELTMOUT
1503 I 09F0 A810              EOR    #$10
1504 I 09F2 B759              STA    YELTMOUT
1505 I 09F4 B78C              STA    DISPLB
1506 I 09F6 CD04E7    PP8B3:  JSR    CSUM         ;UPDATE CHECKSUM
1507 I 09F9 81                RTS
1508
1509 I 09FA B676      PP8C:   LDA    PMODE
1510 I 09FC A180              CMP    #$80
1511 I 09FE 2610              BNE    PP8C1
1512 I 0A00 B651              LDA    ALTEN
1513 I 0A02 A4F8              AND    #$F8
1514 I 0A04 B78C              STA    DISPLB
1515 I 0A06 B657              LDA    THRSEL
1516 I 0A08 B78B              STA    DISPLA
```

```
1517 I 0A0A 1676              BSET   3,PMODE
1518 I 0A0C CD04E7             JSR    CSUM        ;UPDATE CHECKSUM
1519 I 0A0F 81                 RTS
1520 I 0A10 8676       PPBC1:  LDA    PMODE
1521 I 0A12 A188               CMP    #$88
1522 I 0A14 260A               BNE    PPBC2
1523 I 0A16 B651               LDA    ALTEN
1524 I 0A18 A820               EOR    #$20
1525 I 0A1A B751               STA    ALTEN
1526 I 0A1C A4F8               AND    #$F8
1527 I 0A1E B78C               STA    DISPLB
1528 I 0A20 CD04E7     PPBC2:  JSR    CSUM        ;UPDATE CHECKSUM
1529 I 0A23 81                 RTS
1530
1531 I 0A24 B676       PPBD:   LDA    PMODE
1532 I 0A26 A180               CMP    #$80
1533 I 0A28 2610               BNE    PPBD1
1534 I 0A2A B651               LDA    ALTEN
1535 I 0A2C A4F8               AND    #$F8
1536 I 0A2E B78C               STA    DISPLB
1537 I 0A30 B657               LDA    THRSEL
1538 I 0A32 B78B               STA    DISPLA
1539 I 0A34 1676               BSET   3,PMODE
1540 I 0A36 CD04E7             JSR    CSUM        ;UPDATE CHECKSUM
1541 I 0A39 81                 RTS
1542 I 0A3A B676       PPBD1:  LDA    PMODE
1543 I 0A3C A188               CMP    #$88
1544 I 0A3E 260A               BNE    PPBD2
1545 I 0A40 B651               LDA    ALTEN
1546 I 0A42 A840               EOR    #$40
1547 I 0A44 B751               STA    ALTEN
1548 I 0A46 A4F8               AND    #$F8
1549 I 0A48 B78C               STA    DISPLB
1550 I 0A4A CD04E7     PPBD2:  JSR    CSUM        ;UPDATE CHECKSUM
1551 I 0A4D 81                 RTS
1552
1553 I 0A4E B676       PPBE:   LDA    PMODE
1554 I 0A50 A180               CMP    #$80
1555 I 0A52 2610               BNE    PPBE1
1556 I 0A54 B651               LDA    ALTEN
1557 I 0A56 A4F8               AND    #$F8
1558 I 0A58 B78C               STA    DISPLB
1559 I 0A5A B657               LDA    THRSEL
1560 I 0A5C B78B               STA    DISPLA
1561 I 0A5E 1676               BSET   3,PMODE
1562 I 0A60 CD04E7             JSR    CSUM        ;UPDATE CHECKSUM
1563 I 0A63 81                 RTS
1564 I 0A64 B676       PPBE1:  LDA    PMODE
1565 I 0A66 A188               CMP    #$88
1566 I 0A68 260A               BNE    PPBE2
1567 I 0A6A B651               LDA    ALTEN
1568 I 0A6C A880               EOR    #$80
1569 I 0A6E B751               STA    ALTEN
1570 I 0A70 A4F8               AND    #$F8
1571 I 0A72 B78C               STA    DISPLB
1572 I 0A74 CD04E7     PPBE2:  JSR    CSUM        ;UPDATE CHECKSUM
1573 I 0A77 81                 RTS
1574
```

```
1575 I 0A78 1876      PTONEX:  BSET    4,PMODE
1576 I 0A7A 8659               LDA     YELTMOUT
1577 I 0A7C 878C               STA     DISPLB
1578 I 0A7E B658               LDA     SIRENS
1579 I 0A80 201A               BRA     PRGRMX
1580
1581 I 0A82 B757      PTHRX:   STA     THRSEL
1582 I 0A84 2016               BRA     PRGRMX
1583
1584 I 0A86 B758      PSIRX:   STA     SIRENS
1585 I 0A88 B788               STA     DISPLA
1586 I 0A8A CD04E7             JSR     CSUM             ;UPDATE CHECKSUM
1587 I 0A8D 81                 RTS
1588
1589 I 0A8E B756      PWRX:    STA     PWRUP            ;IF PWRUP=0,THEN
1590 I 0A90 2602               BNE     PWRX1            ;  SET PWRUP=STBY
1591 I 0A92 AA01               ORA     #$01             ;SET DISPLA=PWRUP
1592 I 0A94 B756      PWRX1:   STA     PWRUP
1593 I 0A96 B688               LDA     DISPLA
1594 I 0A98 A440               AND     #$40
1595 I 0A9A BA56               ORA     PWRUP
1596
1597 I 0A9C B788      PRGRMX:  STA     DISPLA
1598 I 0A9E CD04E7             JSR     CSUM             ;UPDATE CHECKSUM
1599 I 0AA1 81                 RTS
1600
1602                  ***********************************************************
1603                  *     THIS AREA FOR INTERRUPT SERVICE ROUTINES             *
1604                  ***********************************************************
1605                  *****************  SERIAL PORT I.S.R.  ********************
1606       000000AA2  SCINT:   EQU     *
1607 I 0AA2 B610               LDA     SCSR             ;IF ERROR FLAGS SET, THEN
1608 I 0AA4 A40E               AND     #$0E             ;  BRANCH TO SCINTE
1609 I 0AA6 2634               BNE     SCINTE           ;IF RDRF FLAG SET, THEN
1610 I 0AA8 0B1033             BRCLR   RDRF,SCSR,SCINTX ;  PUT SCI TO SLEEP
1611 I 0AAB 120F               BSET    RWU,SCCR2
1612 I 0AAD B611               LDA     SCDAT            ;{IN/OUT WORD}
1613 I 0AAF A180               CMP     #$80             ;IF INPUT KEY=NUL, THEN
1614 I 0AB1 2618               BNE     SCINT1
1615 I 0AB3 0E7628    NUL:     BRSET   7,PMODE,SCINTX   ;  IF NOT PRGRM MODE, THEN
1616 I 0AB6 B651               LDA     ALTEN            ;    TURN OFF MOM OUTPUTS
1617 I 0AB8 B475               AND     RSTAT            ;    TURN MOM DISPLAYS
1618 I 0ABA B775               STA     RSTAT            ;    BRANCH TO 3DISPLY
1619 I 0ABC 1F88               BCLR    7,DISPLA         ;    BRANCH TO SCINT1
1620 I 0ABE 1573               BCLR    PEAK,SIREN
1621 I 0AC0 1D88               BCLR    6,DISPLA
1622 I 0AC2 087302             BRCLR   AHORN,SIREN,NUL1
1623 I 0AC5 1572               BCLR    TONEFLG,FLAG
1624 I 0AC7 1873     NUL1:     BCLR    AHORN,SIREN
1625 I 0AC9 2013               BRA     SCINTX           ;ELSE, BRANCH TO SCINTX
1626 I 0ACB A1C0     SCINT1:   CMP     #$C0
1627 I 0ACD 250D               BLO     SCINTE
1628 I 0ACF A1EF               CMP     #$EF
1629 I 0AD1 2209               BHI     SCINTE
1630 I 0AD3 A42F               AND     #$2F             ;COMPUTE ADDR FOR BUTTON PUSHED
1631 I 0AD5 AE03               LDX     #$03             ;BRANCH TO SUBROUTINE
1632 I 0AD7 42                 MUL
1633 I 0AD8 97                 TAX
```

```
1634 I 0AD9 DD0457                    JSR     JMPTAB,X        ;(USING THE JUMP TABLE)
1635 I 0ADC B611          SCINTE: LDA     SCDAT           ;CLEAR ERROR FLAGS
1636 I 0ADE 80            SCINTX: RTI                     ;ELSE, RETURN FROM INTERRUPT
1637                      ******************** TIMER I.S.R. ************************
1638         00000ADF     THRINT: EQU     *
1639 I 0ADF 0D1221                BRCLR   OCIE,TCR,TIMER  ;IF COMPARE ENABLED,THEN
1640 I 0AE2 0D131E                BRCLR   OCF,TSR,TIMER   ;  IF OCF SET, THEN
1641 I 0AE5 98                    CLC
1642 I 0AE6 B691                  LDA     OFFSETL         ;    ADD OFDSETL TO COUNTER
1643 I 0AE8 BB17                  ADD     OCL
1644 I 0AEA B792                  STA     OCLTEMP
1645 I 0AEC B690                  LDA     OFFSETH
1646 I 0AEE B916                  ADC     OCH             ;    ADD OFFSETH TO COUNTER
1647 I 0AF0 B716                  STA     OCH             ;    SAVE IN HI COMPARE REG
1648 I 0AF2 B60C                  LDA     AMP
1649 I 0AF4 A801                  EOR     #$01            ;    TOGGLE TONE BIT
1650 I 0AF6 B70C                  STA     AMP
1651 I 0AF8 B692                  LDA     OCLTEMP
1652 I 0AFA B717                  STA     OCL
1653 I 0AFC 3A95                  DEC     CYCLCNT         ;DECREMENT CYCLE CNT
1654 I 0AFE 2602                  BNE     RTN             ;IF COUNT=0, THEN
1655 I 0B00 1072                  BSET    SEGEND,FLAG     ;  SET SEGEND FLAG
1656 I 0B02 80            RTN:    RTI                     ;RETURN FROM INTERRUPT
1657 I 0B03 0B1328        TIMER:  BRCLR   TOF,TSR,THRINTX ;IF TOF SET, THEN
1658 I 0B06 017F02        STBTIMER:BRCLR  STBTM,THREN,TIMER1
1659 I 0B09 3C80                  INC     STBTHR          ;  INCREMENT STBTHR
1660 I 0B0B 037F02        TIMER1: BRCLR   HLTM,THREN,TIMERA
1661 I 0B0E 3C87                  INC     HLTMR           ;       "    HLTMR
1662 I 0B10 077F02        TIMERA: BRCLR   OUTATM,THREN,TIMERB
1663 I 0B13 3C81                  INC     THRA            ;       "    THRA
1664 I 0B15 097F02        TIMERB: BRCLR   OUTBTM,THREN,TIMERC
1665 I 0B18 3C82                  INC     THRB            ;       "    THRB
1666 I 0B1A 0B7F02        TIMERC: BRCLR   OUTCTM,THREN,TIMERD
1667 I 0B1D 3C83                  INC     THRC            ;       "    THRC
1668 I 0B1F 0D7F02        TIMERD: BRCLR   OUTDTM,THREN,TIMERE
1669 I 0B22 3C84                  INC     THRD            ;       "    THRD
1670 I 0B24 0F7F02        TIMERE: BRCLR   OUTETM,THREN,YELTIMER
1671 I 0B27 3C85                  INC     THRE            ;       "    THRE
1672 I 0B29 057F02        YELTIMER:BRCLR  YELTM,THREN,THRINTX
1673 I 0B2C 3C86                  INC     YELTHR          ;       "    YELTHR
1674 I 0B2E B619          THRINTX: LDA    THRL            ;  CLEAR INTERRUPT
1675 I 0B30 80                    RTI                     ;ELSE, RETURN FROM INTERRUPT
1676 I 0B31 80            SPI:    RTI
1677 I 0B32 80            IRQ:    RTI
1678 I 0B33 80            SWI:    RTI
1679
1680 A 0B34           A           SECTION AMLOST0,$0B34
1681 A 0B34                       ORG     $0B34
1683 A 0B34 9D9D9D9D9D9D9D9D  AMLOST0: DB  8 DUP ($9D)     ; 354 ($0162) Bytes Filled Here
1687                             ORG     $0BFD           ; must start at $0BFD and end at $0BFF
1688 A 0BFD CC0100              JMP     INITM
1690
1691 W 0C00           W           SECTION WAIL_TABLE,$0C00
1692 W 0C00                       ORG     $0C00
1695                      *********LOOKUP TABLE FOR SIRENTONES*********************
1696                      *
1697                      *                                         GB 12-Jun-1989   *
1697                      *                                                          *
1698                      *  WAIL TABLE   XREG SET AT 0(WAIL), INCREMENT XREG TO INDEX *
```

```
1699
1700         ************************************************
1701
1702 W 0C00 02      TABLE:   DB   $02       ;COUNTS/SEGMENT(XCEL RATE)=CYCLCNT
1703 W 0C01 30               DB   $30       ;# SEGMENTS@ABOVE XCEL RATE=SEGCNT
1704 W 0C02 04               DB   $04       ;XCEL RATE>$7F=DECEL
1705 W 0C03 20               DB   $20
1706 W 0C04 08               DB   $08       ; This half of the table increases the frequency
1707 W 0C05 10               DB   $10
1708 W 0C06 10               DB   $10
1709 W 0C07 10               DB   $10
1710 W 0C08 20               DB   $20
1711 W 0C09 05               DB   $05       ;    The data in this table is in pairs
1712 W 0C0A 30               DB   $30       ; <-- This is the duration of the tone before freq. inc.
1713 W 0C0B 05               DB   $05       ; <-- This is the number of similar duration / inc. pairs
1714 W 0C0C 40               DB   $40
1715 W 0C0D 05               DB   $05
1716 W 0C0E 57               DB   $57       ; <-- midpoint  was $60
1717 W 0C0F 1D               DB   $1D       ; This value changed from $10 to get offset as high as A1
1718 W 0C10 7F               DB   $7f       ; $10 got only as high as A9, then was $18
1719 W 0C11 20               DB   $20       ; Then changed form 22 to 1D
1720 W 0C12 A0               DB   $a0       ; This half of the table decreases frequency
1721 W 0C13 20               DB   $20       ;    The data in this table is in pairs
1722 W 0C14 A0               DB   $a0       ; <-- This is the duration of the tone before freq. dec.
1723 W 0C15 20               DB   $20       ; <-- This is the number of similar duration / dec. pairs
1724 W 0C16 A0               DB   $a0
1725 W 0C17 20               DB   $20
1726 W 0C18 A0               DB   $a0
1727 W 0C19 20               DB   $20
1728 W 0C1A A0               DB   $a0
1729 W 0C1B 20               DB   $20
1730 W 0C1C 97               DB   $97       ; was A0
1731 W 0C1D 32               DB   $32       ; was 20
1732 W 0C1E 00               DB   $00       ; <-- End of Table (YTONE2)
1733 W 0C1F 00               DB   $00
1734 W 0C20 00               DB   $00
1735 W 0C21 00               DB   $00
1736
1737         ************************************************************
1738         *                                                          *
1739         *    YELP TABLE   XREG SET @TABLE+34 (YELP) GB 12-Jun-89   *
1740         *                                                          *
1741         ************************************************************
1742
1743 Y 0C22        Y       SECTION YELP_TABLE,TABLE+34
1744 Y 0C22                ORG     TABLE+34
1745
1746      00000C22  YTABLE: EQU   *
1747
1748 Y 0C22 01             DB   $01         ; <-- CYCLCNT Duration
1749 Y 0C23 0140           DW   $0140       ; <-- OFFSET  Period
1750 Y 0C25 02             DB   $02
1751 Y 0C26 0130           DW   $0130
1752 Y 0C28 02             DB   $02
1753 Y 0C29 0121           DW   $0121
1754 Y 0C2B 02             DB   $02
1755 Y 0C2C 0114           DW   $0114
1756 Y 0C2E 02             DB   $02
```

```
1757 Y 0C2F 0108           DW      $0108
1758 Y 0C31 02             DB      $02
1759 Y 0C32 00FD           DW      $00FD
1760 Y 0C34 03             DB      $03
1761 Y 0C35 00F3           DW      $00F3
1762 Y 0C37 03             DB      $03
1763 Y 0C38 00E9           DW      $00E9
1764 Y 0C3A 04             DB      $04
1765 Y 0C3B 00E0           DW      $00E0
1766 Y 0C3D 04             DB      $04
1767 Y 0C3E 00D8           DW      $00D8
1768 Y 0C40 05             DB      $05
1769 Y 0C41 00D1           DW      $00D1
1770 Y 0C43 05             DB      $05
1771 Y 0C44 00CA           DW      $00CA
1772 Y 0C46 06             DB      $06
1773 Y 0C47 00C3           DW      $00C3
1774 Y 0C49 07             DB      $07
1775 Y 0C4A 00BD           DW      $00BD
1776 Y 0C4C 09             DB      $09
1777 Y 0C4D 00B7           DW      $00B7
1778 Y 0C4F 0A             DB      $0A
1779 Y 0C50 00B2           DW      $00B2
1780 Y 0C52 0D             DB      $0D
1781 Y 0C53 00AD           DW      $00AD
1782 Y 0C55 10             DB      $10
1783 Y 0C56 00A8           DW      $00A8
1784 Y 0C58 15             DB      $15
1785 Y 0C59 00A3           DW      $00A3
1786 Y 0C5B 1F             DB      $1F
1787 Y 0C5C 009F           DW      $009F
1788 Y 0C5E 37             DB      $37
1789 Y 0C5F 009B           DW      $009B
1790 Y 0C61 4A             DB      $4A
1791 Y 0C62 0097           DW      $0097        ; <-- MIDPOINT (Highest Frequency, Shortest Period)
                                                ; was $00A1
1792 Y 0C64 08             DB      $08
1793 Y 0C65 009B           DW      $009B
1794 Y 0C67 08             DB      $08
1795 Y 0C68 009F           DW      $009F
1796 Y 0C6A 09             DB      $09
1797 Y 0C6B 00A3           DW      $00A3
1798 Y 0C6D 09             DB      $09
1799 Y 0C6E 00A8           DW      $00A8
1800 Y 0C70 09             DB      $09
1801 Y 0C71 00AD           DW      $00AD
1802 Y 0C73 09             DB      $09
1803 Y 0C74 00B2           DW      $00B2
1804 Y 0C76 0A             DB      $0A
1805 Y 0C77 00B7           DW      $00B7
1806 Y 0C79 0A             DB      $0A
1807 Y 0C7A 00BD           DW      $00BD
1808 Y 0C7C 0B             DB      $0B
1809 Y 0C7D 00C3           DW      $00C3
1810 Y 0C7F 0B             DB      $0B
1811 Y 0C80 00CA           DW      $00CA
1812 Y 0C82 0C             DB      $0C
1813 Y 0C83 00D1           DW      $00D1
1814 Y 0C85 0D             DB      $0D
```

```
1815 Y 0C86 00D8              DW      $00D8
1816 Y 0C88 0E                DB      $0E
1817 Y 0C89 00E0              DW      $00E0
1818 Y 0C8B 0F                DB      $0F
1819 Y 0C8C 00E9              DW      $00E9
1820 Y 0C8E 11                DB      $11
1821 Y 0C8F 00F3              DW      $00F3
1822 Y 0C91 13                DB      $13
1823 Y 0C92 00FD              DW      $00FD
1824 Y 0C94 17                DB      $17
1825 Y 0C95 0108              DW      $0108
1826 Y 0C97 1C                DB      $1C
1827 Y 0C98 0114              DW      $0114
1828 Y 0C9A 36                DB      $36
1829 Y 0C9B 0121              DW      $0121
1830 Y 0C9D 3E                DB      $3E
1831 Y 0C9E 0130              DW      $0130
1832 Y 0CA0 35                DB      $35
1833 Y 0CA1 0140              DW      $0140
1834
1835 Y 0CA3 00                DB      $00
1836
1837              *******************************************************
1838              *    PKTONE    TABLE    XREG SET @ YTABLE+160   1-16-89    *
1839              *******************************************************
1840
1841 P 0CA4           P       SECTION PK_TABLE,YTABLE+130
1842 P 0CA4                   ORG     YTABLE+130
1843 P 0CA4 02       PKTABLE: DB     $02           ;COUNTS/SEGMENT(XCEL RATE)=CYCLCNT
1844 P 0CA5 30                DB      $30          ;# SEGMENTS@ABOVE XCEL RATE=SEGCNT
1845 P 0CA6 04                DB      $04          ;XCEL RATE>$7F=DECEL
1846 P 0CA7 10                DB      $10          ; was $20
1847 P 0CA8 08                DB      $08
1848 P 0CA9 10                DB      $10
1849 P 0CAA 10                DB      $10
1850 P 0CAB 10                DB      $10
1851 P 0CAC 20                DB      $20
1852 P 0CAD 05                DB      $05
1853 P 0CAE 30                DB      $30
1854 P 0CAF 05                DB      $05
1855 P 0CB0 40                DB      $40
1856 P 0CB1 05                DB      $05
1857 P 0CB2 50                DB      $50
1858 P 0CB3 09                DB      $09
1859 P 0CB4 70                DB      $70
1860 P 0CB5 10                DB      $10
1861 P 0CB6 FF                DB      $ff
1862 P 0CB7 FF                DB      $ff
1863 P 0CB8 FF                DB      $ff
1864 P 0CB9 FF                DB      $ff
1865 P 0CBA FF                DB      $ff
1866 P 0CBB FF                DB      $ff
1867 P 0CBC FF                DB      $ff
1868 P 0CBD FF                DB      $ff
1869 P 0CBE FF                DB      $ff
1870 P 0CBF FF                DB      $ff
1871 P 0CC0 FF                DB      $ff
1872 P 0CC1 FF                DB      $ff
```

```
1873 P 0CC2 FF                          DB      $ff
1874 P 0CC3 FF                          DB      $ff
1875
1876                      *************************************************
1877                      *   SP1TONE   TABLE     XREG SET @ PKTABLE +32   1-7-89   *
1878                      *************************************************
1879
1880 S 0CC4              S       SECTION SP1_TABLE,PKTABLE+32
1881 S 0CC4                      ORG     PKTABLE+32
1882 S 0CC4 0000000000000000  SP1TABLE:DB   32 DUP (0)
         0000000000000000
         0000000000000000
         0000000000000000
1883
1885 S 0CE4 9090909090909090  LOSTABLE:DB   8 DUP ($90)      ; 796 ($031C) Bytes Filled Here
1890                      *       ORG     $0FFD            ; must start at $0FFD and end at $0FFF
1891 S 0FFD CC0100                JMP     INITM
1893
1894 A 1000              A       SECTION AMLOST1,$1000
1895 A 1000                      ORG     $1000
1897 A 1000 9090909090909090   AMLOST1: DB   8 DUP ($90)     ; 256 ($0100) Bytes Filled Here
1901                      *       ORG     $10FD            ; must start at $10FD and end at $10FF
1902 A 10FD CC0100                JMP     INITM
1904
1906 A 1100              A       SECTION AMLOST2,$1100
1907 A 1100                      ORG     $1100            ; comment out this section when using MC68HC05C4
1909 A 1100 9090909090909090   AMLOST2: DB   8 DUP ($90)     ; 3584 ($0E00) Bytes Filled Here
1919                      *       ORG     $1EFD            ; must start at $1EFD and end at $1EFF
1920 A 1EFD CC0100                JMP     INITM
1922
1924                      *************************************************
1925                      *  INTERRUPT VECTOR TABLE-POINTERS TO INT SERVICE ROUTINES   *
1926                      *************************************************
1927
1928 I 1FF4              I       SECTION ISR_VECTORS,USRVEC
1929 I 1FF4                      ORG     USRVEC
1930 I 1FF4 0B31                 DW      SPI
1931 I 1FF6 0AA2                 DW      SCINT            ; (SERIAL PORT I.S.R.)
1932 I 1FF8 0A0F                 DW      TMRINT           ; (TIMER I.S.R)
1933 I 1FFA 0B32                 DW      IRQ
1934 I 1FFC 0B33                 DW      SWI
1935 I 1FFE 0100                 DW      INITM
1936
1937                      *       SECTION SET_PROTECTION,OPTION
1938                      *       ORG     OPTION           ; SET PROM $0020-$004F, SET PROM $0100-$015F
1939                      *       DB      $08              ; SET SECURITY, SET IRQ on EDGE & LEVEL
1940                      *       MSG     'SETTING SECURITY BIT'
1941    2000                     END
There were: 0000 Errors
```

SECTIONS USED:

| Section | Relocation | Alignment | Type | Begins | Ends |
|---|---|---|---|---|---|
| ROM_CONSTANTS | absolute | | | 0020 | 0020 |
| RAM_VARIABLES | absolute | | | 0050 | 0067 |
| INITH | absolute | | | 0100 | 0833 |
| AMLOST0 | absolute | | | 0834 | 0BFF |
| WAIL_TABLE | absolute | | | 0C00 | 0C21 |
| YELP_TABLE | absolute | | | 0C22 | 0CA3 |
| PK_TABLE | absolute | | | 0CA4 | 0CC3 |
| SP1_TABLE | absolute | | | 0CC4 | 0FFF |
| AMLOST1 | absolute | | | 1000 | 10FF |
| AMLOST2 | absolute | | | 1100 | 15FF |
| ISR_VECTORS | absolute | | | 1FF4 | 1FFF |

Assembly time: 0 min, 19 sec

```
1   ************************************************************
2   *   Program Name:     REM00100                              *
3   *   Programmer:       WARD GIEFFERS / GEORGE BERANEK / KENT KEKEIS *
4   *   Initial Start Date: 3/30/89                             *
5   *   Most Recent Date:   3/29/90                             *
6   *                                                           *
7   *   System:           6805-C8                               *
8   *   Assembler:        EZASM                                 *
9   *                                                           *
10  *   PGM Description:  REMOTE.SRC This program controls the operation *
11  *                     of a remote control head for a Computerized    *
12  *                     Light And Siren System.  It communicates with a *
13  *                     main unit via 4 wires and an RS-232 interface.  *
14  *                     See REMOTE.PSU for psuedo code of this program. *
15  *                                                           *
16  *   Version Information:                                    *
17  *                                                           *
18  *   Version   What Changed from Previous      Who Changed   Date *
19  *   _____    _____       _____   ____ *
20  *   N/A       Initial Version                 WJG           3/30/89 *
21  *   12        Shotgun Lock and Prog. Mod.     GB            6/1/89  *
22  *             Return LED dimming eliminated.                *
23  *             Watchdog Enhanced.                            *
24  *   13        Shotgun and Exit Prog. Mode LED GB            6/26/89 *
25  *             intensity change corrected.                   *
26  *   14        Watchdog additions              GB            7/12/89 *
27  *   0100      Changed Name from REM014 to REM00100 KENT     3/29/90 *
28  *             to comply with new naming convention.         *
29  ************************************************************
30
31      SUBTTL 'EQUATES'
32      TITLE  'REM014.SRC WJG GB 12-Jul-1989'
33      RADIX 10
34      LIST
35
36  ************************************************************
37  *         EQUATES                                           *
38  ************************************************************
39
40  KEYPAD   EQU   $00      ;PORTA=KEYPAD
41  DSPLAY   EQU   $01      ;PORTB=MULTIPLEXED DISPLAY
42  PORTC    EQU   $02      ;PORTC=MISC I/O BITS
43
44  DDRA     EQU   $04      ;DATA DIRECTION REGISTERS
45  DDRB     EQU   $05      ;    "       "       "
46  DDRC     EQU   $06      ;    "       "       "
47
48  D1       EQU   $07      ;DIGIT 1 STROBE
49  D2       EQU   $06      ;DIGIT 2 STROBE
50  DURFLG   EQU   $03      ;DISPLAY DURATION FLAG BIT
```

```
51  AFLG    EQU  $04      ;DISPLAY "A" FLAG
52  OFFLG   EQU  $05      ;FLAG TO TURN OFF DISPLAYS
53  GUNFLG  EQU  $06      ;SHOTGUN FLAG
54  PNDFLG  EQU  $07      ;PROGRAM MODE ENDING FLAG
55  STBY    EQU  $00      ;STBY LED OF DISPLA
56
57  TCR     EQU  $12      ;TIMER CONTROL REGISTER
58  TSR     EQU  $13      ;TIMER STATUS REGISTER
59  TMRH    EQU  $18      ;TIMER COUNTER-HI BYTE
60  TMRL    EQU  $19      ;TIMER COUNTER-LO BYTE
61
62  BAUDR   EQU  $0D      ;SCI BAUD RATE REG
63  SCCR1   EQU  $0E      ;SCI CONTROL REG #1
64  SCCR2   EQU  $0F      ;SCI CONTROL REG #2
65  SCSR    EQU  $10      ;SCI STATUS REG
66  SCDAT   EQU  $11      ;SCI SND/RCV DATA REG
67  RDRF    EQU  $05      ;SCI RCV DATA REG FULL
68  RE      EQU  $02      ;SCI RCVR ENABLE
69  RIE     EQU  $05      ;SCI RCV INTERRUPT ENABLE
70  TDRE    EQU  $07      ;SCI XMIT DATA REG EMPTY
71  TE      EQU  $03      ;SCI XMITR ENABLE
72  USRVEC  EQU  $1FF4    ;START USER VECTOR TABLE
73
74      SUBTTL 'DEFINITION OF ROM CONSTANTS'
75  *************************************************************
76  *              DEFINE ROM CONSTANTS                          *
77  *************************************************************
78
79          SECTION ROM_CONSTANTS,$0020
80          ORG  $20
81
82  * LOOK UP TABLE FOR LED INTENSITY CONTROL-SEE SENDHD ROUTINE
83
84  INTENS: DB   $FF       ;MIN BLRATE
85          DB   $FF       ;MAX DURATN
86          DB   $2F       ;NO BLINKING
87          DB   $2F       ;MAX DURATN W/NO BLINK
88          DB   $2F       ;NO BLINKING
89          DB   $0F       ;MED DURATN
90          DB   $2F       ;NO BLINKING
91          DB   $02       ;MIN DURATN
92
93  *************************************************************
94  *                                                            *
95  *           RAM MEMORY ALLOCATIONS                           *
96  *                                                            *
97  *************************************************************
98
99      SUBTTL 'RAM MEMORY ALLOCATIONS'
100         SECTION RAM_VARIABLES,$0050
```

```
101            ORG  $0050
102
103   INKEY    DS   1
104   KEYCODE  DS   1
105   CNTEN    DS   1
106   CNTR0    DS   1
107   CNTR1    DS   1
108   CNTR2    DS   1
109   TCNT4    DS   1
110   TCNT5    DS   1
111   TCNT6    DS   1
112   DISPLA   DS   1
113   DISPLB   DS   1
114   FLAG     DS   1
115   OUTKEY   DS   1
116   BLRATE   DS   1
117   DURATN   DS   1
118   FLASH    DS   1    ;COUNTER FOR STBY PUSHES FOR INTENSITY TRAP
119   XREG     DS   1    ;TEMP XREG FOR INTENSITY CONTROL ROUTINE
120   LED0     DS   16   ;TABLE FOR LED STATUS, LED0 THRU LEDF
121
122      SUBTTL 'INITR'
123   ************************************************************
124   *                                                          *
125   *     INITR: SETS THE DDR FOR EACH PORT AND SETS INITIAL   *
126   *     VALUES IN EACH DATA REGISTER                         *
127   *     CLEARS TIMER INTERRUPTS                              *
128   *     PA0-3=INPUT,PA4-7=OUTPUT(KEYPAD)                     *
129   *     PB0-7=OUTPUT(DSPLAY)                                 *
130   *     PC7,6=STROBE DSPLAY                                  *
131   *     PC5=BEEPER                                           *
132   *                                                          *
133   ************************************************************
134
135            SECTION INITR,$100
136            ORG  $100
137
138   INITR:   LDA  #$F0     ;SET DATA DIRECTION REGISTERS
139            STA  DDRA     ;"    "     "         "
140            LDA  #$10     ;INITIALIZE KEYPAD
141            STA  KEYPAD
142            LDA  #$FF     ;SET DATA DIRECTION REGISTERS
143            STA  DDRB     ;"    "     "         "
144            STA  DDRC     ;"    "     "         "
145
146            LDA  #$FF     ;SET INTENSITY TO MAX AND BLINK
147            STA  BLRATE   ;"    "       "   "    "    "
148            STA  DURATN   ;"    "       "   "    "    "
149            CLRA          ;SET ALL LEDS OFF
150            STA  DISPLA   ;"   "    "   "
```

```
151             STA  DISPLB    ;"   "   "   "
152             STA  FLASH
153             STA  CNTR2     ;CLEAR CNTR2
154             STA  TCNT4     ;CLEAR TIMER #4
155             STA  FLAG      ;CLEAR ALL FLAGS
156             STA  SCDAT     ;CLEAR SCI DATA REG
157             STA  SCCR1     ;CLEAR SCI CONTROL REG #1
158             STA  SCCR2     ;CLEAR SCI CONTROL REG #2
159
160             BSET 4,PORTC   ;SET LAMPS TO ON
161             LDA  #$02      ;SET INTENSITY PTR XREG TO 2nd INTENSITY
162             STA  XREG
163             LDA  #$33      ;SET BAUD RATE TO 1200 BPS
164             STA  BAUDR
165             BSET RE,SCCR2  ;ENABLE SCI RECEIVER
166             BSET RIE,SCCR2 ;ENABLE SCI RCV INTERRUPTS
167             BSET TE,SCCR2  ;ENABLE XMITTR
168             BSET 1,CNTR1   ;INIT CNTR1 FOR IMMEDIATE OVFL
169             LDA  TSR       ;CLEAR TIMER INTERRUPTS
170             LDA  TMRL      ;  "      "       "
171             BSET 5,TCR     ;ENABLE TIMER OVFL (TOIE)INTERRUPTS
172             BSET 4,CNTEN   ;ENABLE TIMER #4
173
174  MODECHK:   LDA  #$11      ;IF KEY=STBY, THEN
175             CMP  KEYPAD    ;   BRANCH TO KEYBD
176             BEQ  KEYBD     ;ELSE, SET MODE=RUN
177             BSET 1,FLAG    ;   STOP TIMER
178             LDA  #$FF
179             STA  BLRATE    ;   SET LED BLINK RATE=SLOW
180             BCLR 4,CNTEN   ;END MODECHK
181
182     SUBTTL 'HDLP'
183  **********************************************************
184  *        HDLP: MAIN LOOP FOR CONTROL HEAD                 *
185  **********************************************************
186
187  HDLP:  EQU  *         ;DO FOREVER
188  WATCHDG: LDA PORTC    ;TOGGLE WATCH DOG
189          EOR  #$08
190          STA  PORTC
191
192  **********************************************************
193  *                                                         *
194  *    KEYBD: DETECTS KEY CLOSURES, DEBOUNCES AND DECODES KEY *
195  *    LEAVES A KEYCODE IN "KEYCODE", SETS A FLAG BIT.      *
196  *                                                         *
197  **********************************************************
198
199  KEYBD:  LDA  #$F0
200          STA  KEYPAD       ;SET KEYPAD=$F0
```

```
201           CMP  KEYPAD         ;READ KEYPAD
202           BEQ  NOKEY          ;IF SAME, THEN
203           BRSET 0,FLAG,KYBDX ;    BRANCH TO NOKEY
204           LDA  KEYPAD         ;IF ALREADY ENCODED, THEN
205           STA  INKEY          ;    BRANCH TO KYBDX
206    *                          ;ELSE, SAVE @ INKEY
207           JSR  DEBNCE         ;CALL DEBNCE
208           LDA  KEYPAD         ;READ KEYPAD AGAIN
209           CMP  INKEY          ;IF NOT SAME AS INKEY, THEN
210           BNE  NOKEY          ;    BRANCH TO NOKEY
211
212           CLRX
213           LDA  #$10           ;INIT ROW COUNT
214 KEYBD1:   STA  KEYPAD         ;DO UNTIL ALL ROWS CHECKED
215           CMP  KEYPAD         ;    OUTPUT ROW VALUE
216           BNE  KEYBD2         ;    READ KEYPAD
217           ASLA                ;    IF NOT SAME, THEN
218           BCS  NOKEY          ;        BRANCH TO FIND COLUMN
219           INCX                ;    ELSE, MULTIPLY ROW COUNTx2
220           BRA  KEYBD1         ;IF NO COLUMN FOUND, THEN
221    *                          ;    BRANCH TO NOKEY
222 KEYBD2:   LDA  KEYPAD         ;READ KEYPAD
223           AND  #$0F           ;MASK MSD
224           ASLX                ;MULTIPLY ROWx4
225           ASLX
226
227 KEYBD3:   ASRA                ;DO UNTIL COLUMN FOUND
228           BCS  KEYBD4         ;    SHIFT RIGHT
229           INCX                ;    COUNT COLUMNS
230           BNE  KEYBD3
231
232 KEYBD4:   STX  KEYCODE        ;SAVE @ KEYCODE
233           BSET 7,KEYCODE      ;SET WAKE UP BIT
234           BSET 0,FLAG         ;SET FLAG BIT
235           JSR  BEEP           ;CALL BEEP
236           BRA  KYBDX
237
238 NOKEY:    CLC                 ;IF NOKEY FOUND, THEN
239           BRCLR 0,FLAG,KYBDX ;   IF FLAG SET, THEN
240           CLR  OUTKEY         ;        SET RWU BIT
241           BSET 7,OUTKEY       ;        SEND NUL
242           JSR  SENDHD
243           BCLR 0,FLAG         ;        CLEAR FLAG BIT
244 KYBDX:    NOP                 ;END KEYBD
245
246    SUBTTL 'MODE'
247 ************************************************
248    *                               MODE.SRC 4-28-88 WJG    *
249    * MODE:SETS CONTROL HEAD TO RUN MODE 4 SECS AFTER PWR UP *
250    *  UNLESS STBY PUSHED DURING PWR UP, IN WHICH CASE IT IS *
```

```
251  *    SET TO PRGRM MODE. ANY KEY BUT STBY WILL KEEP IT IN       *
252  *    PRGRM. WILL REVERT TO PRGRM MODE 4 SECS AFTER STBY IS     *
253  *    PUSHED.                                                   *
254  *                                                              *
255  ****************************************************************
256
257  MODE:   BRSET 1,FLAG,MODX  ;IF RUN MODE, THEN
258          LDA  #$7F
259          STA  BLRATE
260          BRCLR 6,TCNT4,MOD1 ;    BRANCH TO END
261          BSET 1,FLAG        ;IF PRGRM TIMER EXPIRES, THEN
262          BCLR 2,FLAG        ;    SET RUN MODE
263          LDA  #$FF
264          STA  BLRATE        ;    SET LED BLINK RATE=SLOW
265          LDA  #$C0          ;    SEND STBY&RWU TO MAIN UNIT
266          STA  OUTKEY
267          JSR  SENDHD
268          JSR  BEEP          ;    CALL BEEP
269          BRA  MODX          ;    STOP TIMER
270  MOD1:   BRCLR 0,FLAG,MODX  ;    BRANCH TO END
271          LDA  #$80          ;IF KEYFLAG SET, THEN
272          CMP  KEYCODE       ;    SET LED BLINK RATE=SLOW
273          BNE  MOD2          ;    IF KEYCODE=STBY, THEN
274          CLR  TCNT4         ;        STARTTIMER
275          BSET 4,CNTEN       ;        SET PRGRM MODE
276          BSET 2,FLAG        ;        CALL BEEP
277          JSR  BEEP          ;        CALL BEEP
278          LDA  #$FF
279          JSR  DLY1          ;        BRANCH TO END
280          JSR  BEEP          ;    IF KEYCODE NOT=STBY, THEN
281          LDA  #$FF
282          JSR  DLY1
283          JSR  BEEP
284          BRA  MODX          ;    STOP TIMER
285  MOD2:   LDA  #$7F
286          STA  BLRATE        ;    SET LED BLINK RATE=SLOW
287          BCLR 4,CNTEN
288  MODX:   CLI
289          NOP
290
291     SUBTTL 'OUTHD'
292  ****************************************************************
293  *                                              WJG 4-25-88     *
294  *                                                              *
295  *  OUTHD: CHECKS FOR A KEY PUSHED AND CONVERTS KEYCODE TO      *
296  *   ASCII AND CALLS SENDHD. IF IN PRGRM MODE, CONVERTS TO      *
297  *   LOWER CASE, IF IN RUN MODE, CONVERTS TO UPPER CASE.        *
298  *                                                              *
299  ****************************************************************
300
```

```
301  OUTHD:    BRCLR  0,FLAG,OUTHDX      ;IF KEY PUSHED, THEN
302            LDA    KEYCODE            ;    IF RUN MODE, THEN
303            CMP    #$88               ;CHECK TO SEE IF IT IS GUNLOCK
304            BNE    OUTHD0
305            BSET   GUNFLG,FLAG        ;  IF SO, SET THE FLAG
306  OUTHD0:   BRCLR  1,FLAG,OUTHD1      ;          CONVERT TO UPPER
307            ORA    #$40               ;          SAVE @ OUTKEY
308            BRA    OUTHD2
309  OUTHD1:   BRCLR  2,FLAG,OUTHDX      ;    IF PRGRM MODE, THEN
310            BSET   PNDFLG,FLAG        ;      SET LED INTENSITY CONTROL LOCK
311            ORA    #$60               ;          CONVERT TO LOWER
312  OUTHD2:   STA    OUTKEY             ;          SAVE @ OUTKEY
313            BRCLR  7,SCSR,OUTHDX      ;    IF XMITR IDLE, THEN
314            JSR    SENDHD             ;          CALL SENDHD
315            BCLR   7,KEYCODE          ;          CLEAR WAKE UP BIT
316  OUTHDX:   NOP                       ;ELSE, END OUTHD
317
318       SUBTTL 'MPLX'
319  ***************************************************************
320  *                                                             *
321  *    MPLX:ALTERNATELY DISPLAYS STATUS OF ONE SET OF 8 LEDs    *
322  *    THEN THE OTHER SET OF 8, i.e. MULTIPLEXES THE DISPLAY    *
323  *    USING ONE 8 BIT PORT; PORT B. PORT C, BITS 7&6 ARE       *
324  *    USED AS DIGIT STROBES.                                   *
325  *                                                             *
326  ***************************************************************
327
328  MPLX:     BRSET  OFFLG,FLAG,MPLX3
329            DEC    CNTR0
330            BNE    MPLX2
331            LDA    BLRATE
332            STA    CNTR0
333            LDA    DURATN
334            STA    CNTR1
335            BSET   DURFLG,FLAG
336            BRSET  AFLG,FLAG,MPLX1
337            LDA    DISPLA
338            STA    DSPLAY
339            BSET   D1,PORTC
340            BCLR   D2,PORTC
341            BSET   AFLG,FLAG
342            BRA    MPLX2
343  MPLX1:    LDA    DISPLB
344            STA    DSPLAY
345            BSET   D2,PORTC
346            BCLR   D1,PORTC
347            BCLR   AFLG,FLAG
348  MPLX2:    BRCLR  DURFLG,FLAG,MPLX3
349            DEC    CNTR1
350            BNE    MPLX3
```

```
351              BCLR D1,PORTC
352              BCLR D2,PORTC
353              BCLR DURFLG,FLAG
354     MPLX3:   NOP
355
356       SUBTTL 'UPDATE'
357     ****************************************************************
358     *                                           UPDATE:WJG 3-20-88 *
359     *   UPDATE:FETCHES LED STATUS IN TABLE STARTING @ LED0         *
360     *          SHUFFLES EACH BIT 4 SO IT ENDS UP IN DISPLA AND     *
361     *          DISPLB AS REQ'D                                     *
362     ****************************************************************
363
364     UPDATE:  CLRX
365              CLR  DISPLA
366              CLR  DISPLB
367     UPDAT1:  LDA  LED0,X
368              AND  #$10
369              BEQ  UPDAT2
370              SEC
371              BRA  UPDAT3
372     UPDAT2:  CLC
373     UPDAT3:  ROR  DISPLB
374              ROR  DISPLA
375              INCX
376              CPX  #$10
377              BNE  UPDAT1
378     UPDATX:  NOP
379     HDLPX:   JMP  HDLP         ; END OF MAIN LOOP
380              NOP
381
382       SUBTTL 'SUBROUTINES'
383     ****************************************************************
384     *      THIS AREA FOR SUBROUTINES                               *
385     ****************************************************************
386
387       SUBTTL 'DLY1'
388     ****************************************************************
389     *                                             DLY1:WJG 8-4-88  *
390     *   DLY1:TIMING LOOP GETS TIME VAR IN ACC, COUNTS DOWN TCNT5   *
391     *        TO ZERO AND RETURNS                                   *
392     ****************************************************************
393
394     DLY1:    STA  TCNT5
395              LDA  #$FF
396              STA  TCNT6
397     DLY12:   DEC  TCNT5
398              BNE  DLY12
399              LDA  PORTC    ;TOGGLE WATCH DOG
400              EOR  #$03
```

```
401          STA  PORTC
402          DEC  TCNT6
403          BNE  DLY12
404          RTS
405
406     SUBTTL 'DEBNCE'
407     ************************************************************
408     *   DEBNCE:USES ACC FOR A DELAY CNTR, DEBOUNCES KEYBOARD    *
409     ************************************************************
410
411     DEBNCE:  LDA  #$10     ;DEBOUNCE DELAY FOR KEYBOARD
412     DEBNC1:  DECA
413              BNE  DEBNC1
414     *        LDA  PORTC    ;TOGGLE WATCH DOG
415     *        EOR  #$08
416     *        STA  PORTC
417              RTS
418
419     SUBTTL 'BEEP'
420     ************************************************************
421     *                                                          *
422     *                               BEEP.SRC 3-15-88 WJG       *
423     *                                                          *
424     * BEEP OUTPUTS SQUARE WAVE TONE TO THE CERAMIC BEEPER      *
425     * Uses x reg, port PC5 for output in an in-line code       *
426     * type timing loop.                                        *
427     *                                                          *
428     *                                                          *
429     * USES RAM LOCATION "CNTR1" FOR A DURATION TIMER           *
430     * DURATION WILL DEPEND ON LOOP TIME.                       *
431     *                                                          *
432     ************************************************************
433
434     BEEP:    LDA  #$FF     ;SET BEEP DURATION
435              STA  CNTR2
436     BEEP1:   LDX  #$16     ;Set loop duration(frequency)
437              LDA  PORTC    ;TOGGLE WATCH DOG
438              EOR  #$08
439              STA  PORTC
440     BEEP2:   BSET 5,2      ;BEEPER=PC5
441              DECX          ;Change one ldx value for symmetry
442              BNE  BEEP2
443              LDX  #$16
444     BEEP3:   BCLR 5,2
445              DECX
446              BNE  BEEP3
447              DEC  CNTR2
448              BNE  BEEP1
449              RTS
450              NOP
```

```
451
452      SUBTTL 'SENDHD'
453   ************************************************************
454   *                                                        *
455   *                                            4-25-88 WJG *
456   *                                           26-Jun-89 GB *
457   *  SENDHD:MOVE KEYCODE TO SCI AND TRANSMIT TO MAIN UNIT  *
458   *  TEST TDRE BIT FOR EMPTY SCI REGISTER                  *
459   *  EXTENSIVELY MODIFIED TO TRAP UNDESIRED LED INTENSITY  *
460   *  CHANGES ON SHOTGUN INTERLOCK AND PROGRAM MODE EXIT.   *
461   ************************************************************
462
463   SENDHD:  NOP
464   *        LDA  PORTC      ;TOGGLE WATCH DOG
465   *        EOR  #$08
466   *        STA  PORTC
467            BRSET TDRE,SCSR,SENDHD1
468            BRCLR TDRE,SCSR,SENDHD
469   SENDHD1: LDA  OUTKEY
470            STA  SCDAT
471            BRCLR STBY,DISPLA,SENDHDX
472            LDA  OUTKEY
473            CMP  #$C0         ; IF STANDBY
474            BNE  SENDHDX      ; THEN
475            BRSET GUNFLG,FLAG,FCOUNT   ; IF EITHER THE GUNFLAG OR THE
476            BRSET PNDFLG,FLAG,FCOUNT   ; PROG MODE END FLAG ARE SET
477            LDX  XREG                  ; WE SKIP THIS
478            CPX  #$08
479            BEQ  OFF
480            BSET 4,PORTC
481            LDA  INTENS,X
482            STA  BLRATE
483            INCX
484            LDA  INTENS,X
485            STA  DURATN
486            INCX
487            STX  XREG
488            BCLR OFFLG,FLAG
489            BRA  SENDHDX
490   OFF:     BCLR 4,PORTC
491            CLR  XREG
492            CLR  DISPLA
493            CLR  DISPLB
494            CLR  DSPLAY
495            BSET OFFLG,FLAG
496            BRA  SENDHDX
497   FCOUNT:  NOP                ; AND COUNT THE NUMBER OF TIMES
498            INC  FLASH         ; STBY IS PRESSED EITHER BY THE
499            LDA  FLASH         ; OPERATOR, OR THE PROGRAM.
500            CMP  #$01          ; WHICH MUST NOW BE MORE THAN ONCE
                BLO  SENDHDX       ; TO CHANGE THE INTENSITY.
```

```
501             CLR  FLASH
502             BCLR GUNFLG,FLAG      ; WHEN PUCHED TWICE, THE INTENSITY
503             BCLR PNDFLG,FLAG      ; INTERLOCK FLAGS ARE CLEARED.
504   SENDHDX:  NOP
505             RTS                   ;END SENDHD
506             NOP
507
508     SUBTTL 'INTERRUPT SERVICE ROUTINES'
509   ****************************************************************
510   *     THIS AREA FOR INTERRUPT SERVICE ROUTINES                  *
511   ****************************************************************
512
513   TMRINT:  EQU  *            ;IF TOF SET, THEN
514            BRCLR 5,TSR,TMRINTX  ;IF TIMER ENABLED, THEN
515            BRCLR 4,CNTEN,TMRINT1 ; INCREMENT TCNT4
516            INC  TCNT4
517   TMRINT1: LDA  TMRL         ; CLEAR INTERRUPT
518   TMRINTX: RTI               ; RETURN FROM INTERRUPT
519   SCINT:   LDA  SCSR         ;ELSE,RETURN FROM INTERRUPT
520            AND  #$0E
521            BNE  SCINTE
522            BRCLR RDRF,SCSR,SCINTX
523            LDA  SCDAT
524            CMP  #$1F
525            BHI  SCINTE
526            AND  #$0F
527            TAX
528            LDA  SCDAT
529            STA  LED0,X
530            BRA  SCINTX
531   SCINTE:  LDA  SCDAT
532   SCINTX:  RTI
533            NOP
534   SPINT:   RTI
535   IRQINT:  RTI
536   SWINT:   RTI
537
538     SUBTTL 'Fill Unused ROM with harmless NOPs (MC68HC05C4)'
539   AMLOSTO: DB   8 DUP ($9D)  ; This fill section MUST be
540     NOLIST
541            DB   465 DUP ($9D) ; adjusted in length when the
542            DB   512 DUP ($9D) ; program is modified!
543            DB   512 DUP ($9D)
544            DB   512 DUP ($9D)
545            DB   512 DUP ($9D)
546            DB   512 DUP ($9D)
547            DB   512 DUP ($9D)
548     LIST
549   *        ORG  $10FD        ; such that this statement ends up
550            JMP  INITR        ; starting at $10FD and ending at $10FF
```

```
551            MSG   'Assembly through $10FF complete for MC68HC05C4'
552     SUBTTL 'Fill Unused ROM with harmless NOPs {MC68HC705C8}'
553            SECTION AMLOST,$1100
554            ORG   $1100           ; comment out this section when using MC68HC05C4
555            MSG   'Assembling for MC68HC705C8'
556     AMLOST: DB    8 DUP ($9D)
557      NOLIST
558            DB    512 DUP ($9D)
559            DB    512 DUP ($9D)
560            DB    512 DUP ($9D)
561            DB    512 DUP ($9D)
562            DB    512 DUP ($9D)
563            DB    512 DUP ($9D)
564            DB    501 DUP ($9D)
565      LIST
566     *      ORG   $1EFD
567            JMP   INITR
568            MSG   'Assembly through $1EFF complete for MC68HC705C8'
569
570     SUBTTL 'USER ISR VECTORS'
571     ************************************************************
572     *   INTERRUPT VECTOR TABLE-POINTERS TO INT SERVICE ROUTINES   *
573     ************************************************************
574
575            SECTION ISR_VECTORS,USRVEC
576            ORG   USRVEC
577            DW    SPINT
578            DW    SCINT
579            DW    THRINT
580            DW    IRQINT
581            DW    SWINT
582            DW    INITR
583            END
584
```

I claim:

1. An emergency signalling system for a vehicle comprising: a controller for mounting to the vehicle and alternatively operable in programming and operating modes; a signalling device for broadcasting an emergency warning signal selected by the controller in the operating mode; a first means of the controller responsive to a user interface and a first memory for (1) placing the controller in the programming mode and (2) selecting the emergency warning signal from a group of available emergency warning signals stored in the first memory, a second memory in communication with the first means for storing the selected emergency warning signal; second means of the controller in communication with the second memory and responsive to the user interface when the controller is in the operating mode for delivering the selected emergency warning signal to the signalling device; and, the controller including a control head in serial communication with a control unit, where the control head is responsive to the user interface and the control unit controls the signalling device.

2. The signalling system as set forth in claim 1 wherein the user interface includes a computer with a keypad that communicates with the controller via a temporary connection in order to select the one or more emergency warning signals when the controller is in the programming mode.

3. The signalling system as set forth in claim 2 wherein the temporary connection is provided by a serial port at the controller.

4. The signalling system as set forth in claim 1 wherein the controller includes the user interface.

5. The signalling system of claim 1 wherein the signalling device is a siren.

6. The signalling system as set forth in claim 5 including an emergency light responsive to the controller for broadcasting an emergency light signal in an ambient environment of the vehicle.

7. A method of using an emergency signalling system installed in a vehicle, the system including (1) a programmable controller alternatively operable in programming and operating modes and (2) at least two signalling configurations of warning signals, the method comprising the steps of:

switching the programmable controller to the programming mode;

entering commands at a user interface that enables at least one of the signalling configurations of warning signals for activation in the operating mode of the programmable controller;

switching the programmable controller to the operating mode;

selecting one of the enabled signalling configurations of warning signals when the system is installed in the vehicle; and activating the selected signalling configuration of warning signals in order to generate an emergency signal in an ambient environment of the vehicle.

8. The method of claim 7 wherein the user interface is a computer with a keypad that is temporarily connected to the programmable controller via a serial connection.

9. The method of claim 7 wherein the programmable controller comprises a control unit and a control head and the control head incorporates the user interface.

10. The method of claim 7 wherein the emergency signal comprises sound and light signals.

11. The method of claim 7 wherein the emergency signal is an acoustic signal.

12. The method of claim 7 wherein the emergency signal is an electromagnetic signal.

13. For incorporation into a vehicle, an emergency signalling system comprising: a control head for mounting in a passenger compartment of the vehicle and including a user interface; a control unit and power amplifier for mounting in an interior area of the vehicle at a location that is remote from the control head; each of the control head and control unit including at least one port for serial communication; a bi-directional communication bus connecting the serial ports of the control head and the control unit; a signalling device responsive to the control unit and power amplifier; and means in the control unit responsive to a user input at the control head for activating the signalling device in order to generate an emergency warning signal.

14. The emergency signalling system as set forth in claim 13 wherein the control unit is alternatively operable in programming and operating modes, where the control unit (1) generates the emergency warning signal in the operating mode and (2) selects the emergency warning signal from a group of possible emergency warning signals in the programming mode.

* * * * *